US011586176B2

(12) United States Patent
Maturana et al.

(10) Patent No.: US 11,586,176 B2
(45) Date of Patent: Feb. 21, 2023

(54) HIGH PERFORMANCE UI FOR CUSTOMER EDGE IIOT APPLICATIONS

(71) Applicant: Rockwell Automation Technologies, Inc., Mayfield Heights, OH (US)

(72) Inventors: Francisco P. Maturana, Lyndhurst, OH (US); Krutika Sanjay Kansara, Pune (IN); Nikhil Ashok Patange, Pune (IN); Jay W Schiele, Union Grove, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 0 days.

(21) Appl. No.: 17/234,235

(22) Filed: Apr. 19, 2021

(65) Prior Publication Data

US 2022/0334557 A1    Oct. 20, 2022

(51) Int. Cl.
*G06F 16/26* (2019.01)
*G05B 19/4155* (2006.01)
*G06F 9/451* (2018.01)
*G06F 16/21* (2019.01)

(52) U.S. Cl.
CPC ......... *G05B 19/4155* (2013.01); *G06F 9/451* (2018.02); *G06F 16/219* (2019.01); *G06F 16/26* (2019.01); *G05B 2219/31368* (2013.01)

(58) Field of Classification Search
CPC ...... G05B 19/4155; G05B 2219/31368; G06F 9/451; G06F 16/219; G06F 16/26
See application file for complete search history.

(56) References Cited

U.S. PATENT DOCUMENTS

| 10,917,419 B2 | 2/2021 | Crotinger et al. |
| 2009/0132348 A1 | 5/2009 | Bria et al. |
| 2011/0119212 A1 | 5/2011 | De Bruin et al. |
| 2017/0126841 A1* | 5/2017 | Bliss .................. G05B 19/0423 |

(Continued)

FOREIGN PATENT DOCUMENTS

JP    2016-002777 A    1/2016

OTHER PUBLICATIONS

Non Final Office Action received for U.S. Appl. No. 17/157,329 dated Jun. 23, 2022, 51 pages.

(Continued)

*Primary Examiner* — Andrey Belousov
(74) *Attorney, Agent, or Firm* — Amin, Turocy & Watson, LLP

(57) ABSTRACT

An industrial data pipeline architecture described supports annotation of raw data streams into scalable and durable cloud-level storage. A dynamic data mapping process collects industrial data from data tags that have been annotated with metadata indicating that the tags are to be made available for visualization, and connects data from these tags to a data aggregator object of a node-level or edge-level visualization tool. The data aggregator object dynamically adjusts its data collection footprint to include the annotated data tags, which are dynamically associated with the physical layout of the industrial equipment in the visualization. Visualization objects for a specified plant configuration act as data context containers that can be added to a plant visualization panel, and allows the annotated tags to be selected to build visualizations of selected data items.

20 Claims, 43 Drawing Sheets

(56) References Cited

U.S. PATENT DOCUMENTS

| | | |
|---|---|---|
| 2018/0157620 A1 | 6/2018 | Leonard et al. |
| 2018/0232338 A1 | 8/2018 | Tasaki |
| 2018/0232339 A1 | 8/2018 | Tasaki |
| 2019/0102456 A1* | 4/2019 | Miller .................. G06F 16/168 |
| 2019/0318288 A1 | 10/2019 | Noskov et al. |
| 2019/0339688 A1 | 11/2019 | Cella et al. |
| 2020/0380062 A1 | 12/2020 | Li et al. |
| 2021/0297284 A1 | 9/2021 | Maeda et al. |
| 2022/0067124 A1 | 3/2022 | Nishino et al. |

OTHER PUBLICATIONS

Final Office Action received for U.S. Appl. No. 17/157,329 dated Oct. 19, 2022, 55 pages.

* cited by examiner

| Time Stamps | Tag Value | Mean | Median | Max | Min |
|---|---|---|---|---|---|
| 2020-09-10T13:29:26.520Z | 1 | | | | |
| 2020-09-10T13:29:26.570Z | 5 | | | | |
| 2020-09-10T13:29:26.630Z | 7 | | | | |
| 2020-09-10T13:29:26.680Z | 2.5 | 4.5 | 3.75 | 12 | 1 |
| 2020-09-10T13:29:26.730Z | 2 | 4.5 | 3.75 | 12 | 1 |
| 2020-09-10T13:29:26.780Z | 4 | 4.5 | 3.75 | 12 | 1 |
| 2020-09-10T13:29:26.830Z | 12 | 4.5 | 3.75 | 12 | 1 |
| 2020-09-10T13:29:26.880Z | 5 | 4.5 | 3.75 | 12 | 1 |
| 2020-09-10T13:29:26.930Z | 3.5 | 4.5 | 3.75 | 12 | 1 |
| 2020-09-10T13:29:26.980Z | 3 | 4.5 | 3.75 | 12 | 1 |

FIG. 6a

| Time Stamps | Tag Value |
|---|---|
| 2020-09-10T13:29:26.520Z | 4.5 |
| 2020-09-10T13:29:26.570Z | 4.5 |
| 2020-09-10T13:29:26.630Z | 4.5 |
| 2020-09-10T13:29:26.680Z | 4.5 |
| 2020-09-10T13:29:26.730Z | 4.5 |
| 2020-09-10T13:29:26.780Z | 4.5 |
| 2020-09-10T13:29:26.830Z | 4.5 |
| 2020-09-10T13:29:26.880Z | 4.5 |
| 2020-09-10T13:29:26.930Z | 4.5 |
| 2020-09-10T13:29:26.980Z | 4.5 |

1102

| Time Stamps | Tag Value |
|---|---|
| 2020-09-10T13:29:26.730Z | 4.5 |

1104

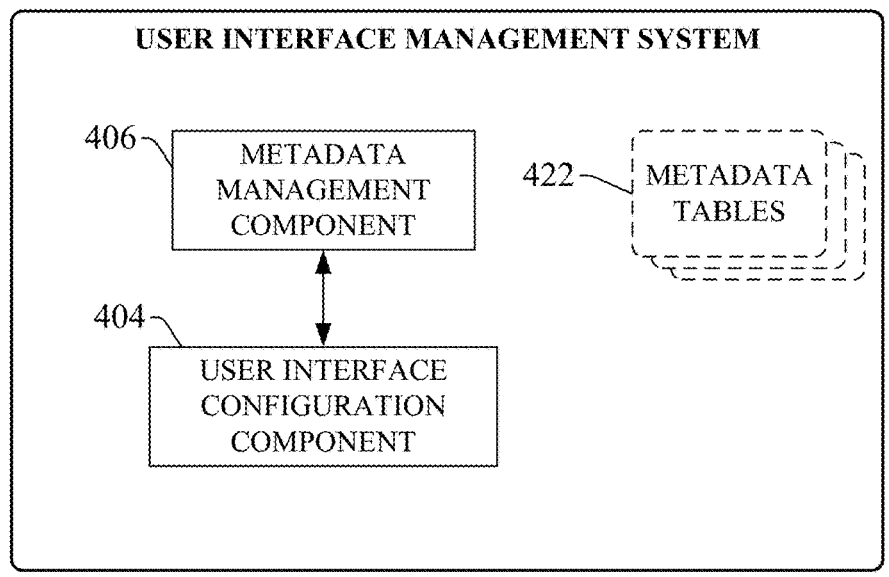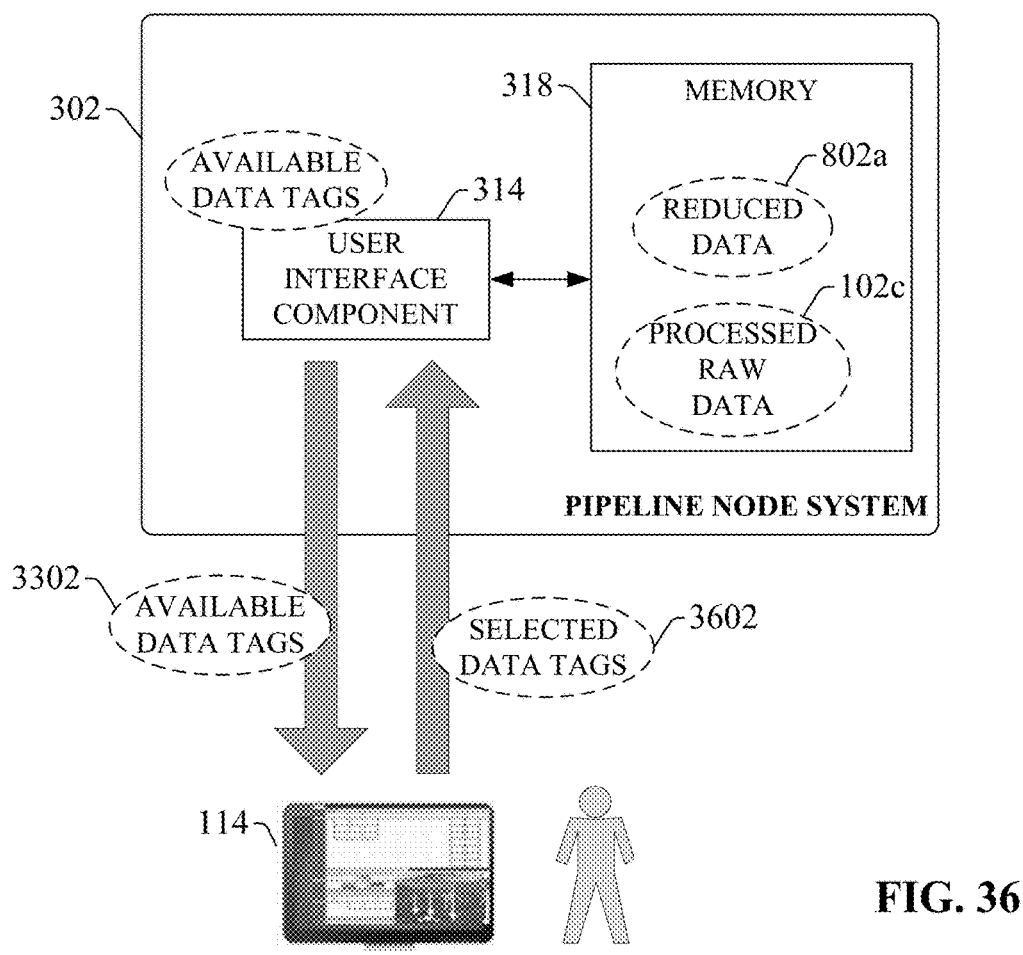
FIG. 36

HIGH PERFORMANCE UI FOR CUSTOMER EDGE IIOT APPLICATIONS

BACKGROUND

The subject matter disclosed herein relates generally to industrial automation, and, more particularly, collection of industrial data.

BRIEF DESCRIPTION

The following presents a simplified summary in order to provide a basic understanding of some aspects described herein. This summary is not an extensive overview nor is intended to identify key/critical elements or to delineate the scope of the various aspects described herein. Its sole purpose is to present some concepts in a simplified form as a prelude to the more detailed description that is presented later.

In one or more embodiments, a system is provided, comprising a device interface component configured to read, from industrial devices on which data tags are defined, visualization metadata respectively associated with the data tags; a metadata management component configured to record identities of a subset of the data tags having visualization metadata indicating that visualization of data collected from the subset of the data tags is enabled; and a user interface configuration component configured to instruct a user interface system to render information regarding the subset of the data tags on an interface display, and render historical data collected from one or more of the subset of the data tags selected via interaction with the interface display.

Also, one or more embodiments provide a method, comprising reading, by a system comprising a processor, visualization metadata respectively associated with data tags defined on industrial devices; identifying, by the system, a subset of the data tags having visualization metadata indicating that visualization of data collected from the subset of the data tags is enabled; rendering, by the system, information regarding the subset of the data tags on an interface display; and in response to receiving, via interaction with the interface display, selection input that selects one or more of the subset of the data tags, rendering, by the system on the interface display, historical data collected from the one or more of the subset of the data tags.

Also, according to one or more embodiments, a non-transitory computer-readable medium is provided having stored thereon instructions that, in response to execution, cause a system comprising a processor to perform operations, the operations comprising monitoring visualization metadata respectively associated with data tags defined on industrial devices; identifying a subset of the data tags having visualization metadata indicating that data collected from the subset of the data tags is permitted to be visualized; rendering information regarding the subset of the data tags on an interface display; and in response to receiving, via interaction with the interface display, selection input that selects one or more of the subset of the data tags, rendering, on the interface display, historical data collected from the one or more of the subset of the data tags.

To the accomplishment of the foregoing and related ends, certain illustrative aspects are described herein in connection with the following description and the annexed drawings. These aspects are indicative of various ways which can be practiced, all of which are intended to be covered herein. Other advantages and novel features may become apparent from the following detailed description when considered in conjunction with the drawings.

BRIEF DESCRIPTION OF THE DRAWINGS

FIG. 6a is an example set of time-series data collected from a data tag of an industrial device, which can be included as part of a data batch being processed by a node system of an IIoT data pipeline.

FIG. 6b is a graph of the time-series data depicted in FIG. 5a.

FIG. 36 is a diagram illustrating selection of a subset of available data tags via interaction with the visualization system.

DETAILED DESCRIPTION

Figure 1:
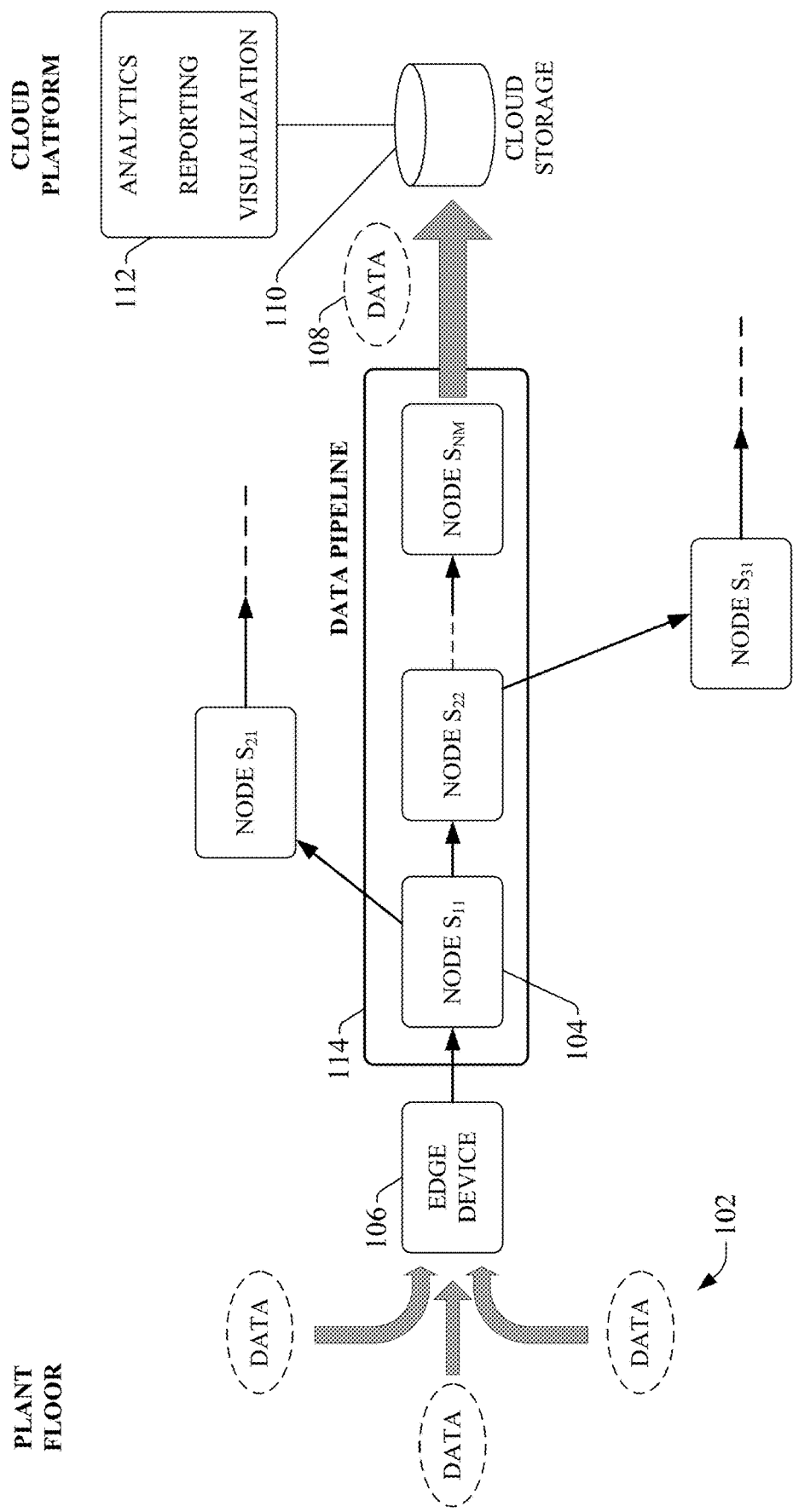
FIG. 1 is a diagram illustrating an example IIoT data pipeline.

The subject disclosure is now described with reference to the drawings, wherein like reference numerals are used to refer to like elements throughout. In the following description, for purposes of explanation, numerous specific details are set forth in order to provide a thorough understanding thereof. It may be evident, however, that the subject disclosure can be practiced without these specific details. In other instances, well-known structures and devices are shown in block diagram form in order to facilitate a description thereof.

As used in this application, the terms "component," "system," "platform," "layer," "controller," "terminal," "station," "node," "interface" are intended to refer to a computer-related entity or an entity related to, or that is part of, an operational apparatus with one or more specific functionalities, wherein such entities can be either hardware, a combination of hardware and software, software, or software in execution. For example, a component can be, but is not limited to being, a process running on a processor, a processor, a hard disk drive, multiple storage drives (of optical or magnetic storage medium) including affixed (e.g., screwed or bolted) or removable affixed solid-state storage drives; an object; an executable; a thread of execution; a computer-executable program, and/or a computer. By way of illustration, both an application running on a server and the server can be a component. One or more components can reside within a process and/or thread of execution, and a component can be localized on one computer and/or distributed between two or more computers. Also, components as described herein can execute from various computer readable storage media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that provides at least in part the functionality of the electronic components. As further yet another example, interface(s) can include input/output (I/O) components as well as associated processor, application, or Application Programming Interface (API) components. While the foregoing examples are directed to aspects of a component, the exemplified aspects or features also apply to a system, platform, interface, layer, controller, terminal, and the like.

As used herein, the terms "to infer" and "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

In addition, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Furthermore, the term "set" as employed herein excludes the empty set; e.g., the set with no elements therein. Thus, a "set" in the subject disclosure includes one or more elements or entities. As an illustration, a set of controllers includes one or more controllers; a set of data resources includes one or more data resources; etc. Likewise, the term "group" as utilized herein refers to a collection of one or more entities; e.g., a group of nodes refers to one or more nodes.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches also can be used.

Industrial controllers and their associated I/O devices are central to the operation of modern automation systems. These controllers interact with field devices on the plant floor to control automated processes relating to such objectives as product manufacture, material handling, batch processing, supervisory control, and other such applications. Industrial controllers store and execute user-defined control programs to effect decision-making in connection with the controlled process. Such programs can include, but are not limited to, ladder logic, sequential function charts, function block diagrams, structured text, or other such programming structures.

Because of the large number of system variables that must be monitored and controlled in near real-time, industrial automation systems often generate vast amounts of near real-time data. In addition to production statistics, data relating to machine health, alarm statuses, operator feedback, electrical or mechanical load over time, and the like are often monitored, and in some cases recorded, on a continuous basis. This data is generated by the many industrial devices that make up a typical automation system, including the industrial controller and its associated I/O, telemetry devices for near real-time metering, motion control devices (e.g., drives for controlling the motors that make up a motion system), visualization applications, lot traceability systems (e.g., barcode tracking), etc. Moreover, since many industrial facilities operate on a 24-hour basis, their associated automation systems can generate a vast amount of potentially useful data at high rates. The amount of generated automation data further increases as additional plant facilities are added to an industrial enterprise.

To gain insights into the operation of plant-floor automation systems and processes, this high-density industrial data can be collected and streamed to analytics, visualization, or reporting systems residing on a cloud platform or another high-level platform via a data pipeline, or a network of parallel data pipelines, as part of an industrial internet of things (IIoT) architecture. FIG. 1 is a diagram illustrating an example IIoT data pipeline. Data pipeline 114 can comprise a series of chained nodes 104 capable of relaying aggregated industrial data 102 from an edge device 106 residing on the plant floor to cloud storage 110. Nodes 104 may be server devices, microservices executing on respective computer hardware platforms, or other such processing elements. Each of the chained nodes 104 receives data from an adjacent upstream node 104 and passes this data to an adjacent downstream node 104 to thereby convey data from the source to the destination. In some architectures, a sending node can be connected to multiple upstream feeder nodes and/or multiple downstream receiving nodes. In addition to conveying collected industrial data through the pipeline 114, a given node 104 may also perform processing on received data in accordance with a data processing application installed on the node 104. Such application may include, but are not limited to, notification applications that generate and send notifications to specified client devices if any of the data satisfies a defined notification criterion, data transformation applications that transform or reformat the data to suit the needs of a target application, or other such applications.

Any of the nodes 104 or edge device 106 may perform processing on the collected data 102 as the data is streaming through the pipeline 114, and as such the data 108 that is delivered to the cloud storage 110 may be a processed version of the data 102 collected from the plant floor devices and sensors that make up the plant floor automation systems. Once the data 108 has been moved to cloud storage 110, the data 108 can be analyzed or visualized by high-level applications 112.

Many IIoT applications convey variable data volumes that must be organized for reporting or analysis purposes. When time-series data on the plant floor is generated at a high-speed rate, the large volume of data that is streamed through the pipeline 114 can cause problems in the cloud-based applications due to the large data point density. For example, processing large volumes of data can increase the processing latency of the cloud-side applications, which may result in data congestion within the pipeline 114, or may overload those applications and necessitate a system restart. In the case of visualization applications, such as cloud-based HMIs, the total volume of raw data generated by the plant-floor industrial devices may be too large and noisy to render a clear visualization that can be easily interpreted by a viewer, and as such visualizing the raw data in its entirety can obscure important events or trends within the data.

To reduce the volume of data provided to the cloud-side applications, additional data pipeline backplane processing can be implemented to perform data reduction steps on the streaming data, resulting in a smaller data set that is more suitable for cloud-side visualization or reporting. However, arbitrary truncation of data using a simple truncation criterion cannot guaranteed data consistency and accuracy. With such approaches, there is a trade-off between high data reduction and data accuracy. As such, crude truncation approaches may reduce data volume but may also reduce the accuracy of reporting, analytic, or predictive applications that consume the data. Moreover, simple data truncation strategies do not maintain an associative link between the reduced data set and the original raw data, leaving no means for a user to easily access a selected set of the original raw data corresponding to a particular subset of the reduced data set in order to view higher-resolution data surrounding a selected point in time.

To address these and other issues, one or more embodiments described herein provide data reduction services that can be implemented in one or more nodes of an IIoT data pipeline to intelligently determine an appropriate data reduction strategy based on characteristics of the incoming data.

In one or more embodiments, data reduction components on the pipeline node or on an edge device can define different data filtering rules or algorithms that can be selectively applied to a given set of streaming time-series data based on a probability distribution of the data. The data pipeline node can perform real-time distribution analysis on the streaming data to determine whether the data has a unimodal distribution, a multimodal distribution, or no mode, and select one of the data filtering rules based on this determined probability distribution. Additional filtering rules can also be defined for cases in which there is no change in the data or only small changes to the data within a given data set (e.g., a given batch of data being conveyed through the data pipeline 114). In this way, the data is intelligently reduced in a manner that retains critical information within the reduced data set while achieving a high level of data reduction. This approach can yield a reduced data set by identifying nominal data that is not associated with anomalies, thereby maintaining high accuracy.

Additionally, the data reduction services define linkages that associate items of the reduced data set with their corresponding sets of raw data, thereby creating a means to easily access the original higher-resolution data surrounding a selected item of the reduced data set. Thus, synchronization between the reduced data set and the corresponding raw data is maintained, allowing a user to easily navigate between lower-resolution visualization of the data to the higher-resolution raw data.

Figure 2:
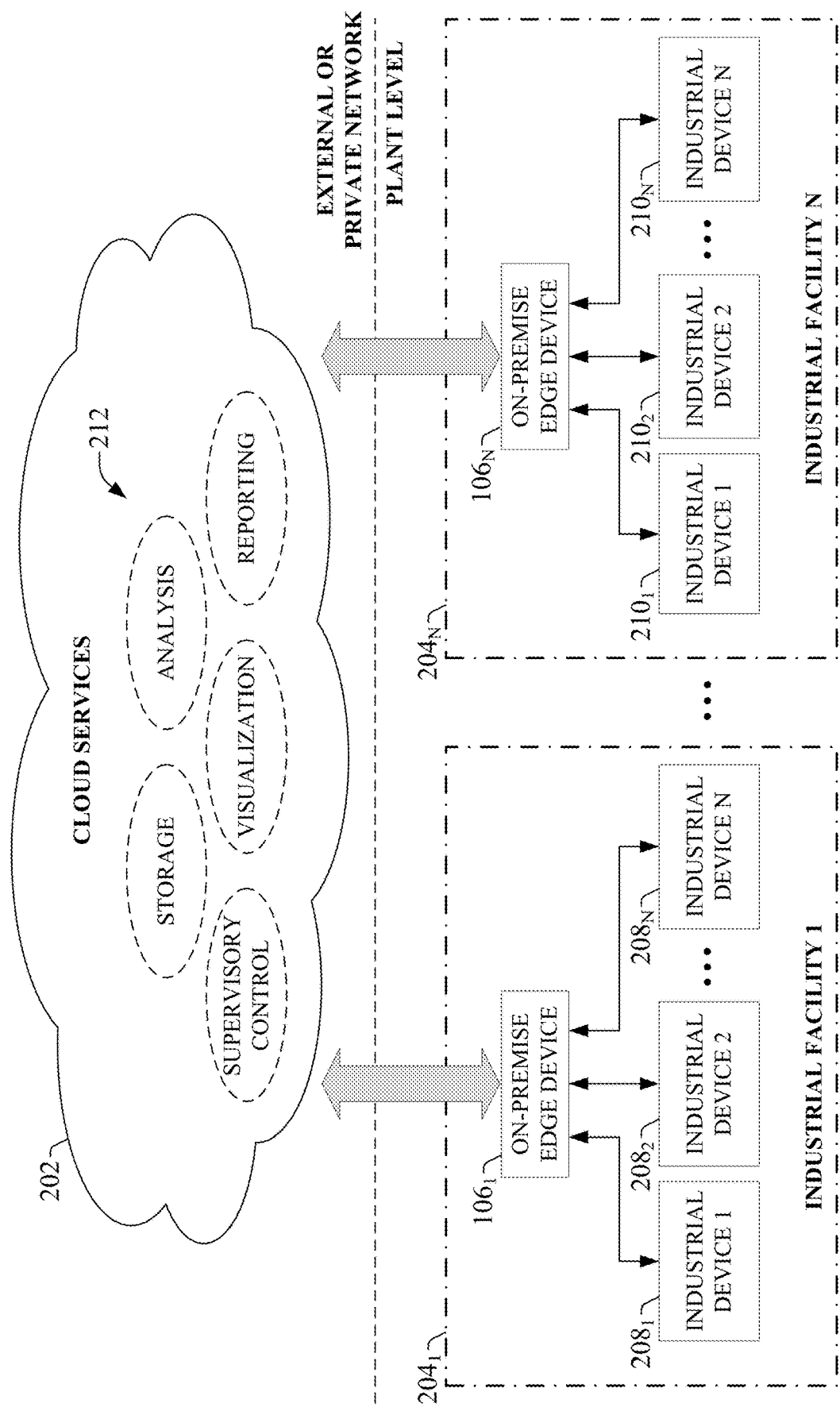
FIG. 2 illustrates a high-level overview of an architecture in which data from an industrial enterprise can be migrated to a cloud platform.

As noted above, the IIoT data reduction system described herein can be used as part of an IIoT data pipeline used to migrate data generated at one or more plant facilities to a cloud environment for storage, analysis, reporting, or visualization. FIG. 2 illustrates a high-level overview of an architecture in which data from an industrial enterprise can be migrated to a cloud platform. This architecture is an example context in which embodiments of the reactive buffering system can be used. The enterprise comprises one or more industrial facilities 204, each having a number of industrial devices 208 and 210 in use. The industrial devices 208 and 210 can make up one or more automation systems operating within the respective facilities 204. Example automation systems can include, but are not limited to, batch control systems (e.g., mixing systems), continuous control systems (e.g., PID control systems), or discrete control systems. Industrial devices 208 and 210 can include such devices as industrial controllers (e.g., programmable logic controllers or other types of programmable automation controllers); field devices such as sensors and meters; motor drives; operator interfaces (e.g., human-machine interfaces, industrial monitors, graphic terminals, message displays, etc.); industrial robots, barcode markers and readers; vision system devices (e.g., vision cameras); safety relays, optical safety systems, or other such industrial devices.

Industrial automation systems can include one or more industrial controllers that facilitate monitoring and control of their respective processes. These industrial controllers exchange data with the field devices using native hardwired I/O or via a plant network such as Ethernet/IP, Data Highway Plus, ControlNet, Devicenet, or the like. A given controller typically receives any combination of digital or analog signals from the field devices indicating a current state of the devices and their associated processes (e.g., temperature, position, part presence or absence, fluid level, etc.), and executes a user-defined control program that performs automated decision-making for the controlled processes based on the received signals. The controller then outputs appropriate digital and/or analog control signaling to the field devices in accordance with the decisions made by the control program. These outputs can include device actuation signals, temperature or position control signals, operational commands to a machining or material handling robot, mixer control signals, motion control signals, and the like. The control program can comprise any suitable type of code used to process input signals read into the controller and to control output signals generated by the controller, including but not limited to ladder logic, sequential function charts, function block diagrams, structured text, or other such platforms.

Although the example architecture illustrated in FIG. 2 depicts the industrial devices 208 and 210 as residing in fixed-location industrial facilities 204, the industrial devices 208 and 210 may also be part of a mobile control application, such as a system contained in a truck or other service vehicle.

On-premise edge devices 106 can collect data from industrial devices 208 and 210—or from other data sources, including but not limited to data historians, business-level systems, etc. —and feed this data into a data pipeline (e.g., pipeline 114 in FIG. 1) which migrates the data to the cloud platform 202 for processing and storage. Cloud platform 202 can be any infrastructure that allows cloud services 212 to be accessed and utilized by cloud-capable devices. Cloud platform 202 can be a public cloud accessible via the Internet by devices having Internet connectivity and appropriate authorizations to utilize the services 212. In some scenarios, cloud platform 202 can be provided by a cloud provider as a platform-as-a-service (PaaS), and the services 212 (e.g., data analysis, visualization, reporting, etc.) can reside and execute on the cloud platform 202 as a cloud-based service. In some such configurations, access to the cloud platform 202 and the services 212 can be provided to customers as a subscription service by an owner of the services 212. Alternatively, cloud platform 202 can be a private or semi-private cloud operated internally by the enterprise, or a shared or corporate cloud environment. An exemplary private cloud can comprise a set of servers hosting the cloud services 212 and residing on a corporate network protected by a firewall.

Cloud services 212 can include, but are not limited to, data storage, data analysis, control applications (e.g., applications that can generate and deliver control instructions to industrial devices 208 and 210 based on analysis of real-time system data or other factors), automation system or process visualization applications (e.g., a cloud-based human-machine interface, or HMI), reporting applications, Enterprise Resource Planning (ERP) applications, notification services, or other such applications. Cloud platform 202 may also include one or more object models to facilitate data ingestion and processing in the cloud.

Ingestion of industrial device data in the cloud platform 202 can offer a number of advantages particular to industrial automation. For one, cloud-based storage offered by the cloud platform 202 can be easily scaled to accommodate the large quantities of data generated daily by an industrial enterprise. Moreover, multiple industrial facilities at different geographical locations can migrate their respective automation data to the cloud for aggregation, collation, collective analysis, visualization, and enterprise-level reporting without the need to establish a private network between the facilities. In another example application, cloud-based diagnostic applications can monitor the health of respective automation systems or their associated industrial devices across an entire plant, or across multiple industrial facilities that make up an enterprise. Cloud-based IIoT control applications can be used to track a unit of product through its stages of production and collect production data for each unit as it passes through each stage (e.g., barcode identifier, production statistics for each stage of production, quality test data, abnormal flags, etc.). Moreover, cloud-based control applications can perform remote decision-making for a controlled industrial system based on data collected in the cloud from the industrial system, and issue control commands to the system. These industrial cloud-computing applications are only intended to be exemplary, and the systems and methods described herein are not limited to these particular applications. The cloud platform 202 can allow software vendors to provide software as a service, removing the burden of software maintenance, upgrading, and backup from their customers.

Figure 3:
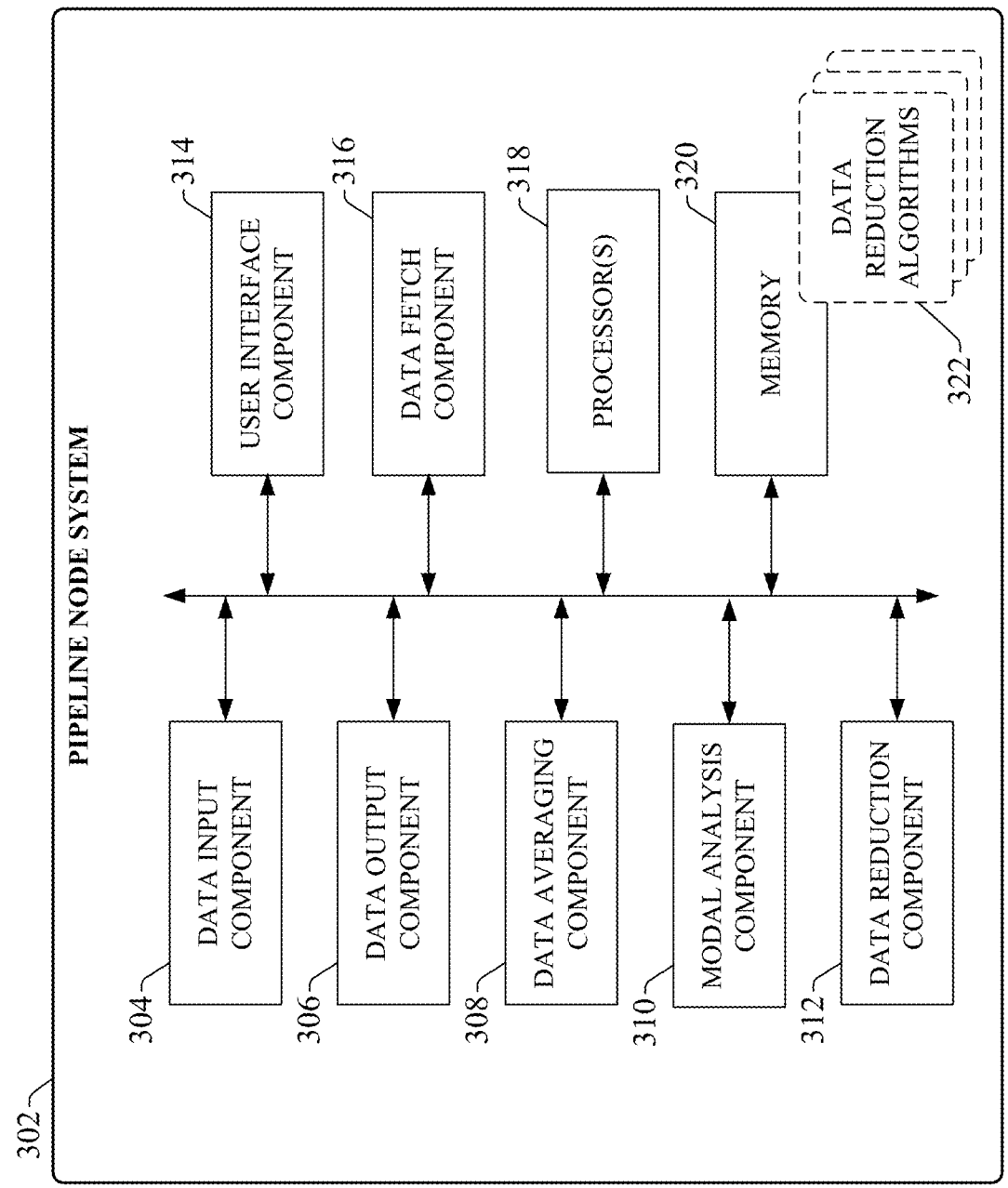
FIG. 3 is a block diagram of an example pipeline node system.

FIG. 3 is a block diagram of an example pipeline node system 302 (also referred to herein simply as a node) according to one or more embodiments of this disclosure. Aspects of the systems, apparatuses, or processes explained in this disclosure can constitute machine-executable components embodied within machine(s), e.g., embodied in one or more computer-readable mediums (or media) associated with one or more machines. Such components, when executed by one or more machines, e.g., computer(s), computing device(s), automation device(s), virtual machine(s), etc., can cause the machine(s) to perform the operations described.

Node system 302, which can be a node of an IIoT data pipeline having at least some of the functions of nodes 104 described above, can include a data input component 304, a data output component 306, a data averaging component 308, a modal analysis component 310, a data reduction component 312, a user interface component 314, a fetch component 316, one or more processors 318, and memory 320. In various embodiments, one or more of the data input component 304, data output component 306, data averaging component 308, modal analysis component 310, data reduction component 312, user interface component 314, fetch component 316, the one or more processors 318, and memory 320 can be electrically and/or communicatively coupled to one another to perform one or more of the functions of the node system 302. In some embodiments, components 304, 306, 308, 310, 312, 314, and 316 can comprise software instructions stored on memory 320 and executed by processor(s) 318. Node system 302 may also interact with other hardware and/or software components not depicted in FIG. 3. For example, processor(s) 318 may interact with one or more external user interface devices, such as a keyboard, a mouse, a display monitor, a touchscreen, or other such interface devices.

Data input component 304 can be configured to receive batches of data from an adjacent upstream node system of the data pipeline or from an edge device 106 (if the node system 302 is the first node of a data pipeline). Data output component 306 can be configured to send data—including both raw data received from the upstream node and a reduced version of the data—to an adjacent downstream node system of the data pipeline in data batches.

The data averaging component 308 can be configured to calculate, for each data tag of a current data batch, a weighted moving average of the time-series data values generated by the data tag. The modal analysis component 310 can be configured to analyze the values of the current batch of time-series data, as well as the weighted moving average calculated by the data averaging component 308, to determine a relative amount of change and a probability distribution (e.g., unimodal, multimodal, no mode, etc.) of the data values for each data tag in the data batch. The data reduction component 312 can be configured to select a data reduction algorithm 322 from multiple defined reduction algorithms 322 based on the distribution determined by the modal analysis component 310, and to apply the selected data reduction algorithm to the data batch to yield a reduced data set.

User interface component 314 can be configured to generate user interface displays on one or more client devices and, and to receive user input and render visual output via these interface displays in any suitable format (e.g., alphanumeric displays, graphical animations, graphs or charts, etc.). Data fetch component 316 can be configured to send a fetch request to a source of archived industrial data (e.g., cloud storage or another high level data repository) requesting a subset of the archived raw data stored on the data source.

The one or more processors 318 can perform one or more of the functions described herein with reference to the systems and/or methods disclosed. Memory 320 can be a computer-readable storage medium storing computer-executable instructions and/or information for performing the functions described herein with reference to the systems and/or methods disclosed.

Although FIG. 3 and examples described herein depict the data reduction and user interface functionality (e.g., components 304, 306, 308, 310, 312, 314, and 316) as being embodied on a node of the data pipeline, in some embodiments the data reduction functionality can be embodied on an edge device (e.g., edge device 106) so that data reduction processing can be applied to the collected data 102 by the edge device prior to injecting the reduced data into the pipeline 114.

Figure 4:
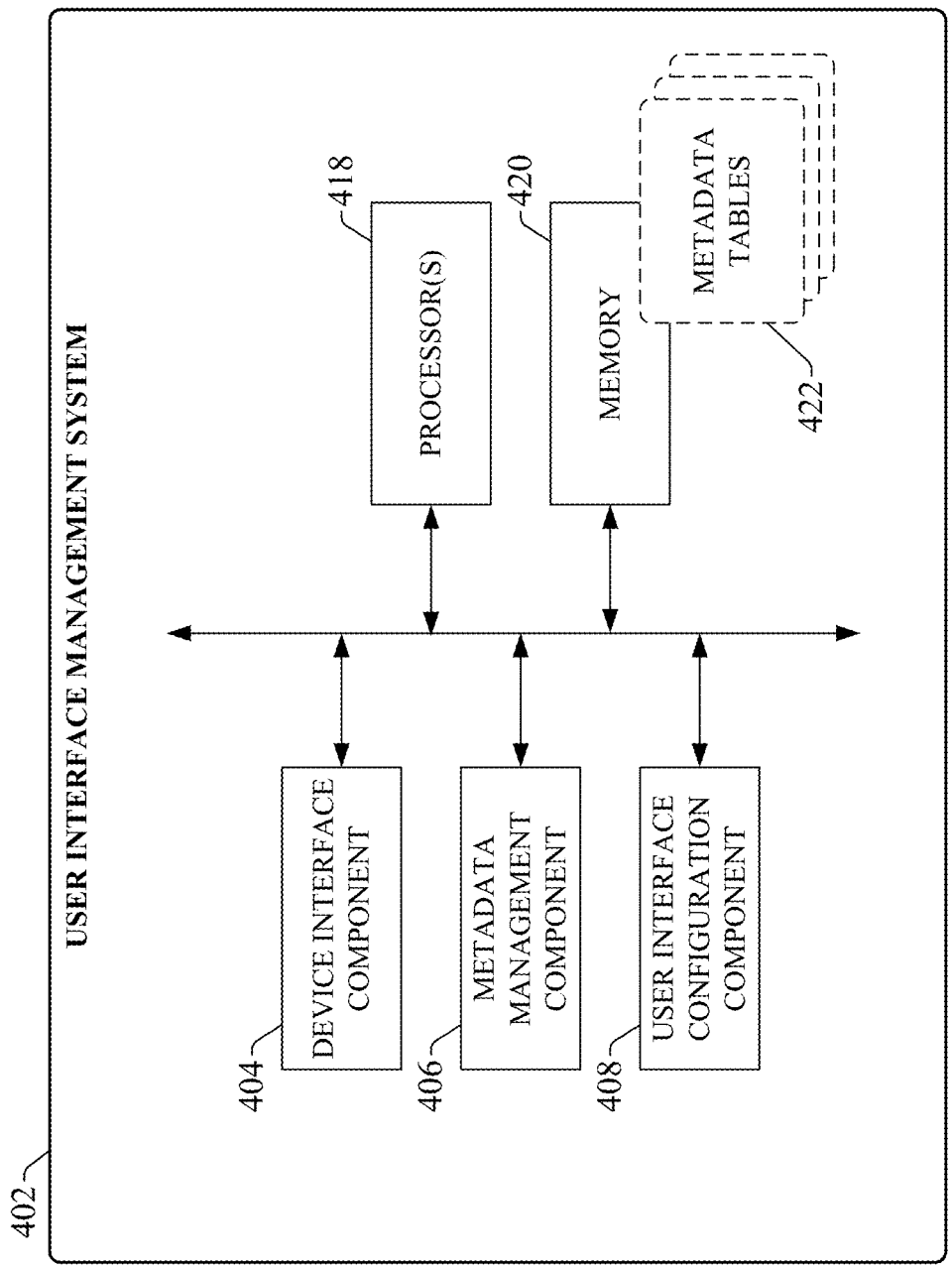
FIG. 4 is a block diagram of an example user interface management system.

FIG. 4 is a block diagram of an example user interface management system 402 according to one or more embodiments of this disclosure. In some embodiments, user interface management system 402 can reside and execute on a cloud platform or another high-level server, and can remotely interface with edge devices 106, pipeline node systems 302, or other devices on which industrial user interface systems are executed. User interface management system 402 can include a device interface component 404, a metadata management component 406, a user interface configuration component 408, one or more processors 418, and memory 420. In various embodiments, one or more of the device interface component 404, the metadata management component 406, the user interface configuration component 408, the one or more processors 418, and memory 420 can be electrically and/or communicatively coupled to one another to perform one or more of the functions of the user interface management system 402. In some embodiments, components 404, 406, and 408 can comprise software instructions stored on memory 420 and executed by processor(s) 418. User interface management system 402 may also interact with other hardware and/or software components not depicted in FIG. 4. For example, processor(s) 418 may interact with one or more external user interface devices, such as a keyboard, a mouse, a display monitor, a touchscreen, or other such interface devices.

Device interface component 404 can be configured to communicatively interface with devices at one or more plant facilities on which data tags are stored and configured. These data tags act as storage containers for industrial data generated by industrial devices or other plant floor devices. In particular, device interface component 404 can be configured to monitor metadata associated with the respective data tags, including visualization metadata that specifies whether the data associated with each tag is to be made available to an operator-level user interface. Metadata management component 406 is configured to update a set of metadata tables 422 based on the visualization metadata for the tags monitored by the device interface component 404. The metadata tables 422 indicate which data tags are to be made available for visualization on operator-level user interfaces. The user interface configuration component 408 can be configured to interface with one or more user interfaces hosted on plant floor devices (e.g., edge devices 106, node systems 302, or other user interface systems) and configure the interfaces to allow selection of data tags from among those specified by the metadata tables 422.

The one or more processors 418 can perform one or more of the functions described herein with reference to the systems and/or methods disclosed. Memory 420 can be a computer-readable storage medium storing computer-executable instructions and/or information for performing the functions described herein with reference to the systems and/or methods disclosed.

Figure 5:
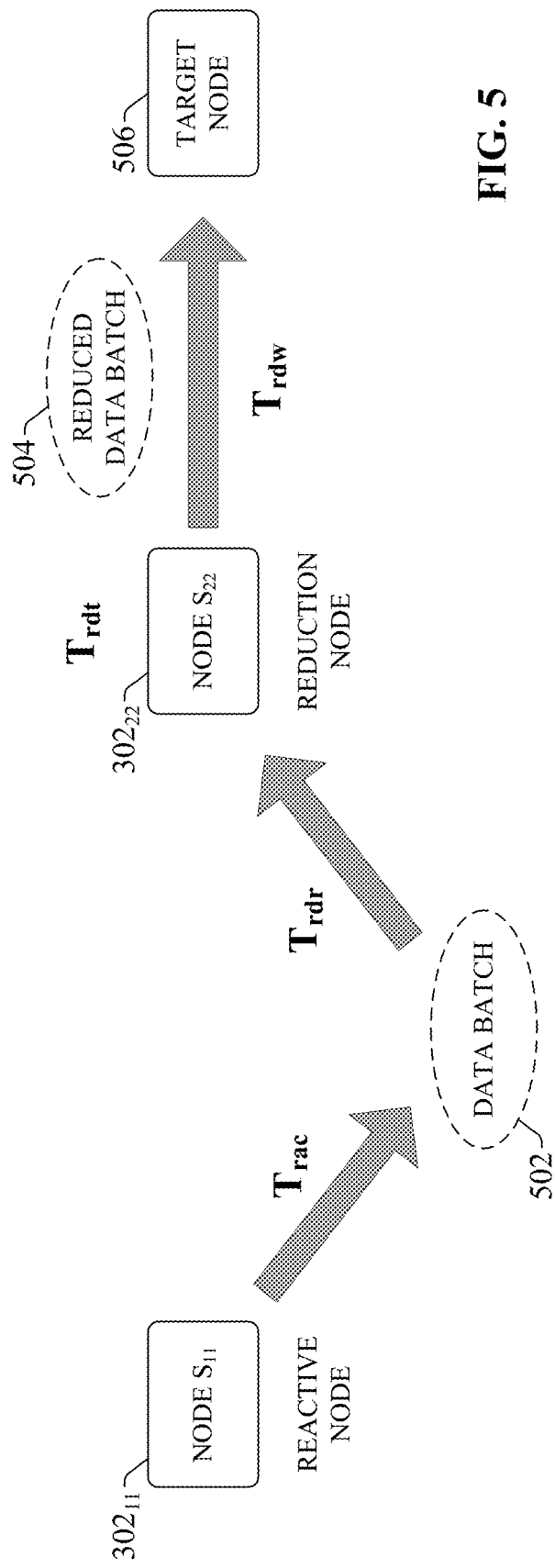
FIG. 5 is a diagram illustrating movement of data across nodes of an IIoT data pipeline.

FIG. 5 is a diagram illustrating movement of data across nodes of an IIoT data pipeline. In this example, pipeline node systems $302_{11}$ and $302_{22}$ are two adjacent nodes of an example IIoT data pipeline. When data is being sent from a node (i.e., node system 302) of a data pipeline to an adjacent downstream node, the node that is sending the data—e.g., node system $S_{11}$ in FIG. 5—is referred to as the reactive node, while the node that receives and acts on the data—e.g., node system $S_{22}$—is referred to as the reduction node. Since nodes that are not at the extreme ends of the pipeline will both receive data from adjacent upstream nodes and send data to adjacent downstream nodes, these nodes act as both reactive and reduction nodes at various stages of their operation within a given data transmission cycle. FIG. 5 also depicts a target node 506, which is adjacent to and downstream from the reduction node $S_{22}$. Target node 506 may be either another node system 302 of the pipeline, or a final storage destination for the data (e.g., a cloud-based storage node). As noted above, node systems 302 may be servers, micro-services, or other processing elements that form the backbone of the IIoT data pipeline.

In-motion data moves from node to node in micro-batches, or data batches. In some embodiments the size of these micro-batches is fixed. In other embodiments, the reactive node system $302_{11}$ ($S_{11}$) can be capable of dynamically adjusting the size of its outgoing data batches 502 based on the processing latency experienced at the adjacent reduction node system $302_{22}$ ($S_{22}$). The processing latency at the reduction node system $302_{22}$ can be characterized by a set of time variables that quantify the times required to perform various tasks associated with processing and moving the data.

For example, $T_{rac}$ represents the time required for the reactive node system $302_{11}$ to collect the data that is to be included in the data batch 502 from an adjacent upstream data source (e.g., an upstream reactive node, one or more IIoT industrial devices, or an edge device 106). In general, this time to collect the data can be given as the product of the size $N_S$ of the incoming data batch and the time $T_u$ required for the reactive node system $302_{11}$ to collect a record for a single data tag of the batch:

$$T_{rac} = N_s * T_u \quad (1)$$

The time required for the reduction node system $302_{22}$ to read the data batch 502 from the reactive node system $302_{11}$ is given by $T_{rdr}$. Upon reading the data batch 502, the reduction node system $302_{22}$ may apply processing to transform the data contained in the data batch 502. In some applications this transformation may include applying data reduction processing to the data in order to reduce the data set. As will be discussed in more detail below, this can include detecting and removing anomalous data or outlier data, as well as applying a selected data reduction algorithm that filters the data based on an amount of change and a probability distribution of the data within the batch. In some scenarios, the reduction node system $302_{22}$ may also process the incoming data batch 502 according to a node-specific application that executes on the node system (e.g., a notification application, an analytic application, etc.). The time required for the reduction node system $302_{22}$ to reduce, process, or otherwise transform the data is given by $T_{rdt}$. The time required for the reduction node system $302_{22}$ to then write the resulting reduced data batch 504 to the target node 506 is represented by $T_{rdw}$. The total time $T_{rd}$ required for the reduction node system $302_{22}$ to receive, process, and send the incoming data batch 502 can thus be given as $$T_{rd} = T_{rdr} + T_{rdt} + T_{rdw} \quad (2)$$

Figure 6B:
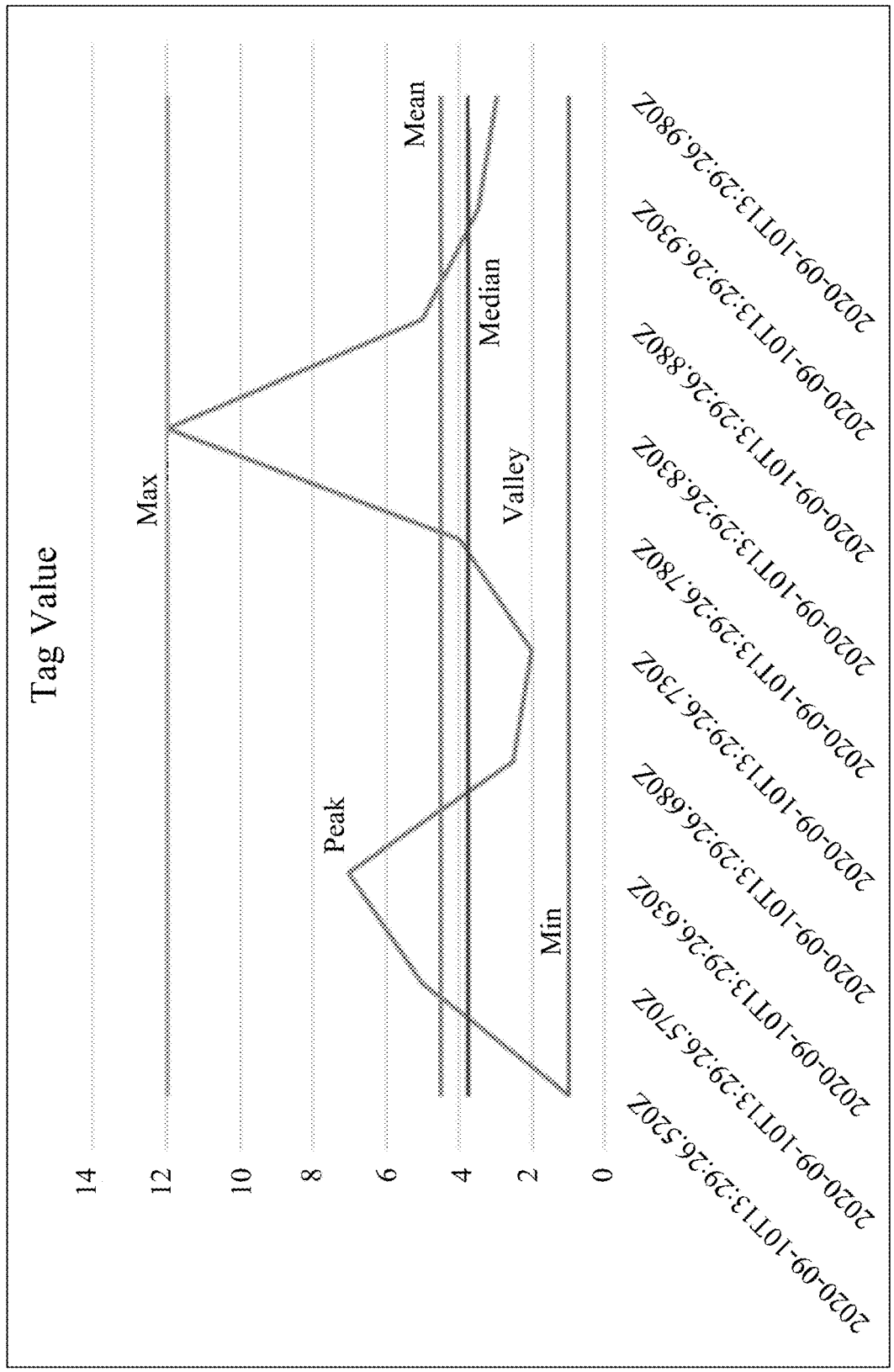

FIG. 6a is a table 602 of an example set of time-series data collected from a data tag of an industrial device, which can be included as part of a data batch being processed by a node system 302 of an IIoT data pipeline. FIG. 6b is a corresponding graph 608 of the time-series data tabulated in FIG. 6a. Data in table 602 may be part of a data batch being processed by a node system 302, and comprises data generated by a data tag of an industrial device (e.g., an industrial controller, a motor drive, a telemetry device, a sensor, etc.) on the plant floor. Although data from only a single data tag is depicted in FIGS. 6a and 6b, a given data batch being processed by a node of an IIoT data pipeline may comprise different sets of time-series data collected from respective different data tags. Each data value 606 has an associated time stamp 604 indicating a time that the data value was generated by the corresponding plant floor device. For illustrative purposes, in addition to the time stamps and tag values that are typically included the time-series data, table 602 also includes columns for the mean value, median value, maximum value, and minimum value of the tag values.

Analysis of the time-series data contained in a batch can yield insights into the degrees of change and the key data values contained in the batch. With reference to FIG. 6b, such analysis can include identification of local peaks and valleys within the data, maximum and minimum values, the mean value, and the median value. Based on these characteristics of the data, the node system 302 can identify whether the time-series data changes significantly over time, and if so, determine a mode of the data based on a probability distribution.

Figures 7A, 7B:
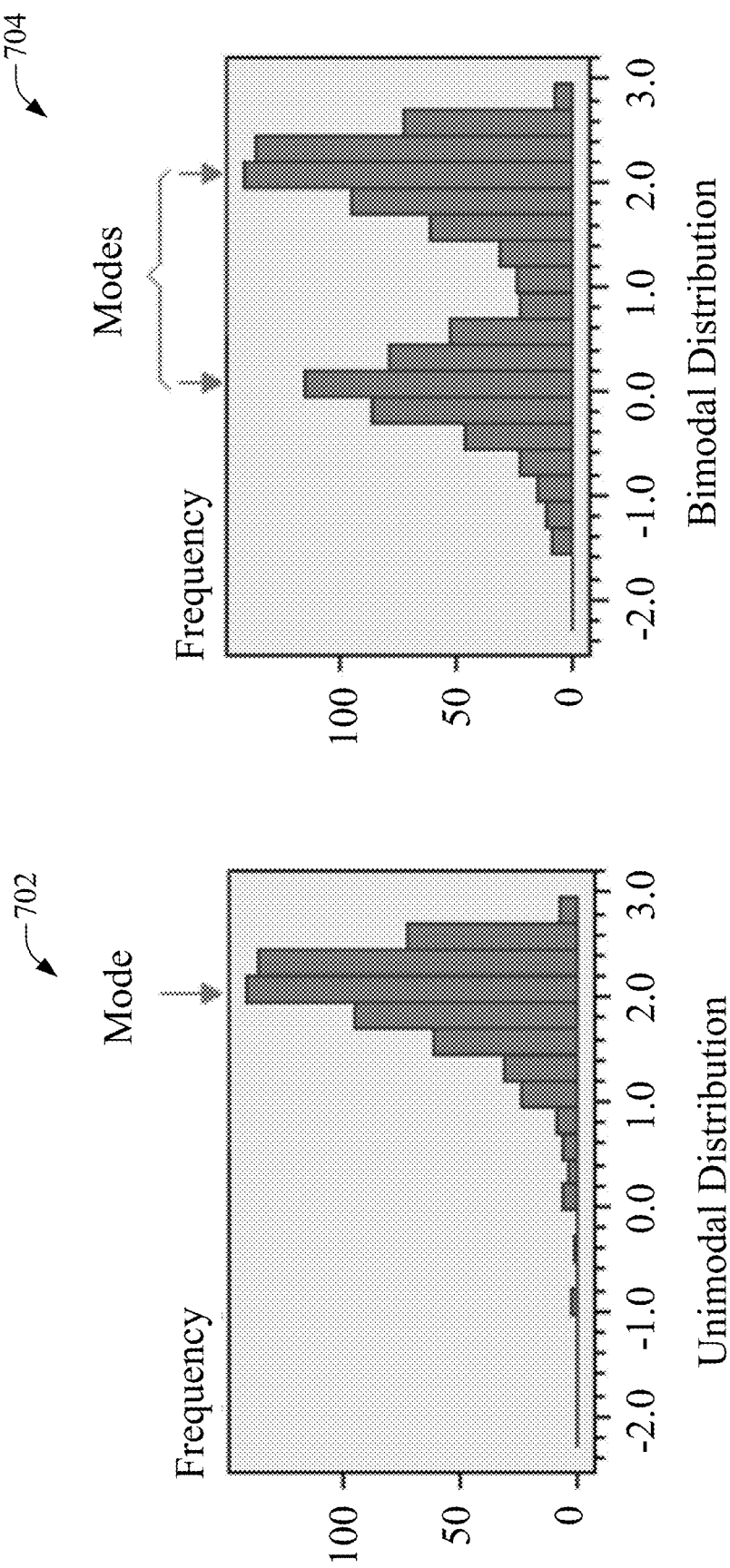
FIG. 7a is a graph representing a unimodal probability distribution.
FIG. 7b is a graph representing a bimodal probability distribution.

FIGS. 7a and 7b are graphs 702 and 704 representing probability distributions for two example sets of data. The probability distribution represents a frequency of each value contained in the data set, or a number of times each value occurs in the data set. Based on this distribution, a data set can be characterized as having a mode if at least one data value has a local peak, which indicates that this data value has a predominance within the data set. Data sets that have such peaks—also referred to as modes—in their probability distributions can be further characterized as being unimodal if only a single peak is present, or multimodal if two or more peaks are present. Graph 702 depicts an example unimodal distribution having a single mode, while graph 704 depicts an example multimodal distribution having two peaks (a bimodal distribution). As will be described in more detail herein, the node system 302 analyzes each data set's probability distribution and, based on results of this analysis, selects a suitable data reduction rule or algorithm to apply to the data set to yield the reduced data set.

Figure 8:
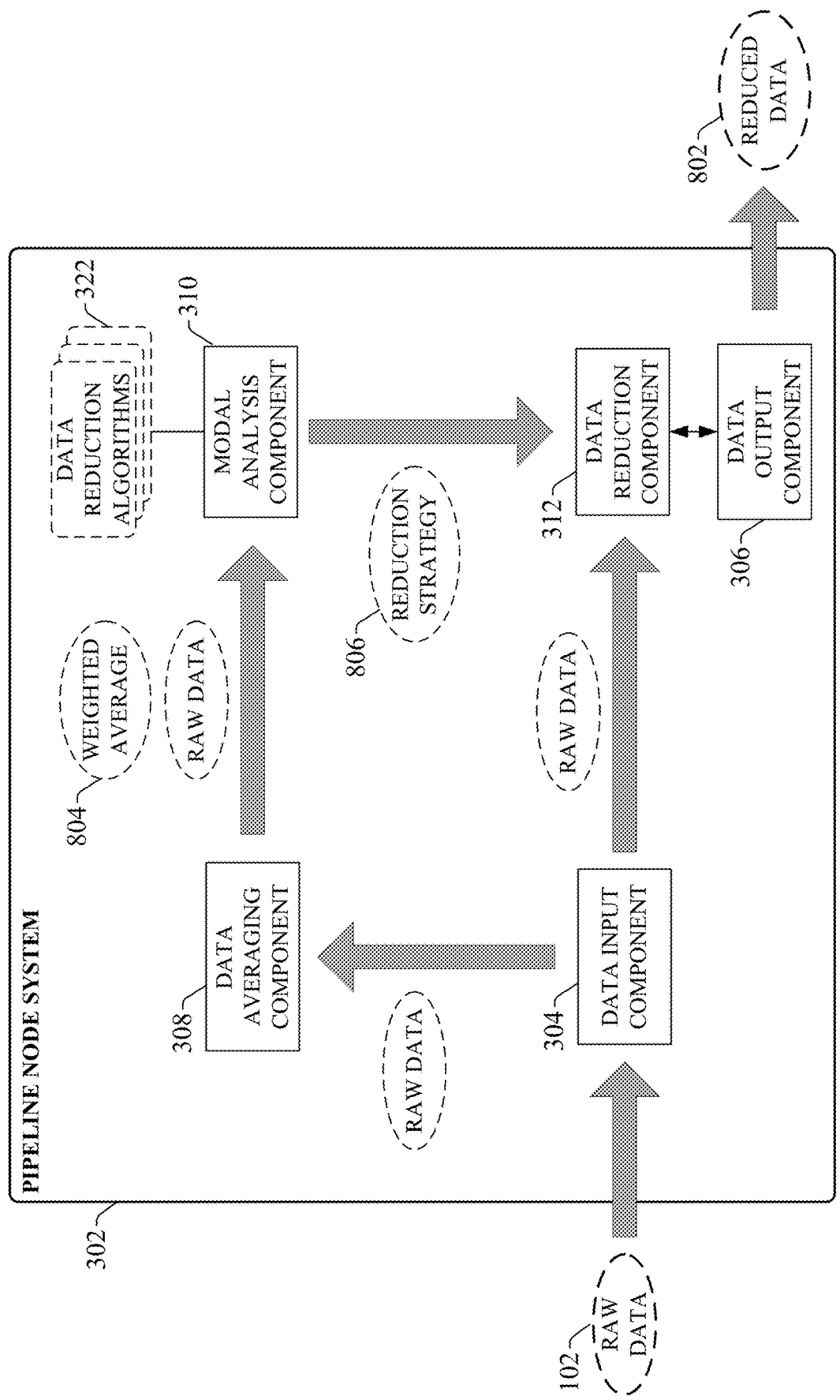
FIG. 8 is a diagram illustrating an example data reduction process that can be carried out by a node system.

FIG. 8 is a diagram illustrating an example data reduction process that can be carried out by node system 302 according to one or more embodiments. Raw data 102 is received by the node system 302 via the data input component 304. The raw data 102 can comprise a data batch sent by an adjacent upstream node or edge device of the data pipeline or, if the data reduction functionality is implemented on an edge device, may be raw data collected directly from data tags of one or more industrial devices on the plant floor. The raw data 102 may comprise, for each data tag, both time-series data values corresponding to a time range represented by the data batch as well as time stamps indicating a time that each of the time-series values was generated. Raw data 102 may also include tag information identifying the data tag from which the data was collected and other such metadata.

The raw data is provided to the data averaging component 308, which determines, for each data tag represented in the batch of raw data 102, a weighted moving average 804 for the data. The weighted moving average is used to determine whether the data values for the data tag vary by only a small amount, and therefore invoke a Small Change data reduction rule. The weighted moving average 804 and the raw data are then provided to the modal analysis component 310 which selects a data reduction algorithm 322 from a library of predefined reduction algorithms based on analysis of the weighted average 804 and the raw data. In general, the modal analysis component 310 selects a data reduction algorithm 322 to be applied to each tag's data based on a determination of whether the time-series values associated with the tag do not change across the time range represented by the raw data 102, a determination of whether the values change by only a small degree, or a determination of the number of modes in the data's distribution.

Once a data reduction algorithm 322 has been selected, the modal analysis component 310 instructs the data reduction component 312 to apply the data reduction strategy 806 defined by the selected data reduction algorithm 322 to the raw data for the data tag. This results in a reduced data set 802 in which items of the raw data 102 considered non-essential are removed. As part of the data reduction process, the data reduction component 312 also maintains an associative link between each item of the reduced data set 802 and the corresponding values of raw data 102 that surround the data item. The data output component 306 then sends the reduced data set 802 to the next node of the pipeline, or to the data's final destination (e.g., a cloud-based visualization, reporting, or analytic application). Data output component 306 can also send the raw data 102 with the reduced data set 802, together with the defined associations or linkages between the reduced data set 802 and the raw data 102.

Figure 9:
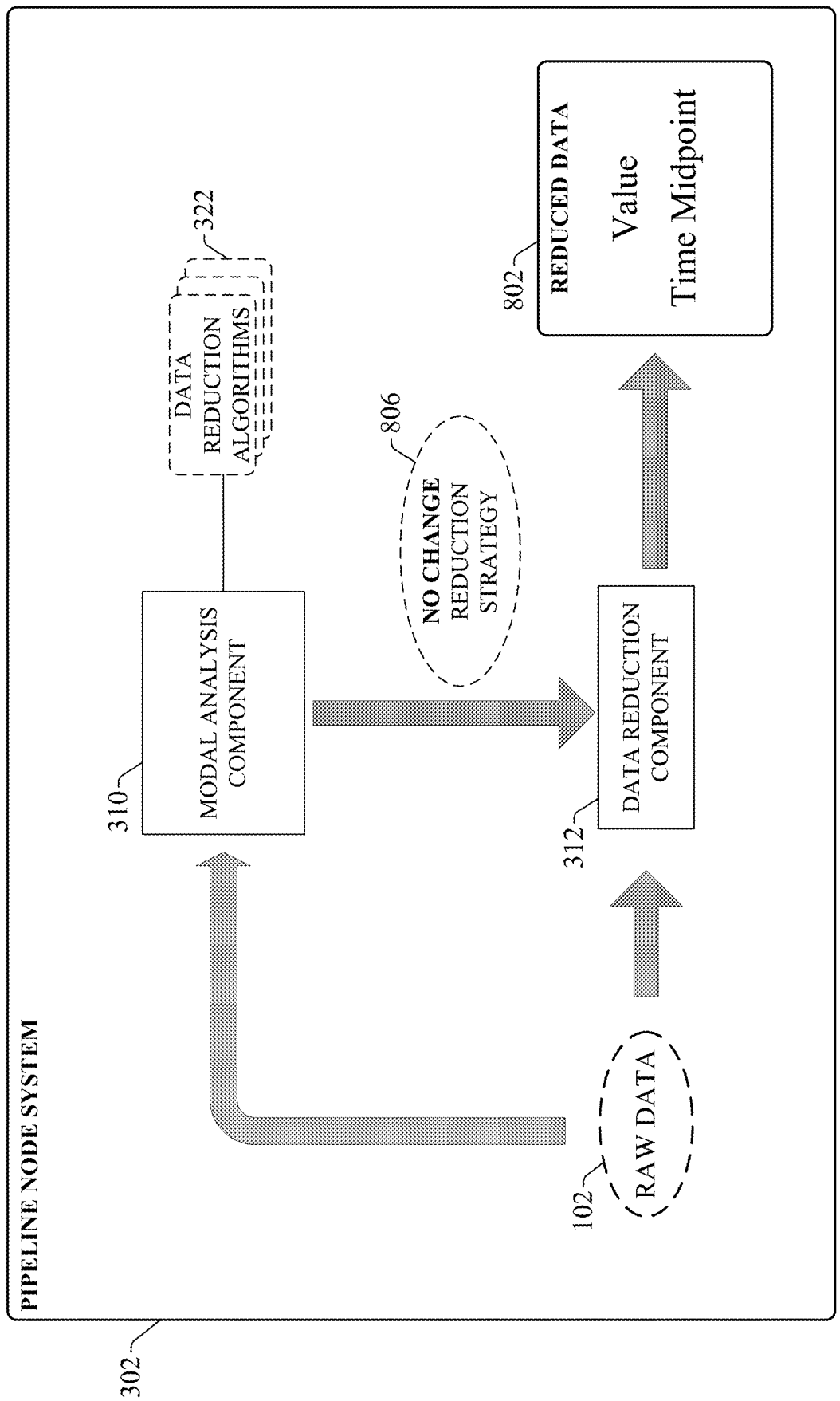
FIG. 9 is a diagram illustrating application of a No Change reduction strategy.

Example data reduction algorithms 322 that can be applied by embodiments of node system 302 for different data distribution scenarios are now described. FIG. 9 is a diagram illustrating application of a No Change reduction strategy 806. When raw data 102 is received by the node system 302, the data input component 304 (not shown in FIG. 9) may pre-process the data 102 in preparation for data reduction analysis. This may include, for example, removing outlier data that is likely to be invalid, sorting or ordering the data according to time stamps, removing non-numerical values, or performing other such pre-processing.

Figure 10:
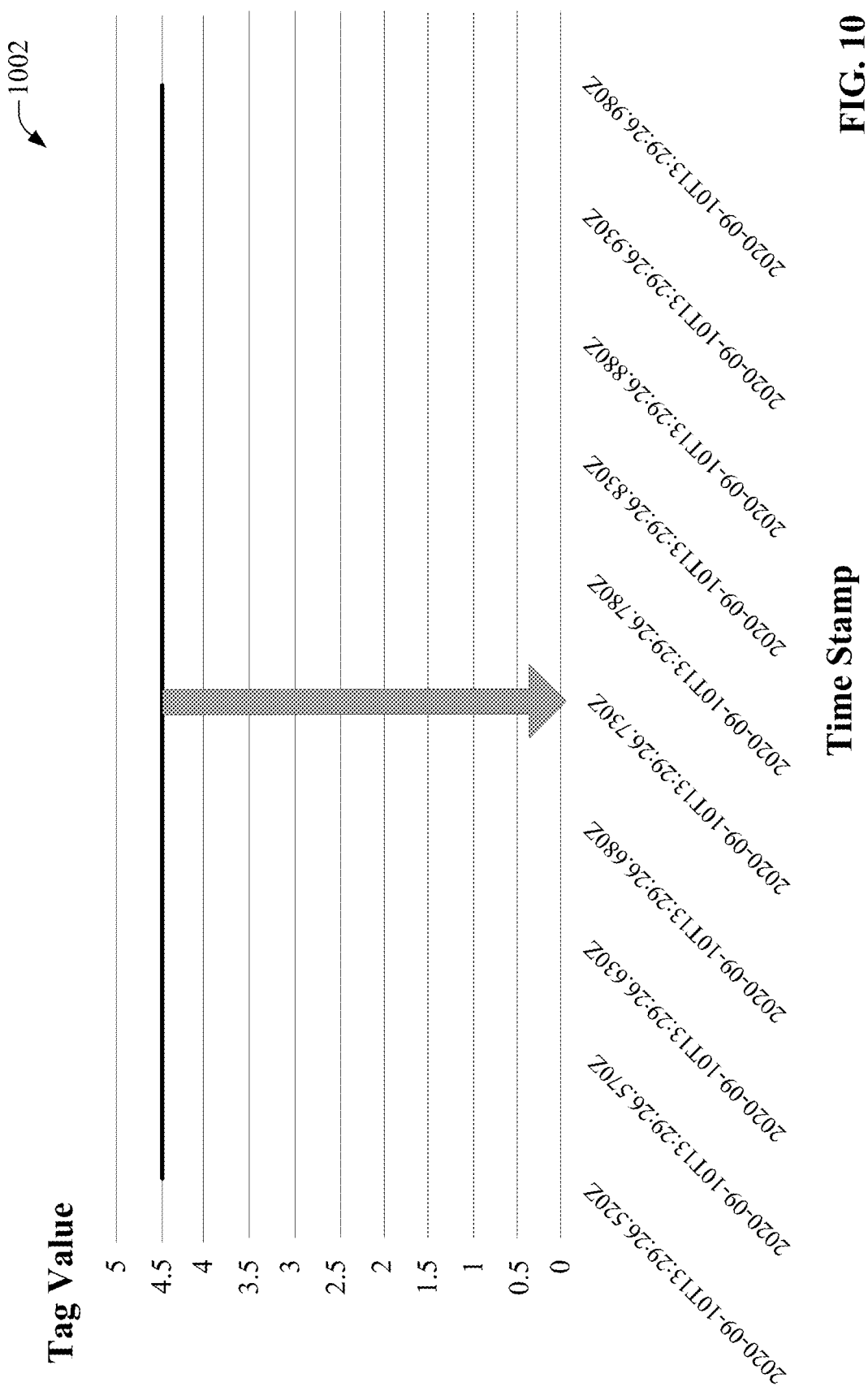
FIG. 10 is a graph of example time-series values of a data tag that invokes a No Change data reduction strategy.

For a given data tag represented in the batch of raw data 102, the modal analysis component 310 selects the No Change reduction strategy 806 from among the data reduction algorithms 322 in response to determining that the values for the data tag are equal for all the time stamps included in the data batch. FIG. 10 is a graph 1002 of example time-series values of a data tag represented in the raw data 102 that invokes a No Change data reduction strategy. As shown in this example, the data tag value remains consistent (V=4.5) across all time stamps. The modal analysis component 310 can use any suitable technique to determine whether the data values are equal for all time stamps; e.g., by determining whether the maximum data value is equal to the minimum value.

Figure 11:
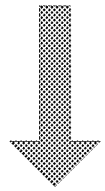
FIG. 11 is a table of raw values of a data tag and a table of the reduced data set after a No Change reduction strategy is applied.

Since the data values remain unchanged for all time stamps included in the batch of raw data, it is considered necessary to send only a single data value from the raw data set as the reduced data set 802. According to the No Change reduction strategy, the reduced data set 802 comprises a single data item or record including the value of the data tag and a time stamp selected from the midpoint, or an approximate midpoint, of the time range included in the data batch, as well as a data tag identifier. FIG. 11 is a table 1102 of the raw values of the data tag and a table 1104 of the reduced data set 802 after the No Change reduction strategy is applied. In this example, the reduced data set represented by table 1104 comprises only the data value and corresponding time stamp selected from the midpoint or approximate midpoint of the time range of the raw data (the data record highlighted in table 902). In this example, the No Change data reduction strategy reduces a batch of raw data 102 comprising 10 data points to a single data point.

Figure 12:
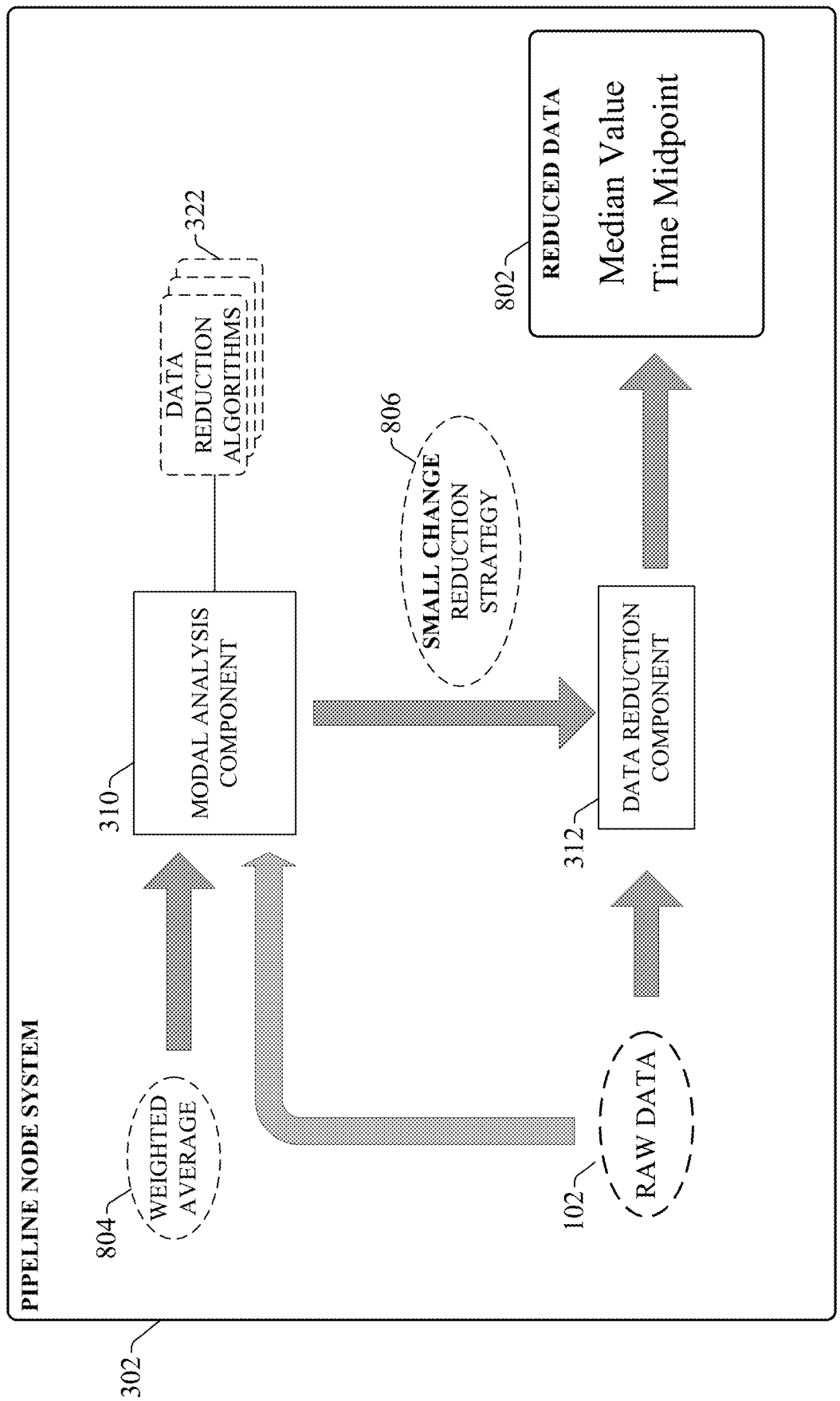
FIG. 12 is a diagram illustrating application of a Small Change reduction strategy.

FIG. 12 is a diagram illustrating application of a Small Change reduction strategy 806. If the modal analysis component 310 determines that a data tag included in the raw data 102 does not invoke the No Change data reduction strategy, the weighted moving average 804 for the raw data 102 is examined. As noted above, for each data tag represented in the current batch of raw data 102, the data averaging component 308 generates a weighted moving average 804 of the data values for that data tag. In some embodiments, the weighted average can be calculated based on an assumption that more recent data—representing more recent events detected on the plant floor—are of greater interest than older data and events. With this in mind, the weighted moving average can weigh more recent values of the data tag more heavily than older values. An example weighted average calculation that can be applied by the data averaging component 308 can be given by:

$$\text{Average} = W_1 * V_{n-1} + W_2 * V_{n-2} + \ldots + W_{k-1} * V_{n-k+1} + W_k * V_{n-k} \quad (3)$$

where k is the number of data items or records in the data batch, $W_i$ is a weighted coefficient between 0 and 1 for i=1 through k, $V_j$ is the value of the data tag at a point in time $T_j$ for j=1 through k, and n is an integer. Other approaches for calculating an average for the time-series data tag values are also within the scope of one or more embodiments.

In equation (3) the values of the weighted coefficients $W_i$ are assumed to decrease as i increases, such that more recent values (e.g., $V_{n-1}$) are weighed more heavily than less recent values (e.g., $V_{n-k}$). In an example scenario in which the data batch comprises five records (that is, k=5), the values of the weighted coefficients $W_i$ may be set as follows:

TABLE 1

| Example values of $W_i$ | |
| --- | --- |
| $W_1$ | 0.3 |
| $W_2$ | 0.25 |

TABLE 1-continued

Example values of $W_i$

| | |
|---|---|
| $W_3$ | 0.2 |
| $W_4$ | 0.15 |
| $W_5$ | 0.1 |

The weighted moving average 804 for a data tag represented in the batch of raw data 102 can be used to determine whether the data tag value varies by only a small amount across the entire time range represented by the data batch. For example, a delta value representing the upper and lower bounds of a small change can be defined relative to the mean value of the data values, and each value $V_n$ of the data tag can be compared with these upper and lower bounds to determine whether all values V are within the range. That is, for each value $V_n$ of the data tag, the modal analysis component 310 can determine whether the following condition is satisfied:

$$|Vn\text{-Average}|<\text{Delta} \quad (4)$$

where Average is calculated based on equation (3) or another suitable formula for determining an average value. According to condition (4), the data values are assumed to satisfy the Small Change criterion if all the values are within a maximum deviation from the mean value.

Figure 13:
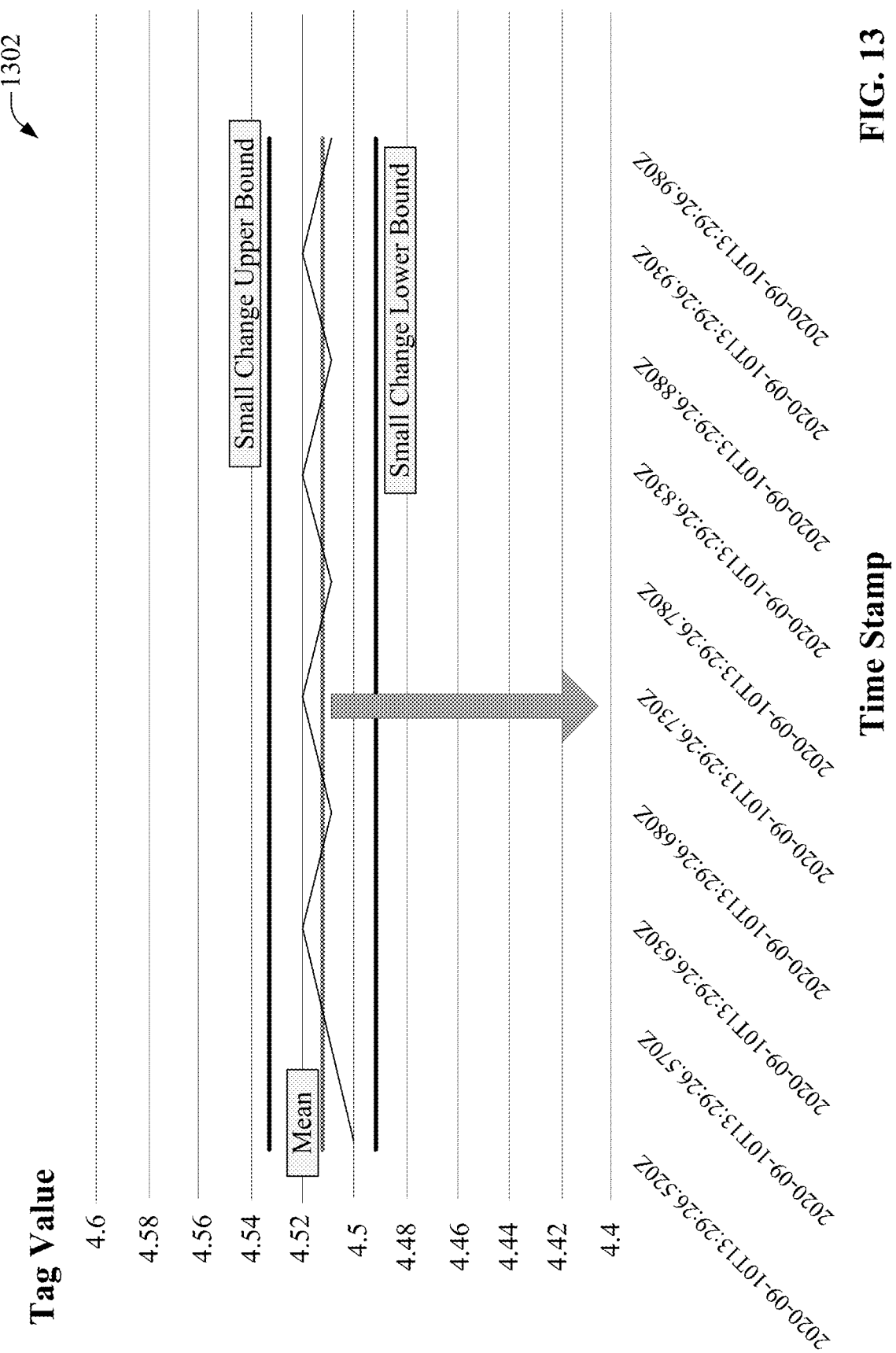
FIG. 13 is a graph of example time-series values of a data tag that invokes a Small Change data reduction strategy.

If modal analysis component 310 determines that the absolute value of the difference between each value $V_n$ of the data tag and the average value is less than the defined delta value, per condition (4), for all n values, the modal analysis component selects and applies the Small Change reduction strategy to the values. FIG. 13 is a graph 1302 of example time-series values of a data tag represented in the raw data 102 that invokes a Small Change data reduction strategy. In this example, the time-series data oscillates around a mean value (represented by the horizontal grey line labeled Mean), which is calculated by the modal analysis component 310 using equation (3) or a variation thereof. The horizontal lines labeled Small Change Upper Bound and Small Change Lower Bound are offset from the Mean line by delta value in the positive and negative y-axis directions, and represent the delta value that determines whether the changes in the time-series data over time are small enough to be classified as a small change. If all values of the data tag remain between the Small Change Upper and Lower Bounds (that is, none of the tag values deviate from the mean in excess of the delta value), the modal analysis component 310 selects the Small Change reduction strategy, which is applied to the raw data 102 by the data reduction component 312. According to the Small Change reduction strategy, the reduced data set 802 includes only the mean value of the data tag together with a time stamp selected from the midpoint or approximate midpoint of the time range, as well as a data tag identifier.

Figure 14:
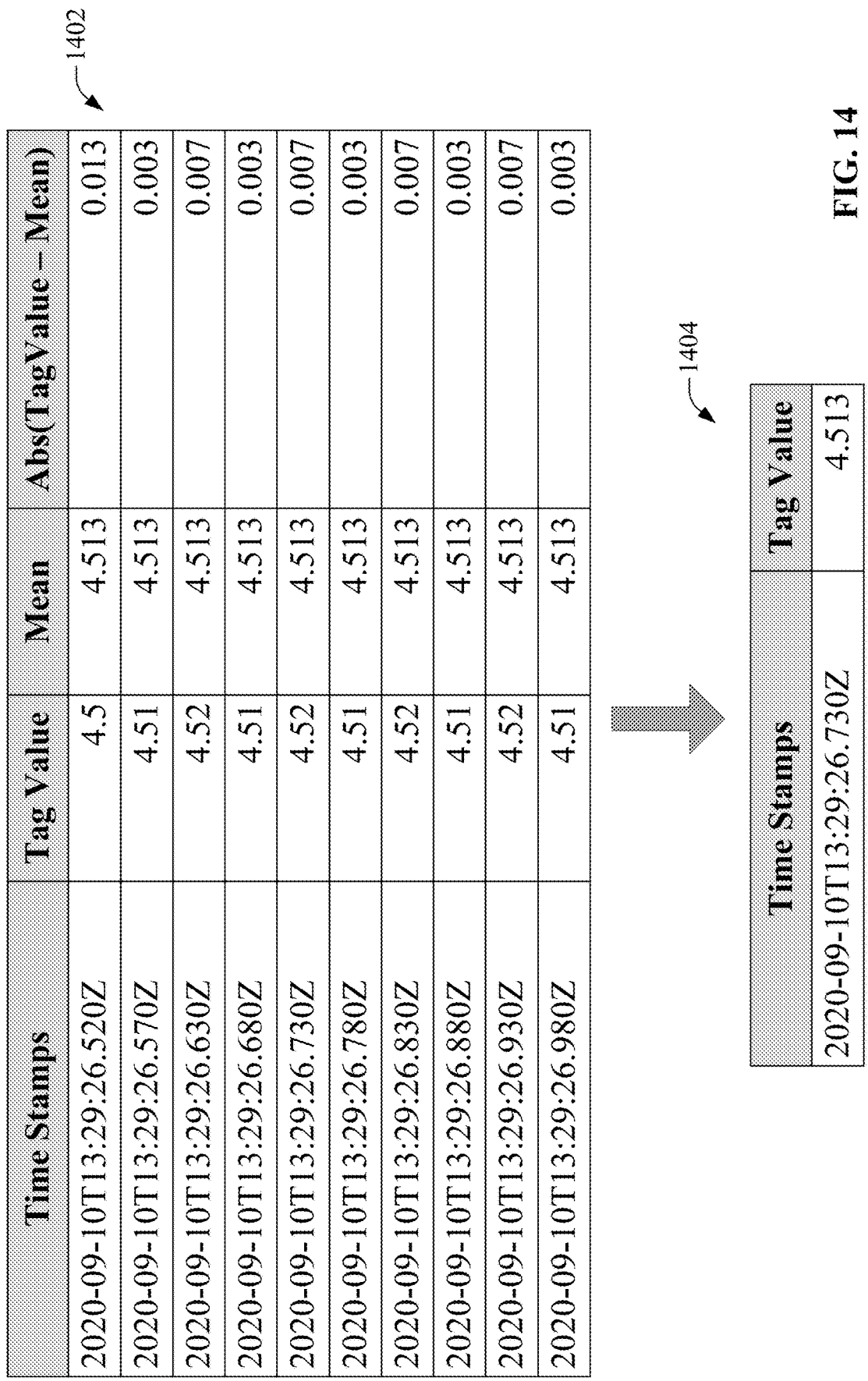
FIG. 14 is a table of example raw values of a data tag and a table of the reduced data set after a Small Change reduction strategy is applied.
Figure 15:
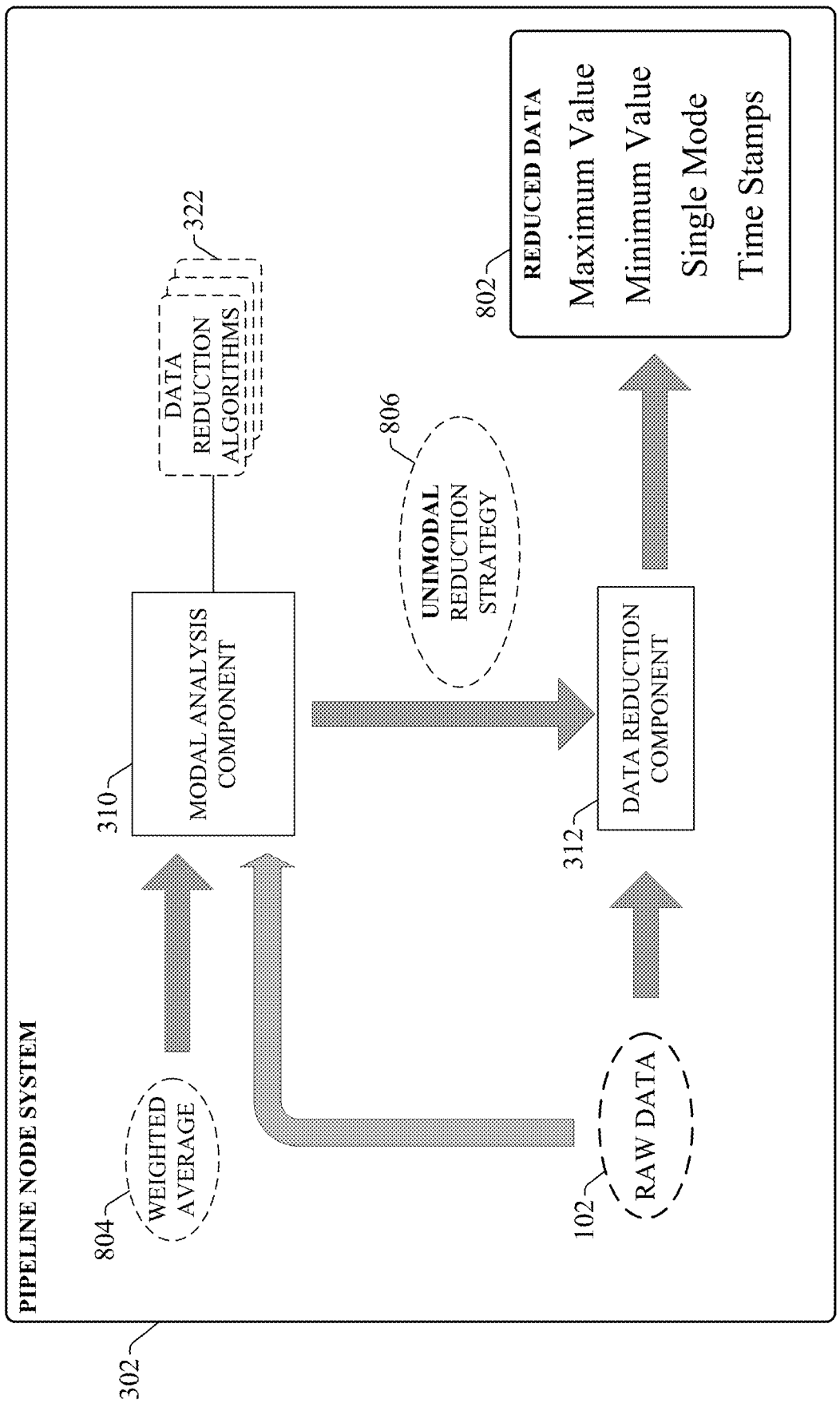
FIG. 15 is a diagram illustrating application of a Unimodal reduction strategy.

FIG. 14 is a table 1402 of example raw values of the data tag and a table 1404 of the reduced data set 802 after the Small Change reduction strategy is applied. For illustrative purposes, table 1402 also includes columns for the mean value (4.513 in this example) and the absolute value of the difference between each value $V_n$ and the mean. Since each value of the absolute value of the difference between each tag value $V_n$ and the mean is less than the defined delta (0.02 in this example), the mode analysis component applies the Small Change reduction strategy to the data, whereby the reduced data set 802 (represented by table 1404) comprises the mean value of the data (4.513) and a time stamp selected from the midpoint or approximate midpoint of the time range represented by the raw date 102. For the illustrated data sample, this reduces the example data sample comprising ten data points to a single data point.

Figure 16:
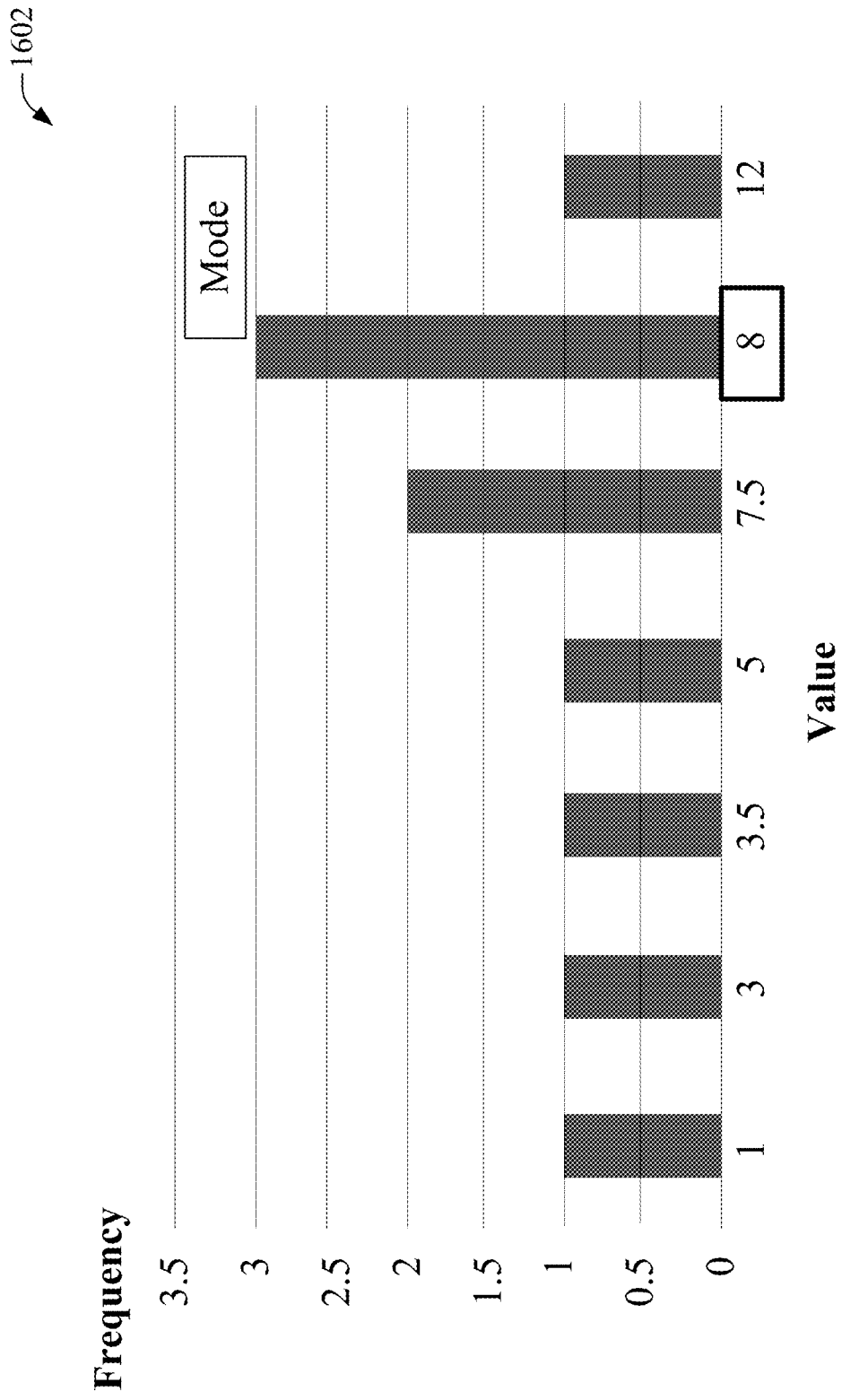
FIG. 16 is a bar chart of a probability distribution for an example set of raw data.

FIG. 14 is a diagram illustrating application of a Unimodal reduction strategy 806. Modal analysis component 310 applies the Unimodal reduction strategy in response to determining that the probability distribution of the data values for the data tag vary in excess of the small change criterion discussed above, and that the distribution has only a single mode. To this end, modal analysis component 310 generates a probability distribution for each data tag in the raw data 102 and identifies the presence of modes within the distribution. FIG. 16 is a bar chart 1602 of a probability distribution for an example set of raw data 102. For a set of data comprising multiple distinct values, the distribution represents the number of occurrences, or frequency, of each distinct value in the raw data 102. As noted above, a mode is a local peak within this distribution, indicating a value that occurs more frequently than its nearest neighbor values. In the example depicted in FIG. 16, a mode corresponding to the value $V_n=8$ is present. This value occurs three times within the raw data 102, more than any of the other values present in the raw data 102. Since this is the only mode present in the data set, modal analysis component 310 selects the Unimodal data reduction strategy, which is applied to the raw data 102 by the data reduction component 312.

Figure 17:
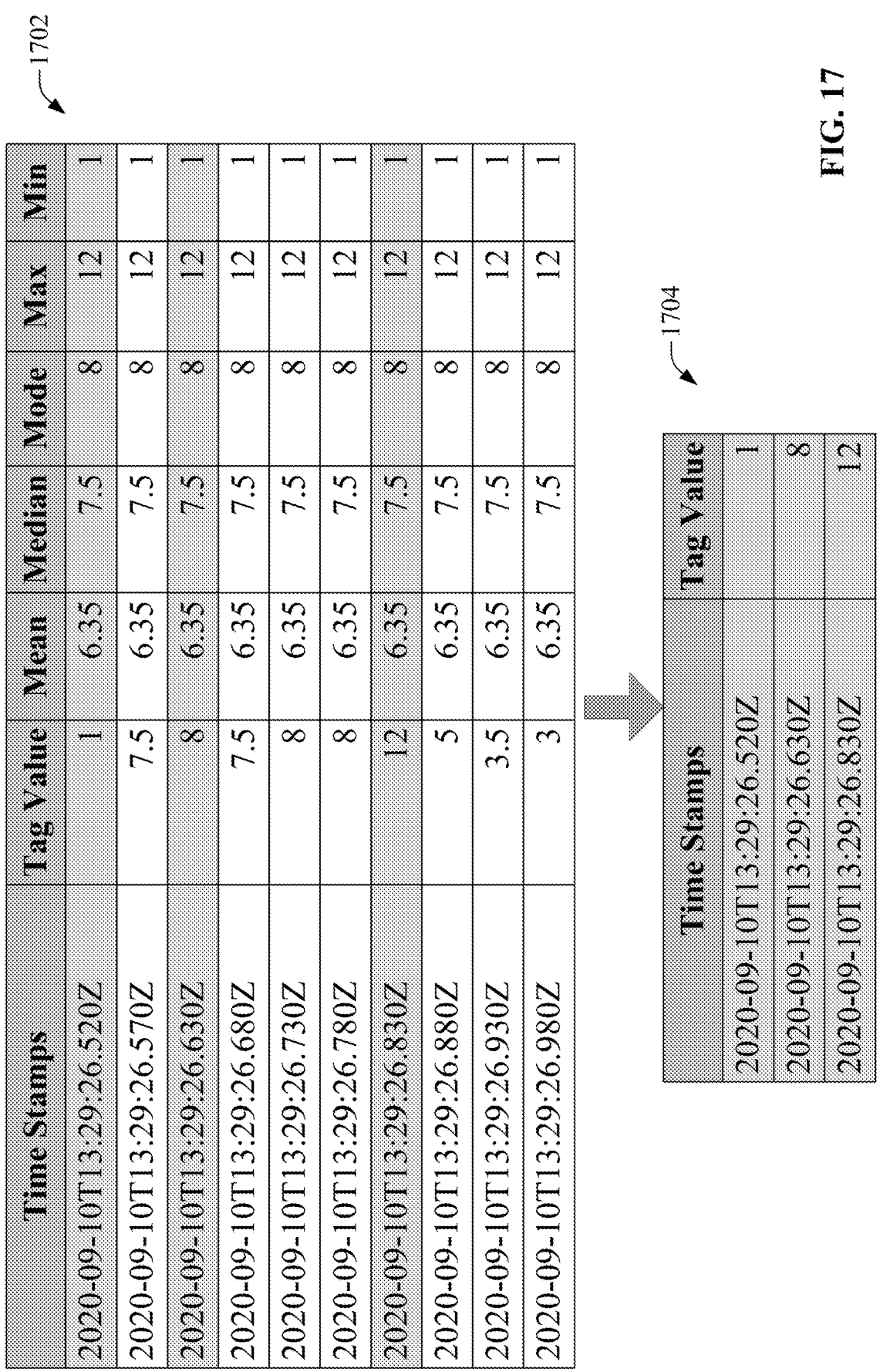
FIG. 17 is a table of example raw values of a data tag and a table of the reduced data set after a Unimodal reduction strategy is applied.

According to the Unimodal data reduction strategy, the reduced data set 802 comprises the maximum value of the data set, the minimum value of the data set, and the mode, together with the time stamps associated with each of these values and a data tag identifier. FIG. 17 is a table 1702 of example raw values of the data tag and a table 1704 of the reduced data set 802 after the Unimodal reduction strategy is applied. For illustrative purposes, table 1702 also includes columns for the mean, median, mode, maximum, and minimum values. As noted above, data records corresponding to the maximum value, minimum value, and mode value—highlighted in table 1702—are selected for inclusion in the reduced data set 802 (represented by table 1704) together with their corresponding time stamps. Although the mode value occurs in the data set multiple times, only one of the data records corresponding to the mode value is selected. In some embodiments, the data reduction component 312 may select an instance of the mode value from the midpoint or approximate midpoint of the occurrences of the mode value, together with its corresponding time stamp, for inclusion in the reduced data set 802. Alternatively, the data reduction component 312 may select the data record corresponding to the first instance in time at which the mode value occurs. Thus, the Unimodal strategy reduces the raw data 102 to three data points in the reduced data set 802.

Figure 18:
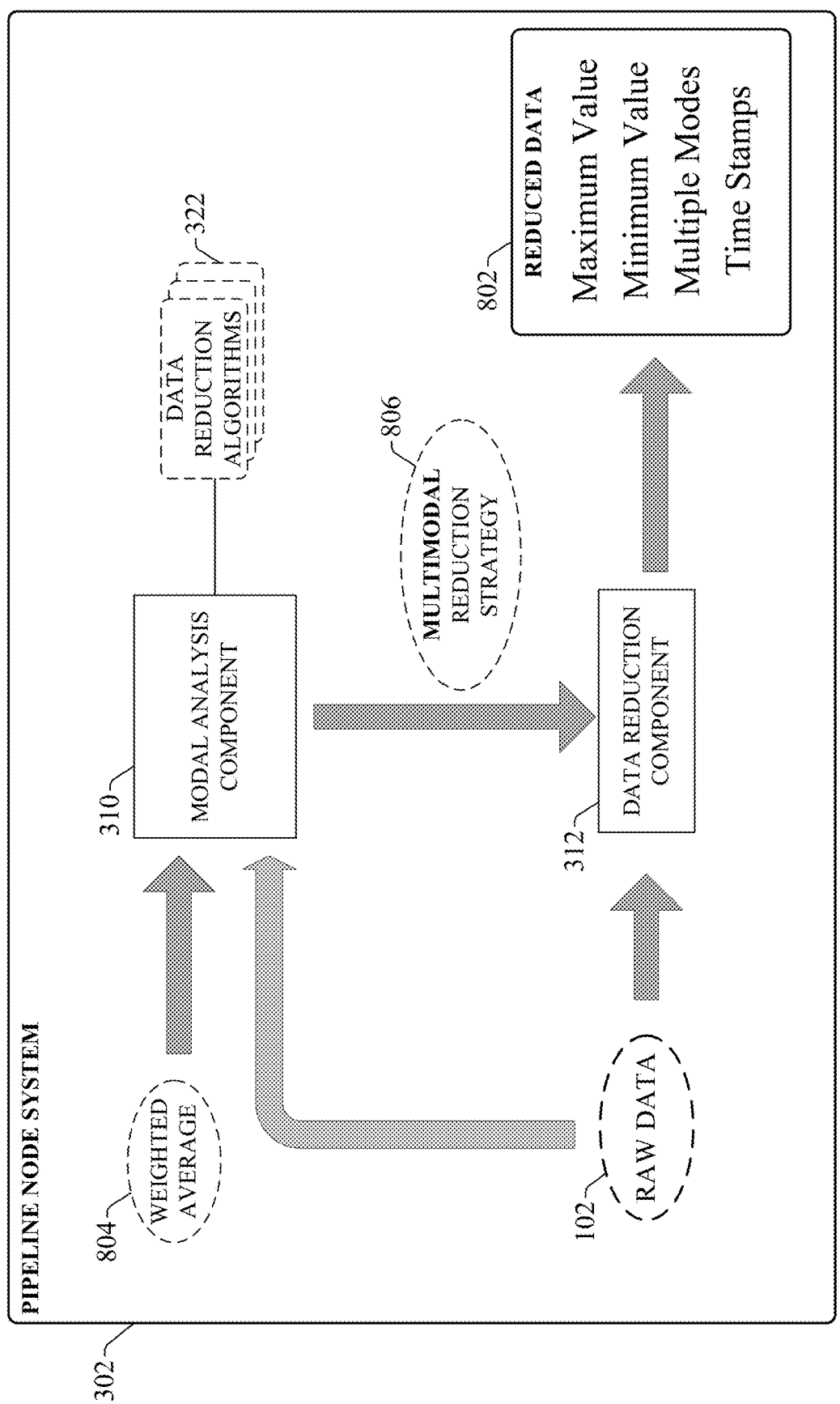
FIG. 18 is a diagram illustrating application of a Multimodal reduction strategy.
Figure 19:
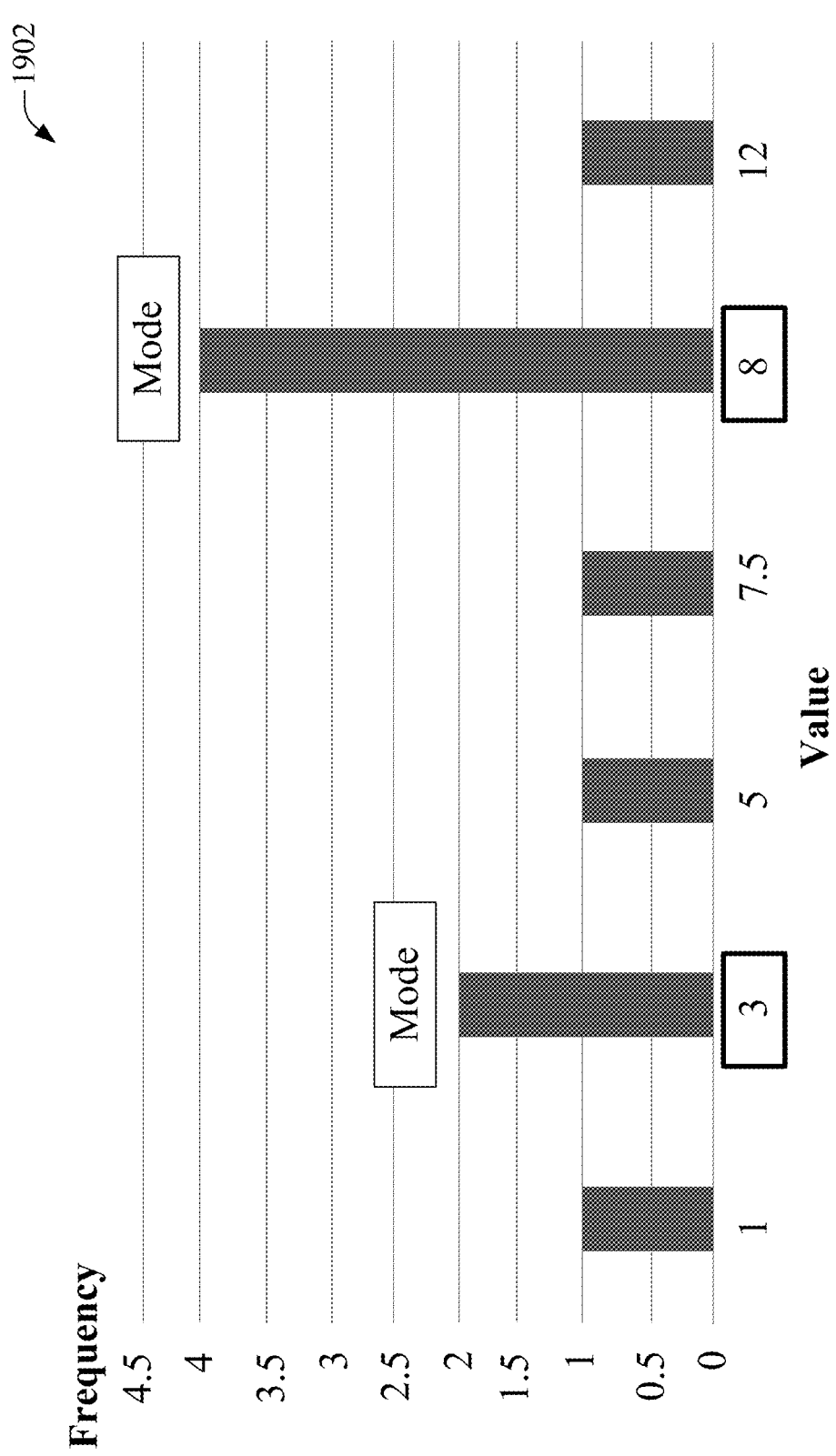
FIG. 19 is a bar chart of a probability distribution for an example set of raw data having two modes (a bimodal distribution).

FIG. 18 is a diagram illustrating application of a Multimodal reduction strategy 806. As in the example unimodal scenario described above, upon determining that the raw data 102 for a data tag does not invoke the No Change or Small Change data reduction strategies, the modal analysis component 310 generates a probability distribution of the raw data and identifies the modes of the resulting distribution. FIG. 19 is a bar chart 1902 of a probability distribution for an example set of raw data 102 having two modes (a bimodal distribution). In this example, the modal analysis component identifies two modes, or local peaks, within the distribution, corresponding to values 3 and 8. In response to determining that more than one mode is present, the modal analysis component 310 selects the Multimodal data reduction strategy, and data reduction component 312 applies this strategy to the raw data 102.

Figure 20:
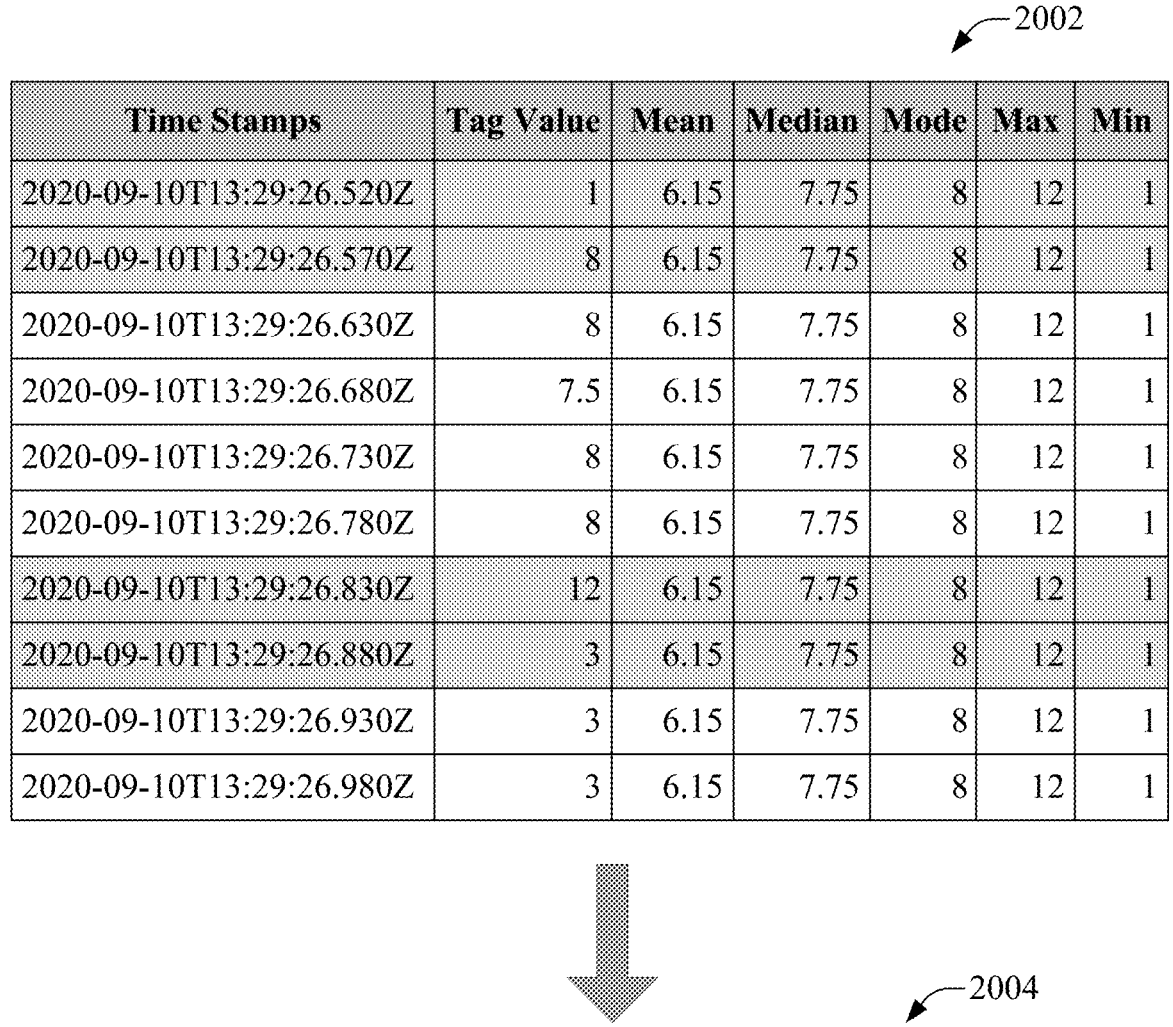
FIG. 20 is a table of example raw values of a data tag and a table of the reduced data set after a Multimodal reduction strategy is applied.

According to the Multimodal data reduction strategy, the reduced data set 802 comprises the maximum and minimum values of the raw data 102, the values corresponding to each of the modes found in the raw data's probability distribution, the time stamps corresponding to each of these data values, and the data tag identifier. FIG. 20 is a table 2002 of example raw values of the data tag and a table 2004 of the reduced data set 802 after the Multimodal reduction strategy is applied. For illustrative purposes, table 2002 also includes columns for the mean value, the median value, the most frequent mode value, the maximum value, and the minimum value. In this bimodal example, data reduction component 312 selects, for inclusion in the reduced data set 802, the highlighted data records corresponding to the maximum value (12), the minimum value (1), and the values associated with the two modes (8 and 3), as well as the time stamps corresponding to each of these values. As in the Unimodal scenario, the mode values selected for inclusion in the reduced data set 802 can comprise the mode values in the midpoint or approximate midpoint of the range of corresponding mode values. Alternatively, the selected mode values may be the instances of the respective mode values that occur earliest in time. In this bimodal example, the reduced data set 802 (represented by table 2004) comprises four data points. However, if more than two modes are present, the reduced data set 802 will include additional data values so that each mode is represented.

Figure 21:
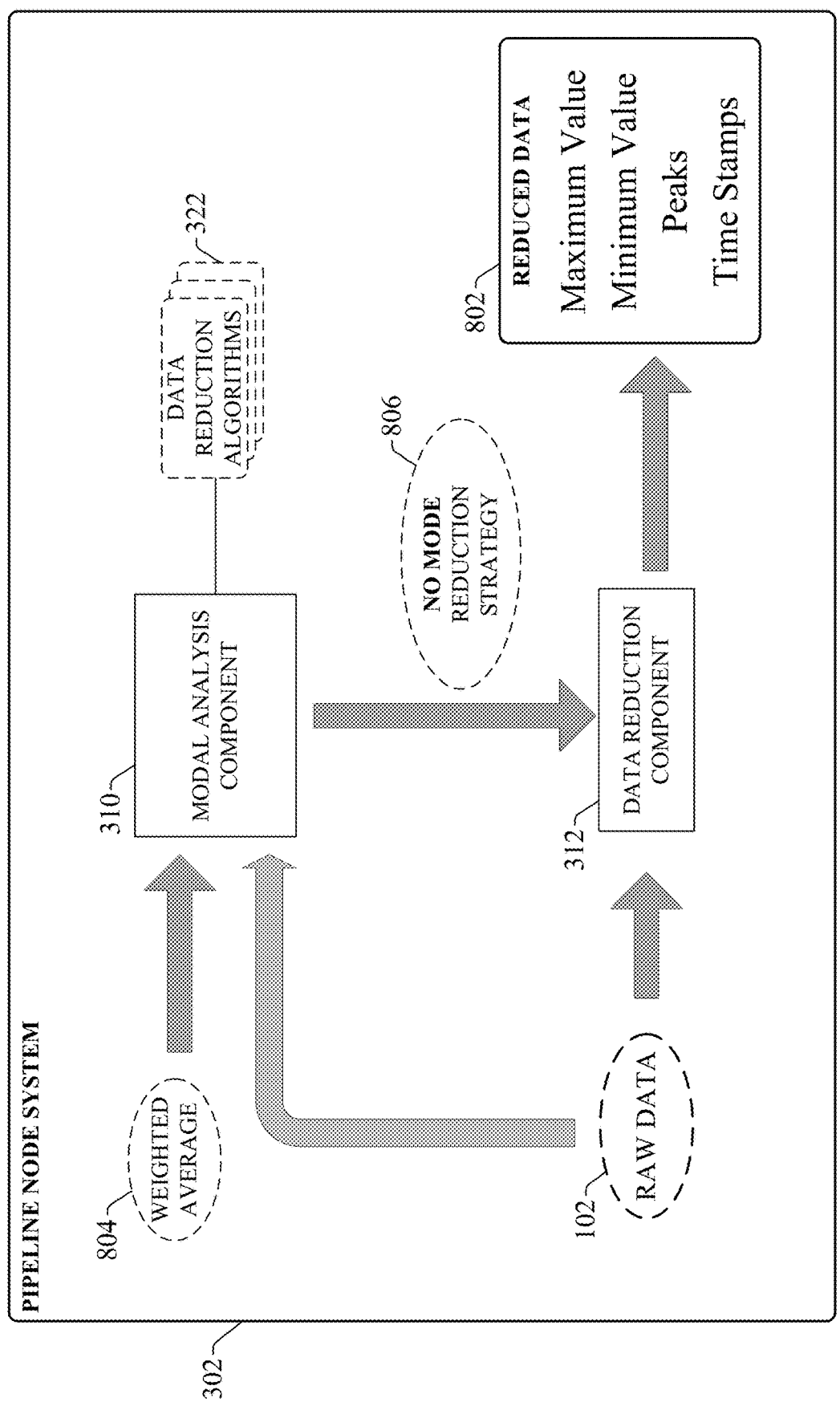
FIG. 21 is a diagram illustrating application of a No Mode reduction strategy.

The node system 302 may also define a data reduction strategy for scenarios in which the raw data 102 does not satisfy the No Change or Small Change criteria, but also does not have a mode. FIG. 21 is a diagram illustrating application of such a No Mode reduction strategy 806. In response to determining that the raw data 102 for a data tag does not invoke the No Change or Small Change data reduction strategies, the modal analysis component 310 generates a probability distribution of the raw data, as in the Unimodal and Multimodal scenarios. In this example, however, the modal analysis component 310 detects no mode within the resulting distribution. This may the case, for example, in sets of raw data 102 whose values vary constantly with no repeating values across the entire time range represented by the data batch, as in the example data set depicted in FIGS. 6a and 6b.

Figure 22:
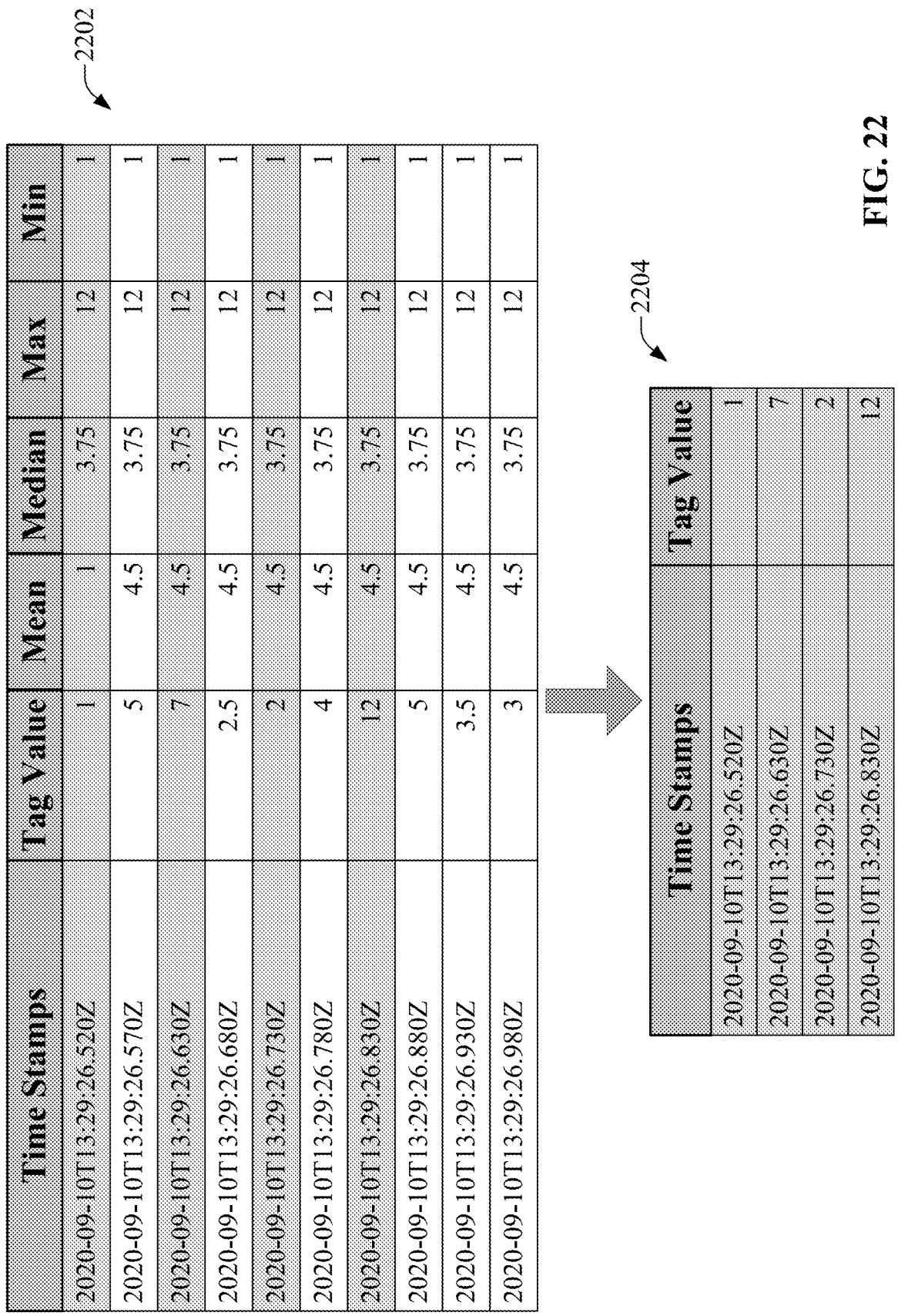
FIG. 22 is a table of example raw values of a data tag and a table of the reduced data set after a No Mode reduction strategy is applied.

In response to determining that no modes are present in raw data's distribution, the modal analysis component 310 selects the No Mode data reduction strategy, and the data reduction component 312 applies the selected strategy to the raw data 102. According to the No Mode reduction strategy, the reduced data set 802 comprises the maximum value, the minimum value, any local peak and/or local valley values contained in the raw data 102, the time stamps corresponding to these values, and data tag identifier. FIG. 22 is a table 2202 of example raw values of the data tag (with columns including the mean, median, maximum, and minimum values added for illustrative purposes) and a table 2204 of the reduced data set 802 after the No Mode reduction strategy is applied. The example raw data in this example corresponds to graph 608 illustrated in FIG. 6b. In this example, the reduced data set 802 represented by table 2204 includes the maximum and minimum values (12 and 1) of the raw data 102 included in the current batch, as well as a local peak (7) and a local valley (2) (the data records highlighted in table 2102). In some embodiments, the No Mode strategy may only include the maximum, minimum, and local peaks—omitting the local valleys—if only the peaks are of interest to the cloud-side applications. In yet other embodiments, the No Mod strategy may include the maximum, minimum, and local valleys, omitting the peaks.

Figure 23:
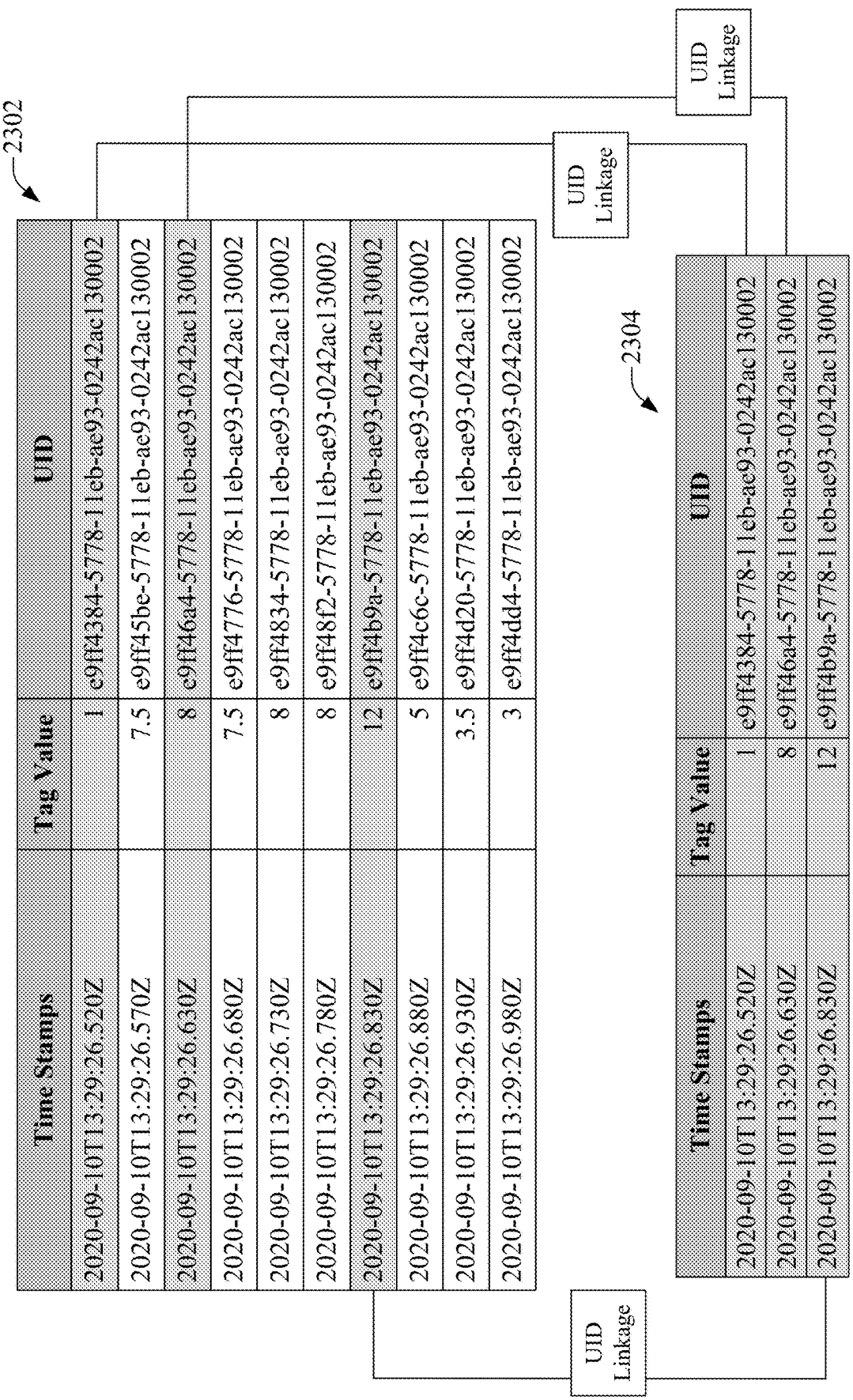
FIG. 23 depicts a table representing an example set of raw data and a table depicting a reduced data set that has been generated based on a selected data reduction strategy.

As noted above, in addition to reducing the raw data 102 in accordance with the data reduction strategy selected by the modal analysis component 310, the data reduction component 312 also defines an association between each item of the reduced data set 802 and the subset of the raw data 102 surrounding the data item. FIG. 23 depicts a table 2302 representing an example set of raw data and a table 2304 depicting a reduced data set that has been generated by the data reduction component 312 based on a selected data reduction strategy. In addition to creating the reduced data set represented by table 2304, the data reduction component 312 also defines associations or linkages between each data record of the reduced data set (table 2304) and its corresponding record in the raw data set (table 2302). To this end, the data reduction component 312 can generate and add a unique identifier (UID) to each item of raw data (the UID column in table 2302) as the raw data 102 is received at the node system 302. The UID uniquely identifies its corresponding item of raw, such that the UID for a given item of raw data is unique to that data item. This UID will be propagated through the pipeline 114 together with its corresponding item of raw data 102.

During the data reduction process, when an item of the raw data is selected for inclusion in the reduced data set, the UID for the selected data item is copied with the data item to the reduced data set and maintains its association with the data record. This creates a linkage between each data record in the reduced data set and its corresponding data record in the raw data set by virtue of the common UID between the two records. These linkages are represented by the lines in FIG. 23 that connect each data record in table 2304 with its corresponding data record in table 2302.

Figure 24:
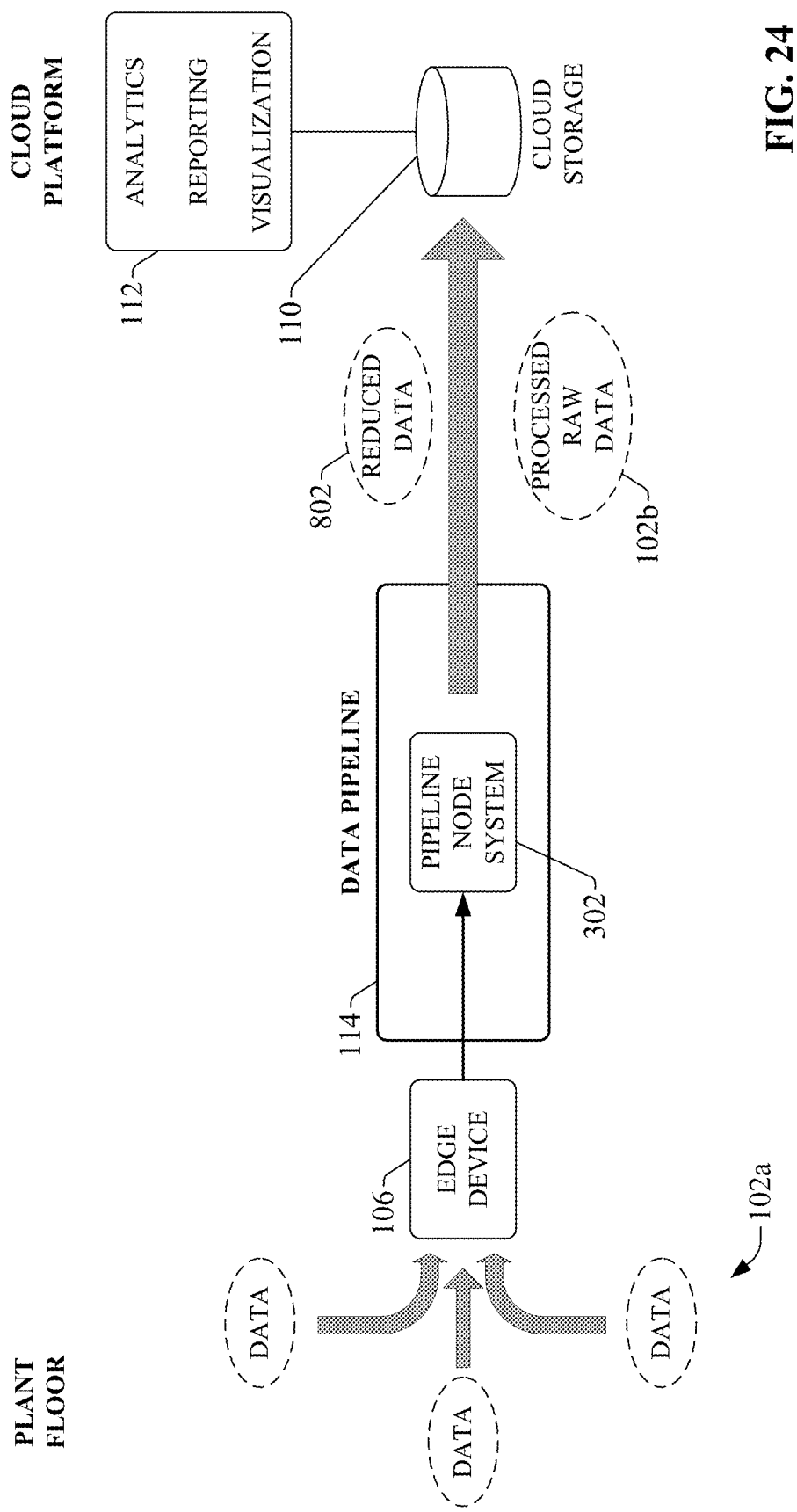
FIG. 24 is a diagram illustrating an example IIoT data pipeline architecture that includes at least one pipeline node system as part of the pipeline backbone.

FIG. 24 is a diagram illustrating an example IIoT data pipeline architecture that includes at least one pipeline node system 302 as part of the pipeline backbone. As in the example architecture depicted in FIG. 1, an edge device 106 that interfaces the industrial devices on the plant floor with the data pipeline 114 collects raw data 102a from the industrial devices and feeds the data into the pipeline 114 via node system 302. Either the node system 302 or the edge device 106 can pre-process the raw data 102a—e.g., by removing outlier data or non-numerical data, sorting the data 102a according to time stamps, etc. —to yield processed raw data 102b. The node system 302 or the edge device 106 can also select and apply a suitable data reduction algorithm based on analysis of the raw data 102b to yield a reduced data set 802, as discussed in previous examples. The data reduction component 312 of either the pipeline node system 302 or the edge device 106 also defines associative links between each item of the reduced data set 802 and its corresponding data item in the raw data 102b (based on the UIDs for the respective data items, as discussed above in connection with FIG. 23). Both the reduced data asset 802 and the processed raw data 102b are then conveyed by the node system 302 (by the data output component 306) to the final storage destination for the data, together with the defined associations between the reduced data set 802 and the raw data 102b. In this example, the data is streamed to cloud storage 110 for storage and consumption by cloud-based applications 112 (e.g., visualization, reporting, or analytics applications).

Figure 25:
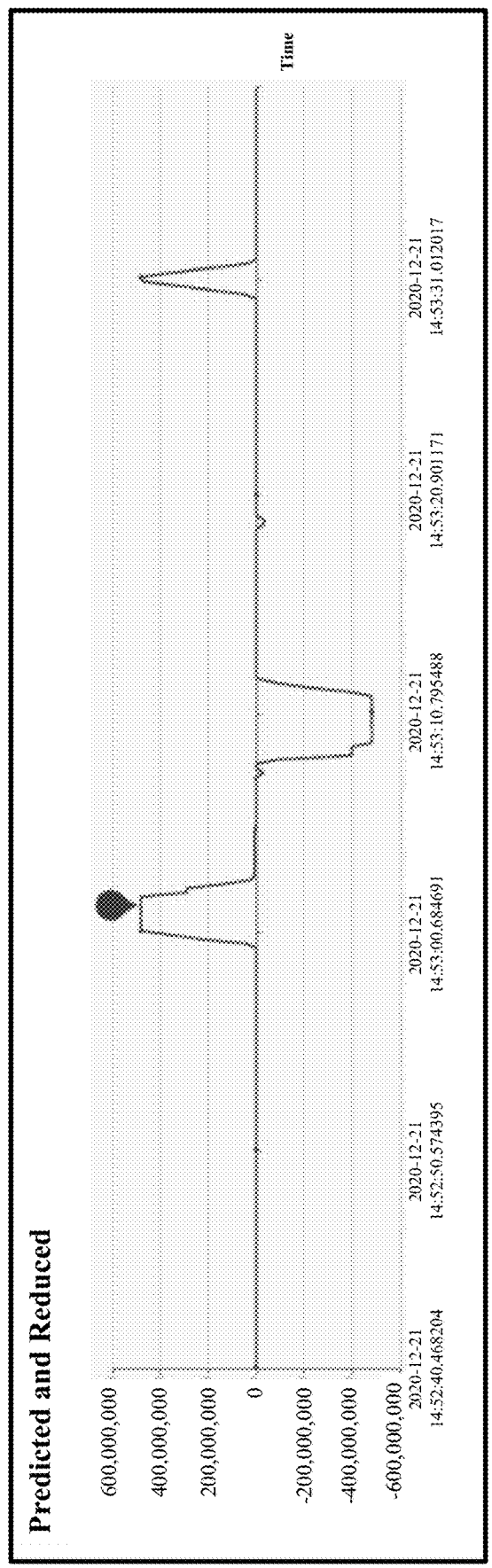
FIG. 25 is a screenshot of an example graph that can be rendered by a visualization application based on a reduced data set.

In the case of visualization applications that provide graphical or alphanumeric views of the collected data, the defined associations or links between the reduced data set 802 and the raw data 102*b* can allow users to switch between a high-level overview populated by the reduced data set 802 and a more detailed view populated by the raw data 102. FIG. 25 is a screenshot of an example graph 2502 that can be rendered by a visualization application based on the reduced data set 802. This graph conveys time-series values of a data tag as a line on the graph 2502, which is drawn based on the values of the reduced data set 802. Since the graph 2502 is plotted based on the reduced data set 802, which omits values from deemed less significant, only the most significant values are plotted. This results in a plot that is free of noise that would otherwise be present if all time-series values from the raw data 102 were plotted.

Figure 26:
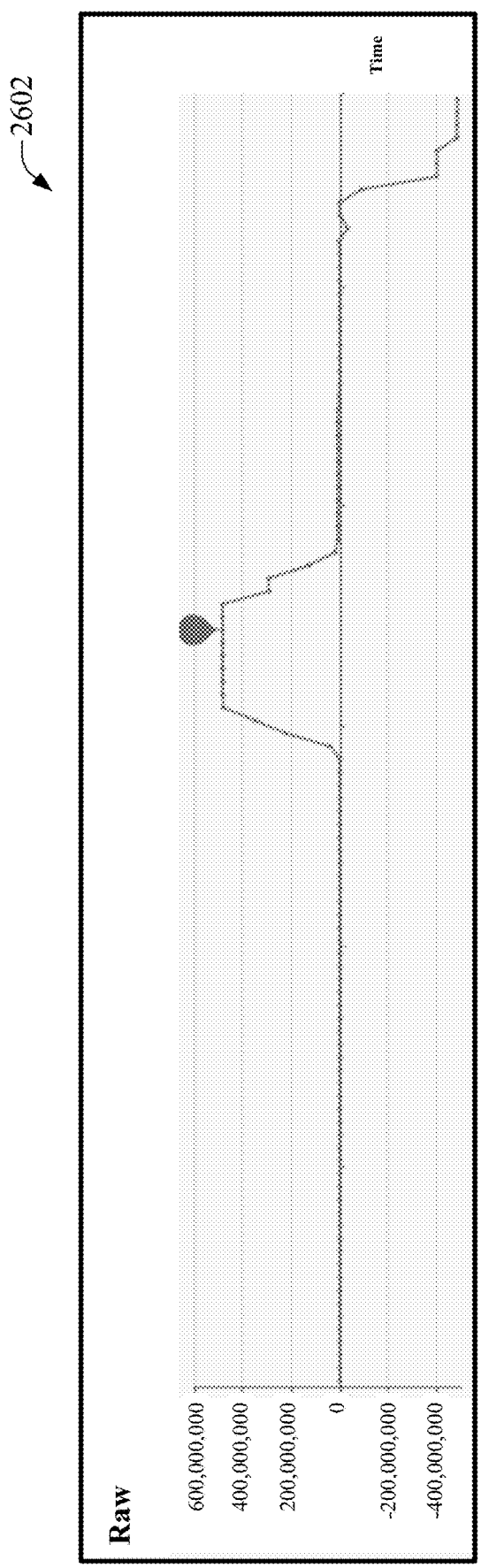
FIG. 26 is an example detail screen populated by raw industrial data.

Since the raw data 102 is also stored on the cloud platform together with defined associations between the reduced data set 802 and the raw data 102 (by virtue of the common UID between each record of reduced data and its corresponding record in the raw data), the user can also drill down to a more detailed view for any point in time represented in the graph 2502. FIG. 26 is an example graph 2602 that can be invoked by the user. Graph 2602 plots the raw data 102 corresponding to the reduced data 802, thereby allowing the user to view the values of the data tags at a more granular level (e.g., at a higher time density). The raw data 102 can be visualized in any suitable format depending on the type of visualization application that renders the data (e.g., as a bar chart, a list of alphanumeric values, etc.). In an example scenario, the user can invoke the graph 2602 by selecting a point on the graph 2502 corresponding to a record of the reduced data set 802. In response to selection of this point on graph 2502, the visualization system identifies the UID associated with the selected reduced data record, locates the data record of the raw data 102 having the same UID, and retrieves a subset of the raw data 102 encompassing this raw data record and a specified range of raw data records before and after the raw data record (i.e., a set of raw data records in temporal proximity to the selected data record). Graph 2602 is then displayed, which renders a line graph that includes the selected range of raw data records.

In some embodiments, the node system 302 or the edge device 106 can generate the UIDs to include information that classifies the items of raw data 102 according to a specified classification criterion. For example, each UID may include header information that identifies its corresponding item of raw data 102 as being associated with a particular product, workstation, production line, or plant facility. This header information can be used to generate filtered views of the reduced or raw data that are specific to a particular product, workstation, production line, or plant. Thus, the UIDs can be used not only to create links between items of reduced data 802 and their corresponding raw data records, but also to filter or categorize the raw or reduced data according to defined categories.

The IIoT data reduction approach implemented by embodiments of the node system 302 described herein can intelligently filter sets of raw industrial data in a manner that maintains the most critical data, as determined based on analysis of the data's probability distribution. In contrast to approaches that apply the same data reduction algorithm to all data batches, the approach described herein can maintain data consistency and accuracy of the reduced data set while also retaining associations with the corresponding raw data.

In the example architecture depicted in FIG. 24, the pipeline node system 302 receives raw data 102, reduces the data according to a selected data reduction strategy, and sends the resulting reduced data 802 to cloud storage 110 (either directly or via one or more other pipeline node systems 302). Cloud-based visualization applications can then leverage both the reduced data 802 and the raw data 102 stored on the cloud storage 110 to render views of this data on client devices (e.g., graphs 2502 and 2602). Such visualization applications may execute on the cloud platform as a set of cloud services that can be accessed by authorized personnel wishing to view the data. In some architectures, edge-level visualization applications can execute on the node system 302 itself or on an edge device 106. Such edge-level visualization applications can be particularly useful for visualizing operational and status data to machine operators on the plant floor, who are typically interested primarily in current or recent historical performance of their automation system. Edge-level visualization systems can produce real-time visualizations of industrial data with less latency relative to cloud-based visualization applications.

Some edge-level visualization tools are tightly coupled to backend data tables. As a result of this tight coupling, changes to backend data structures must be accompanied by corresponding changes to the visualization tool's configurations. Embodiments of pipeline node system 302 described herein can support visualization of reduced and raw industrial data using an architecture that permits loose coupling of the connection between the operator-level visualization tool and the data repositories. This loosely coupled connection can add significant flexibility to the edge-level user interface and data analysis process and allows the visualization application to be easily scaled when new data tags are added at the device level.

Figure 27:
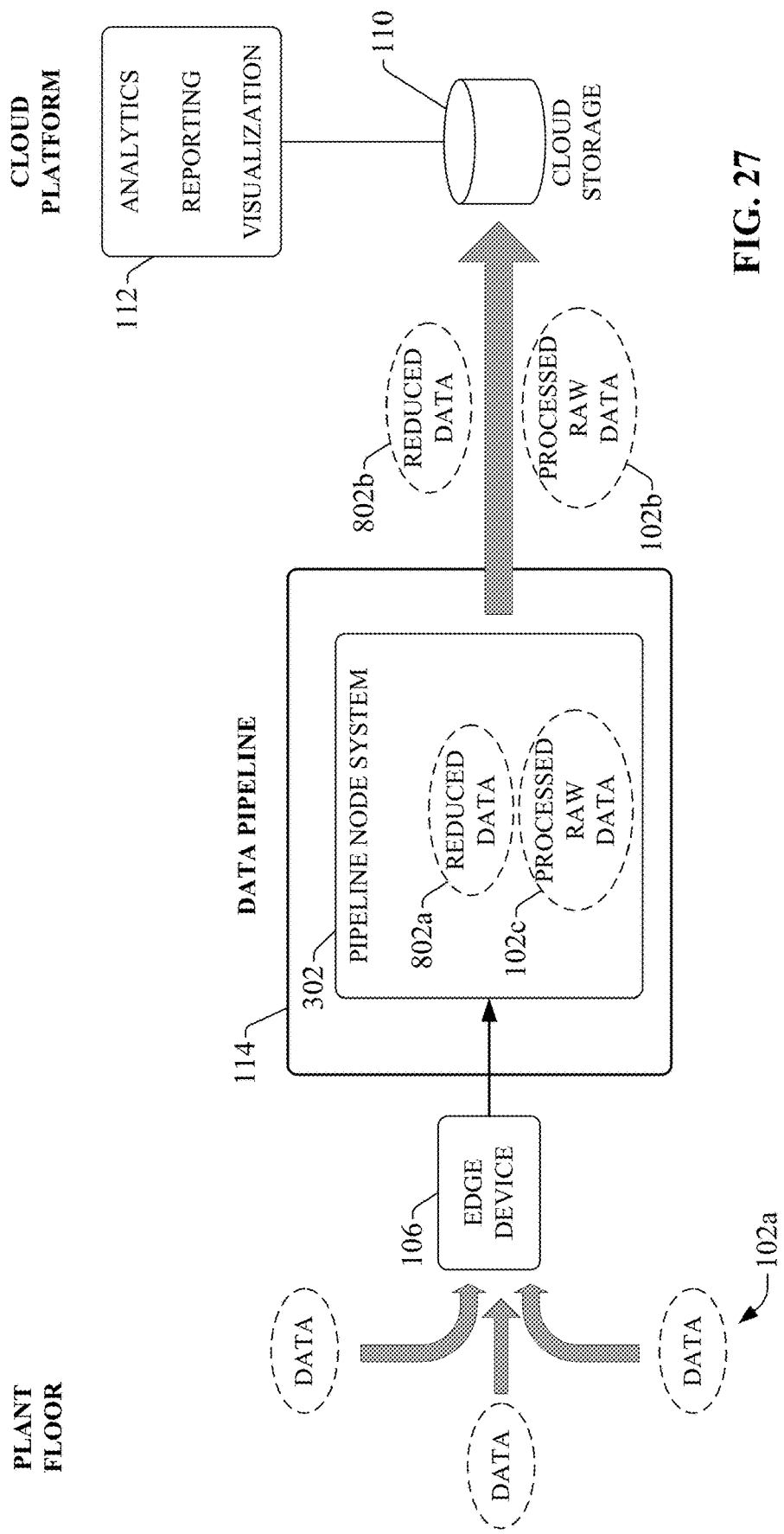
FIG. 27 is a diagram illustrating an example IIoT data pipeline architecture that includes at least one pipeline node system as part of the pipeline backbone, in which the pipeline node system is configured to persist a specified amount of the reduced data and raw data.

FIG. 27 is a diagram illustrating an example IIoT data pipeline architecture that includes at least one pipeline node system 302 as part of the pipeline backbone, in which the pipeline node system 302 is configured to persist a specified amount of the reduced data 802 and raw data 102. As with the architecture described above in connection with FIG. 24, the pipeline node system 302 receives raw data 102*a*—either directly from the industrial devices that act as sources of the raw data 102*a* or via an edge device 106—and applies a data reduction strategy to the raw data 102*a* to yield reduced data 802, which is then sent (as reduced data 802*b*) either to the next node system 302 in the pipeline or to cloud storage 110 together with the processed raw data 102*b*. Additionally, in this example pipeline node system 302 also maintains a specified amount of the reduced data 802 (labeled 802*a* in FIG. 27) and processed raw data (labeled 102*c* in FIG. 27) on its local storage (e.g., memory 320). In an example scenario, the node system's data output component 306 can be configured to store a specified amount of the most recent reduced data 802*a* and raw data 102*c*; e.g., the most recent 30 minutes of reduced and raw data. When new data 102 is received and processed by the node system 302, older locally stored raw and reduced data—e.g., data that is older than a specified duration—is replaced with the newer data. Thus, in addition to sending all raw and reduced data to cloud storage, a portion of the raw and reduced data corresponding to a most recent time period (e.g., 30 minutes) is persisted locally on the node system 302.

Figure 28:
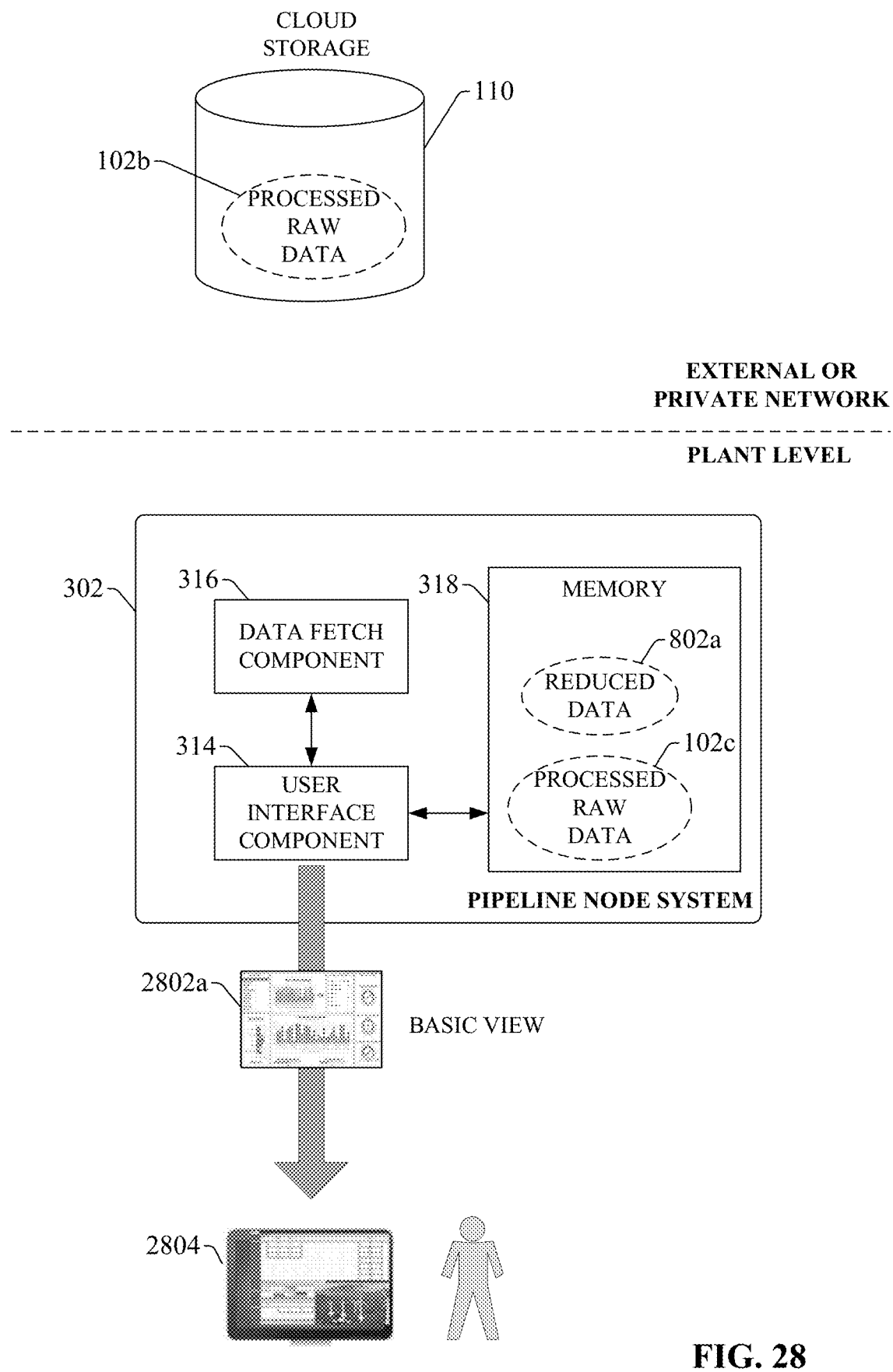
FIG. 28 is a diagram illustrating a node system that includes a user interface component capable of rendering user interface displays on an HMI terminal device or another type of client device that is communicatively connected to the node system.

Storing the most recent reduced data 802*a* and raw data 102*c* on the memory 320 of node system 302 allows local visualization tools supported by the node system 302 to retrieve and render data more quickly relative to fetching the requested data from cloud storage 110. FIG. 28 is a diagram illustrating a node system 302 that includes a user interface component 314 capable of rendering user interface displays 2802 on a human-machine interface (HMI) terminal device 2804 or another type of client device that is communicatively connected to the node system 302. In an example architecture, node system 302 can be communicatively interfaced with an HMI terminal device 2804, and user interface component 314 is configured to generate and render, on the HMI terminal device 2804, user interface displays 2802 that render views of the reduced data 802a and the raw data 102c. User interface component 314 can render views of the data in any suitable format, including but not limited to line graphs (e.g., similar to graphs 2502 or 2602), alphanumeric data presentations, charts (e.g., bar charts or pie charts), or other such views.

In the scenario depicted in FIG. 28, user interface component 314 renders a user interface display 2802a that displays a basic view of a recent subset of the reduced data 802a. Similar to graph 2502 discussed above, this basic view is populated using the reduced data set 802a and as such renders a high-level overview of the automation system's operation or status based on a smaller subset of the available data. According to this configuration, the user interface component 314 populates the user interface display 2802a using the locally stored set of reduced data 802a. This mitigates the need to send a request to the cloud-based data repository (cloud storage 110) to retrieve and send the data from the cloud platform to the operator-level user interface system, thereby reducing latency when rendering the data as well as reducing the reliance on the cloud-level data repository.

Figure 29:
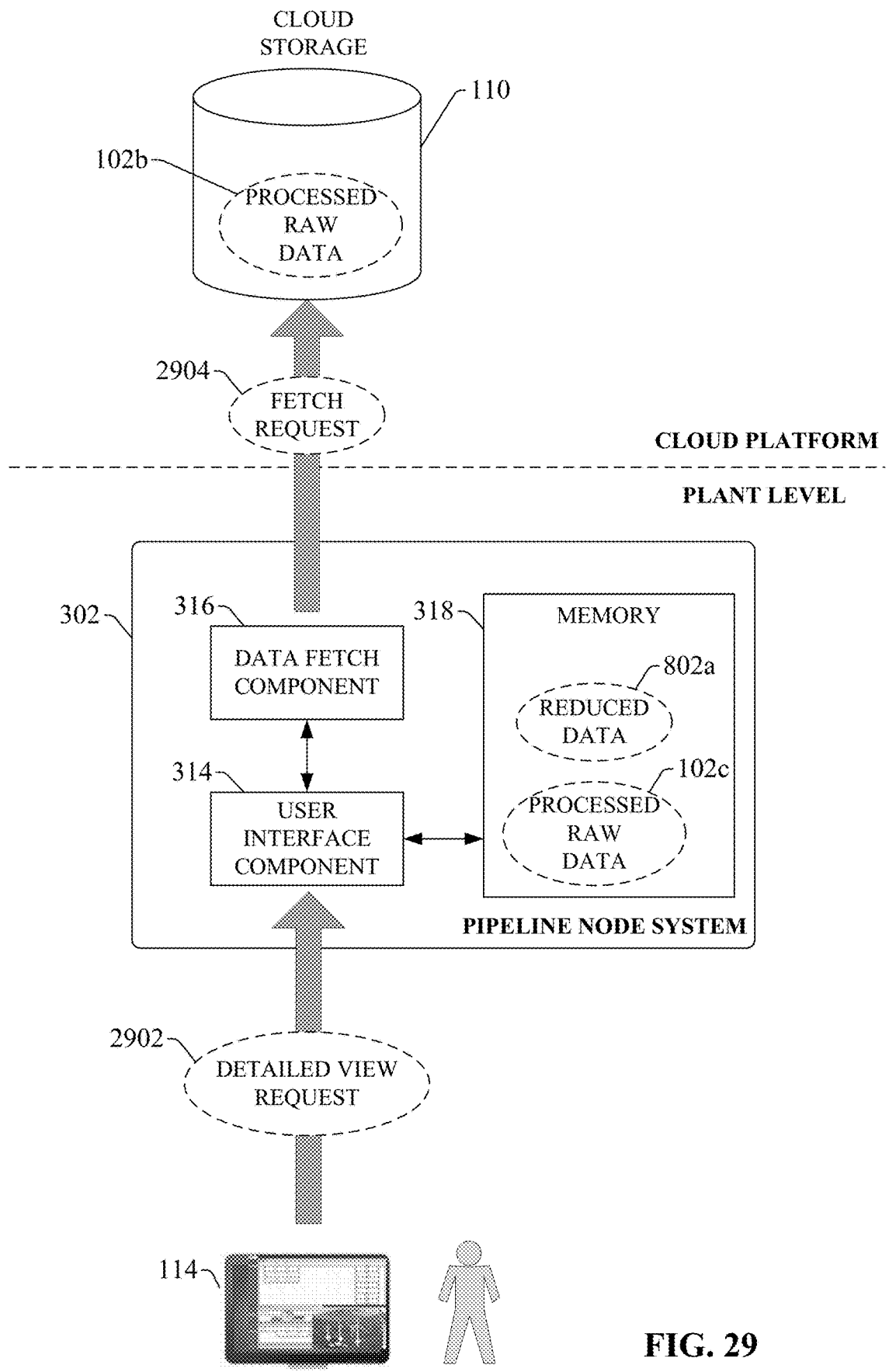
FIG. 29 is a diagram depicting submission of a request for a detailed view of a selected subset of the available machine data.

If an operator on the plant floor wishes to view a more detailed view of a selected portion of the available data (e.g., similar to the scenario of drilling down from the high-level view of graph 2502 to the detailed view of graph 2602 discussed above), the operator can submit a request for the detailed view via interaction with the user interface display 2802a. FIG. 29 is a diagram depicting submission of a request for a more detailed view of a selected subset of the available machine data. Through interaction with the high-level user interface display 2802a, the user can submit a detailed view request 2902 to the node system 302, which can include information specifying one or more items of the raw data 102 to be displayed and a time range for the detailed view. The interactions used to generate the detailed view request 2902 can depend on the display format of user interface display 2802a. For example, if user interface display 2802a is currently rendering a high-level line graph of the most recently stored reduced data 802a (similar to graph 2502), the operator can invoke the detailed view by selecting a point on the graph, which generates a detailed view request 2902 for a subset of the raw data 102c. This detailed view request 2902 can include the selected data point (e.g., an identity of the raw data record corresponding to the selected point on the graph) as well as a time range surrounding the selected data point for which detailed information is requested (e.g., a time range spanning from five minutes before and five minutes after the time of the selected data point). In some scenarios, the operator can also specify the time range requested for the detailed view. Alternatively, the time range may be predefined, such that the operator is only required to select the point on the graph and the HMI terminal device 2804 will automatically request a detailed view of a predefined time range before and after the selected point.

In response to receipt of the detailed view request 2902, the user interface component 314 determines, based on the requested time range for the detailed view, whether the locally stored raw data 102c contains a sufficient range of recent data to fulfill the request. If the locally stored raw data 102c includes all data records required to render the requested range of detailed information, the user interface component 314 can generate the detailed user interface display using the requested subset of locally stored raw data 102c. Alternatively, if the detailed view request 2902 requires data older than the oldest data raw data 102c stored locally on the node system 302, a data fetch component 316 of the node system 302 can send a fetch request 2904 to the cloud platform requesting a subset of the archived raw data 102b stored on cloud storage 110 corresponding to the requested time range.

Figure 30:
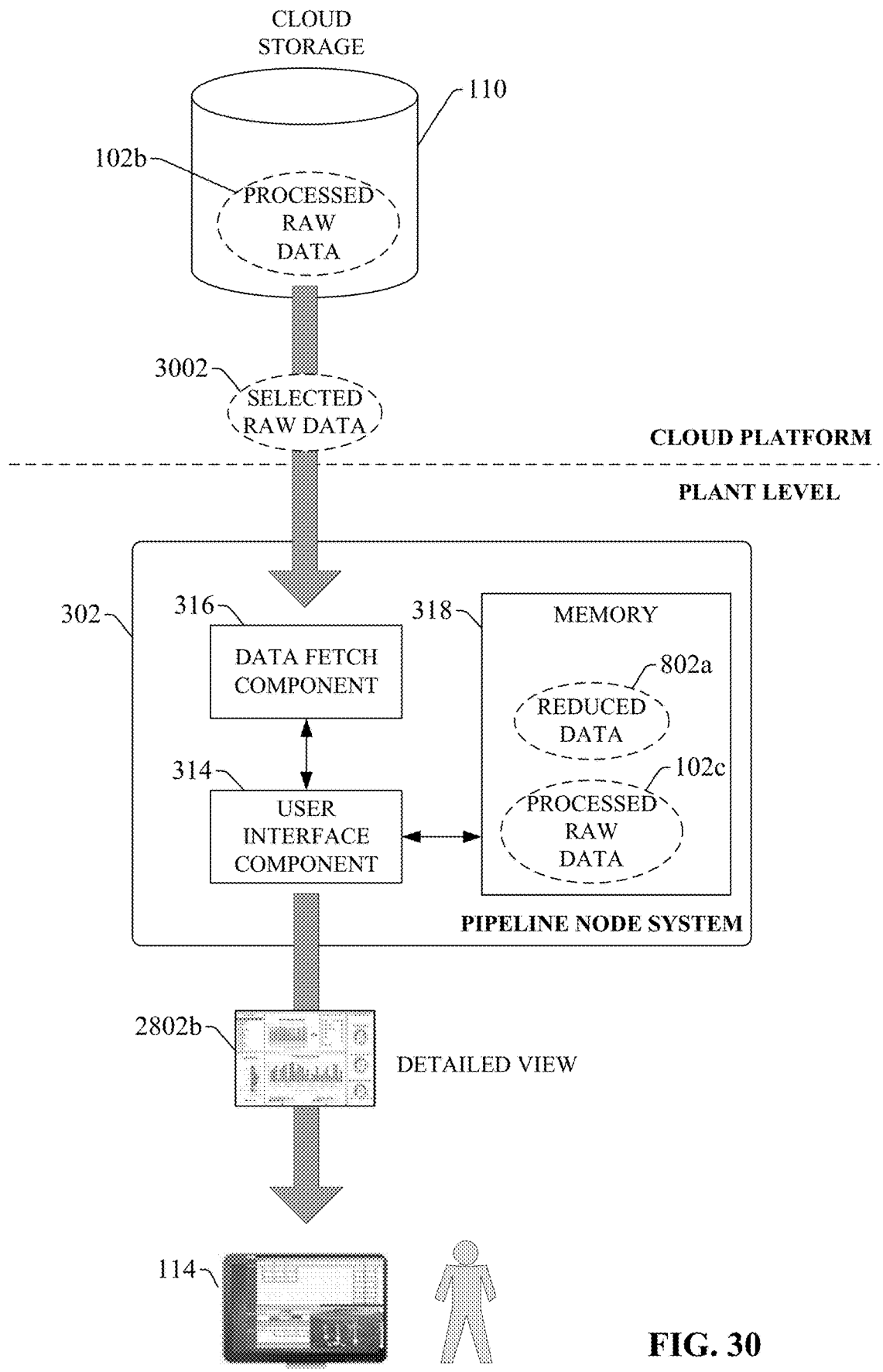
FIG. 30 is a diagram illustrating fetching of archived raw data and delivery of a detailed view by a node system.

FIG. 30 is a diagram illustrating fetching of archived raw data and delivery of a detailed view by the node system 302. In response to the fetch request 2904, the cloud-based data archival system can return the requested subset of raw data 102b to the node system 302. The user interface component 314 then generates and renders, on the HMI terminal device 2804, an updated user interface display 2802b that renders the requested detail view (e.g., similar to graph 2602 in the case of a line graph). This detailed view is populated using the selected raw data 3002 fetched from cloud storage 110. Thus, this architecture reduces the need to retrieve archived data from the cloud platform to populate operator-level user interfaces, while still making this cloud-level data available if requested by the operator.

In many industrial reporting systems, when new industrial devices are installed on the plant floor which will generate data to be reported via a visualization application, a data engineer must get involved to reconfigure backend databases used for data visualization so that the new data points are added to the data tables. These backend databases become more complex as new data points are added, necessitated in part by the need to ensure the reporting system can continue to manage increasingly large data volumes. Moreover, addition of new data points requires structural changes to be made to the user interfaces themselves to render the data, which typically must be implemented by a data or controls engineer. Consequently, data visualization is not easily scalable to accommodate new data sources on the plant floor.

To remove the need for costly backend databases dedicated to historical data visualization at the plant floor level, embodiments of the industrial data pipeline architecture described herein can support annotation of raw data streams into inexpensive, highly scalable, and durable cloud-level storage. This can remove the burden of managing local backend database clusters and can render the visualization system easily scalable. According to this approach, a dynamic data mapping process collects industrial data from data tags that have been annotated with metadata indicating that the tags are to be made available for visualization, and connects data from these tags to a data aggregator object of the node-level or edge-level visualization tool. The data aggregator object dynamically adjusts its data collection footprint to include the annotated data tags, which are dynamically associated with the physical layout of the industrial equipment in the visualization. A plant configuration identifier can convey a physical plant layout that is dynamically absorbed by the visualization tools to create visualization objects that act as data context containers. These context containers are added to a plant visualization panel from which the annotated tags can be selected by a viewer to build visualizations of selected data items (e.g., trending visualizations).

Figure 31:
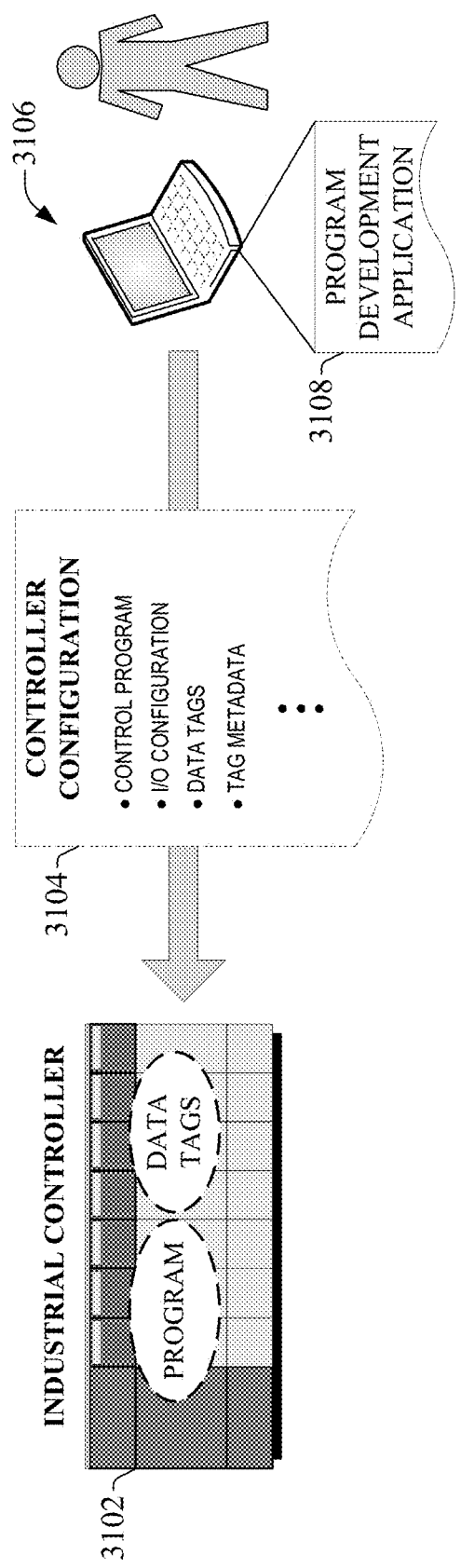
FIG. 31 is a diagram illustrating configuration of an industrial controller, including annotation of selected data tags with visualization metadata.

To support this approach, industrial devices, such as industrial controllers or other such devices, can maintain tag databases that support annotation of their tags with metadata attributes that indicate whether each tag is to be made available for edge-level or node-level visualization. FIG. 31 is a diagram illustrating configuration of an industrial controller 3102, including annotation of selected data tags with visualization metadata. In this example, a system designer configures and programs industrial controller 3102 using a program development application 3108 executing on the programmer's client device 3106 (e.g., laptop computer, desktop computer, tablet computer, etc.), which communicates with industrial controller 3102 over a wired or wireless network connection. Configuring and programming industrial controller 3102 may involve defining the I/O modules and I/O points that will be used by the controller 3102 to exchange analog and digital data with the industrial devices on the plant floor (including but not limited to telemetry devices, safety devices, actuators, robot interface points, etc.), and developing and downloading the industrial control program—e.g., ladder logic program, sequential function chart, etc. —that will be executed by the industrial controller 3102.

Development of the control program may also involve defining the analog and digital data tags that will store the input, output, and local data items read or generated by the industrial controller 3102. The programmer downloads this controller configuration information 3104—comprising the I/O configuration, control program, and data tag definitions—to the industrial controller 3102. During execution, the controller 3102 will execute the industrial control program and locally update the values of the associated data tags in accordance with the control program and the statuses of the field devices with which the industrial controller 3102 communicates.

To support dynamic configuration of data collection and visualization at the edge or node level, the industrial controller 3102 and program development application 3108 allow the data tags defined by the controller configuration information 3104 to be selectively annotated with visualization metadata. Each data tag has associated therewith a number of metadata properties or attributes which may depend on the data type of the data tag, including but not limited to upper or lower limits on the tag's value, the tag's data type (e.g., Boolean, integer, double integer, a user-defined type, etc.), an alphanumeric name for the tag, or other tag properties. Some of these tag properties may be read-only properties that are set in accordance with the tag's data type and cannot be edited by the system developer. Other tag properties have both read and write permissions and can be modified by the system developer as needed (e.g., upper and lower bounds on an analog tag). In this example, one of the modifiable properties associated with each data tag is a visualization attribute having a Boolean value (either ON or OFF).

During configuration of the controller 3102, the developer can selectively set the visualization attribute for each data tag that is to be made available for visualization. This allows the developer to control, at the device level, which subset of defined data tags are to make their data values available for display by the edge-level or node-level visualization system.

Although the present example assumes that the industrial device on which the tag-level visualization attributes are set is an industrial controller 3102, other types of industrial data sources can also support annotation of their data tags with visualization metadata, including but not limited to motor drives, safety controllers, industrial robots, vision systems or other types of quality verification systems, safety sensors or cameras, or other types of industrial devices.

Figure 32:
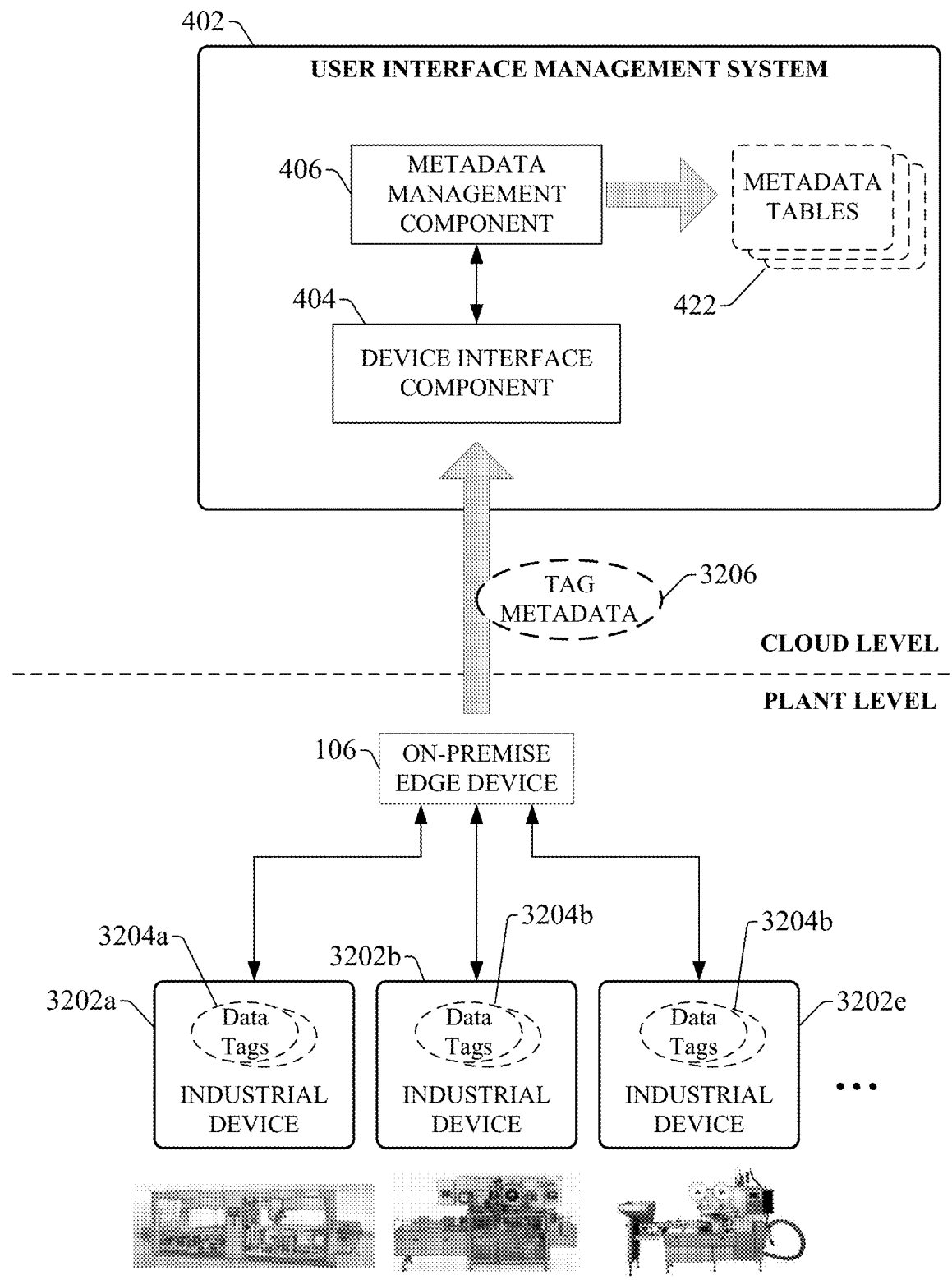
FIG. 32 is a diagram illustrating collection of tag metadata from industrial devices at a plant facility.

When the industrial devices are in operation on the plant floor, the visualization metadata for the data tags defined on the industrial devices is read remotely by a user interface management system 402 that executes on the cloud platform or another high-level platform. FIG. 32 is a diagram illustrating collection of tag metadata 3206 from industrial devices 3202 at a plant facility. User interface management system 402 can read and monitor the annotated visualization metadata associated with each data tag 3204 defined on industrial devices 3202 (e.g., such as industrial controller 3102) that are in operation at one or more industrial facilities. In some architectures, the tag metadata 3206 can be conveyed to the user interface management system 402 via the same data pipeline 114 over which the collected raw data 102 and reduced data 802 are conveyed to the cloud platform. As shown in FIG. 32, an edge device 106 collects both raw data from the data tags 3204 of industrial devices 3202 as well as the visualization metadata 3206 from the respective data tags 3204, and sends this raw data and the tag metadata 3206 to the cloud platform via data pipeline 114 (only the edge device 106 at the beginning of the pipeline 114 is shown in FIG. 32). In other architectures, the user interface management system 402 can receive the tag metadata 3206 via a separate pipeline or data channel from the pipeline that conveys the raw and reduced data.

A device interface component 404 of the user interface management system 402 receives this collected tag metadata 3206 from the data pipeline 114 (or another channel that conveys the metadata 3206 from the devices 3202 to the cloud platform). In various embodiments, the tag metadata 3206 can be read from the device's data tags 3204 on a periodic basis by the device interface component 404, or may be sent to the device interface component 404 by the edge device 106 in response to detecting a change to the tag metadata 3206; e.g., a modification of an existing tag's visualization attribute or the addition or removal of a data tag whose visualization attribute is set. Based on the visualization attribute values for the respective data tags 3204 as indicated by the tag metadata 3206, a metadata management component 406 of the user interface management system 402 updates one or more metadata tables 422, which are maintained on memory (e.g., memory 420) associated with the system 402. These metadata tables 422 serve as a record of which data tags 3204 are to be made available for edge-level or node-level visualization (e.g., on an operator HMI terminal device), as determined based on the tag metadata 3206. For each data tag 3204 whose visualization attribute is set, indicating that the tag's data is to be made available for visualization, the metadata management component 406 creates a record of the data tag 3204 in an appropriate metadata table 422. If a data tag's visualization attribute is subsequently reset, indicating that the tag's data is no longer to be made available for visualization, the metadata management component 406 removes the record of that tag from the metadata tables 222. In some embodiments, separate metadata tables 422 can be created for respective different entities, where an entity may be a customer, a plant facility, a work area within a plant facility, or another such category.

Figure 33:
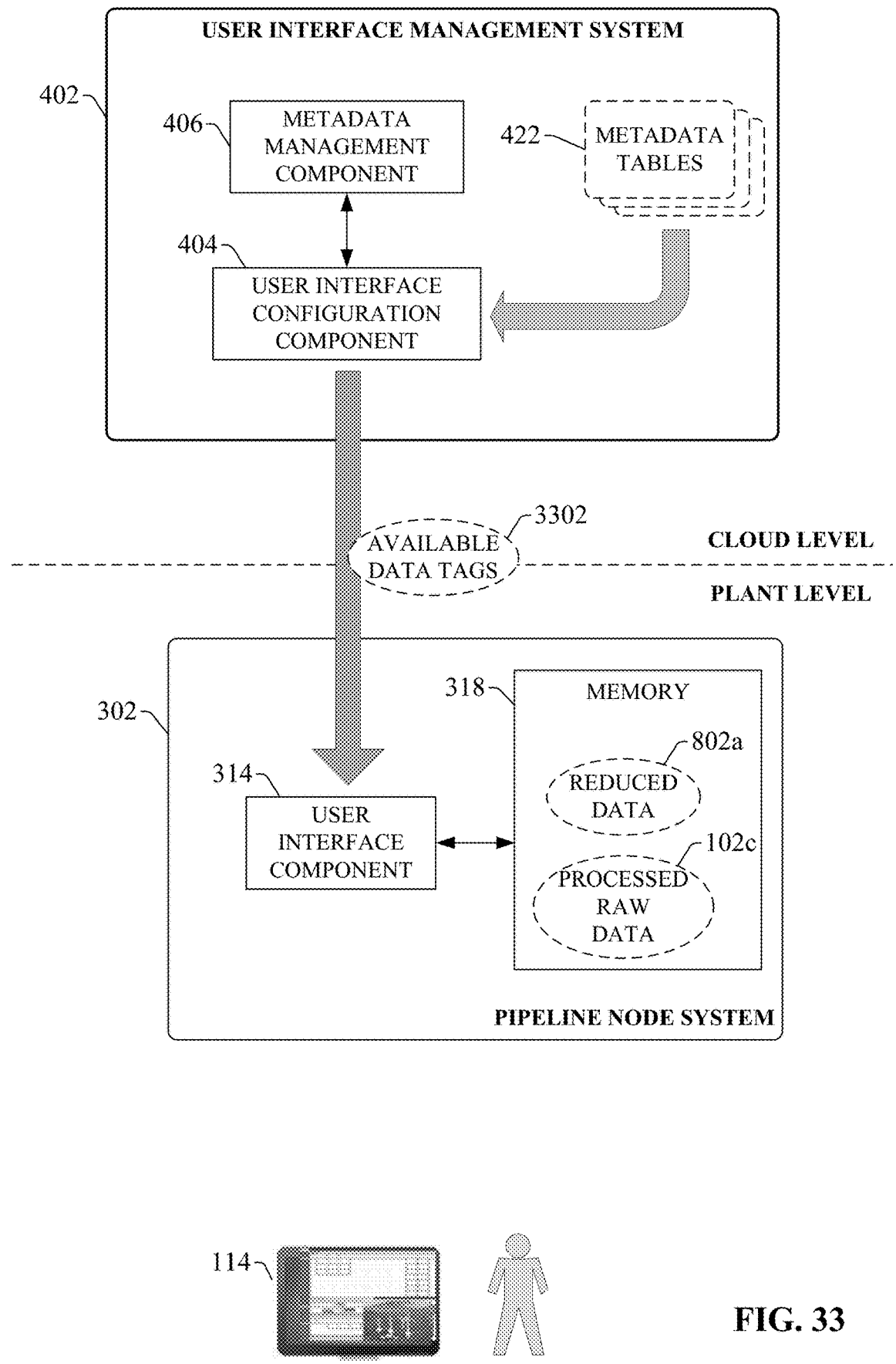
FIG. 33 is a diagram illustrating communication of a list of available tags to a node-level user interface system by a user interface management system.

Based on information in the metadata tables 422, the user interface management system 402 can configure a plant-side visualization system to offer an appropriate subset of available data tags for selective rendering on a user interface display. FIG. 33 is a diagram illustrating communication of a list of available tags to a node-level user interface system by the user interface management system 402. In this example, the user interface system being configured is served by the node system 302 discussed above. In particular, the node system 302 includes a user interface component 314 capable of generating and rendering user interface displays 2802 to an HMI terminal device 2804 or another type of client device, as discussed above in connection with FIGS. 28-30. However, the user interface system being configured may reside on another type of visualization server.

According to an example scenario, a user of HMI terminal device 2804—or another type of client device that receives user interface displays from the node's user interface component 314—may submit plant configuration information identifying the particular machine or production area for which the user wishes to view historical data. The plant configuration information can be submitted in any suitable format. For example, user interface component 314 may render a machine selection interface that allows the user select a machine of interest by navigating a hierarchical selection structure. The selection structure can allow the user to navigate hierarchical categories such as plant identifiers, station identifiers, machine identifiers, or other such categories until the machine of interest is selected. Based on the selected machine, the user interface component 314 sends a request to the user interface management system 402 for a list of the data tags associated with the selected machine that are available for visualization. In response to this request, the user interface configuration component 408 of the user interface management system 402 references the appropriate metadata table 422 for the selected machine and generates a list of available data tags 3302 recorded in the metadata table 422. This list of available data tags 3302 corresponds to the subset of available data tags 3204 that are associated with the selected machine (e.g., data tags of industrial devices that are part of the selected machine), and which have had their visualization attributes set at the device level as discussed above in connection with FIG. 31.

Figure 34:
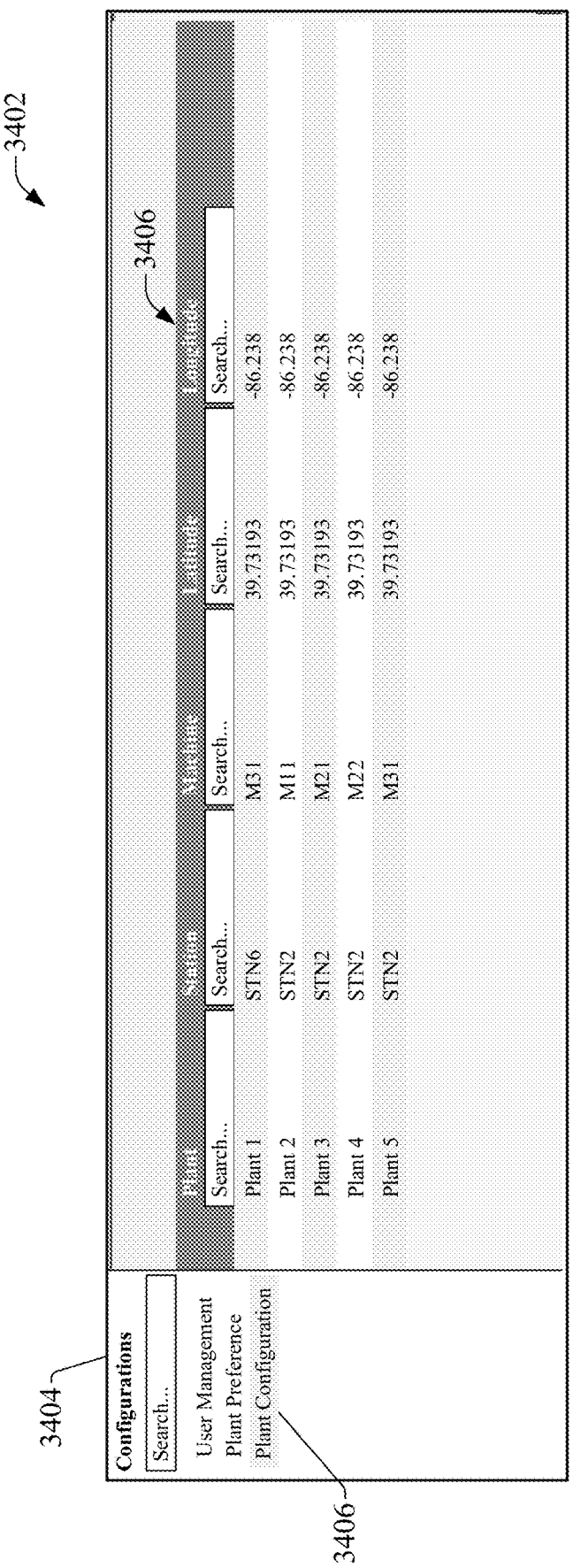
FIG. 34 is a screenshot of an example interface display that can be used to select plant configuration information.
Figure 35:
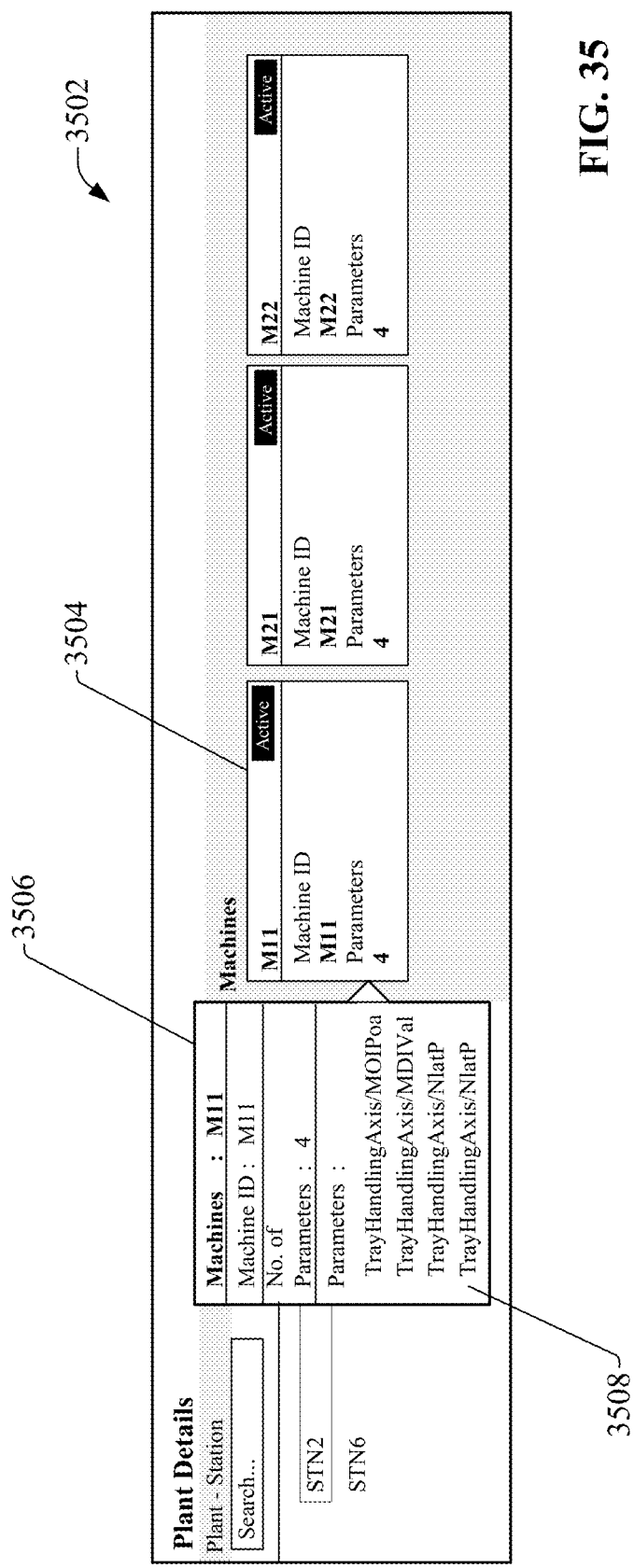
FIG. 35 is a screenshot of an example interface display that can be rendered for a selected station.

FIG. 34 is a screenshot of an example interface display 3402 that can be rendered by user interface component 404 and used to select plant configuration information. In this example, selecting a Plant Configuration option from a toolbar 3404 renders a browsing window 3406 that allows the user to search for a desired plant facility, a station within the plant facility, or a particular machine within a station. In some embodiments, the user can also search for plant, station, or machine based on the geographic location (latitude and longitude) of the desired data source. Selection of a plant, station, or machine can invoke another interface display that permits the user to see the tags that are available for visualization for the selected entity. FIG. 35 is a screenshot of an example interface display 3502 that can be rendered for a selected station (station STN2 in the illustrated example). This example display 3502 renders information boxes 3504 for each machine in the selected station (e.g., M11, M21, M22, etc.). Selecting an information box 3504 for a given machine causes a detail window 3506 to be superimposed on the display 3502 for the selected machine. When the plant, station, and machine are selected in this manner, the user interface component 314 submits a request to the user interface management system 402 for the list of available tags 3302 for the selected machine (the plant configuration information). The detail window 3506 then renders a list 3508 of data parameters that are available for the selected machine based on the list of available data tags 3302 returned by the user interface configuration component 404. The data parameters rendered in list 3508 correspond to the list of available data tags 3302 whose visualization parameter was set on the devices 3202 that make up the selected machine.

FIG. 36 is a diagram illustrating selection of a subset of the available data tags via interaction with the visualization system. As noted above, user interface component 314 renders the list of available data tags 3302 for a machine selected by the user (e.g., via interaction with interface display 3502, rendered on HMI terminal device 2804) on details window 3506 as list 3508 (see FIG. 35). The user can then submit selection data 3602 to the user interface component 314 identifying a subset of the available data tags that the user wishes to render as a visualization presentation. When example interface display 3502 is used to make the tag selections, the user can generate and submit the selection data 3602 by selecting the desired tags from list 3508. In response to these data tag selections, user interface component 314 can render an interface display (e.g., similar to interface displays 2802a or 2802b of FIGS. 28 and 30) that displays recent historical data generated by the selected data tags. As described above in connection with FIGS. 28-30, the user interface component 314 can populate this interface display using the appropriate subset of historical data stored locally on memory 320 if the node system 302 is configured to maintain a limited set of recent tag data on its local memory, or can populate the interface display using tag data fetched from cloud storage 110.

Figure 37:
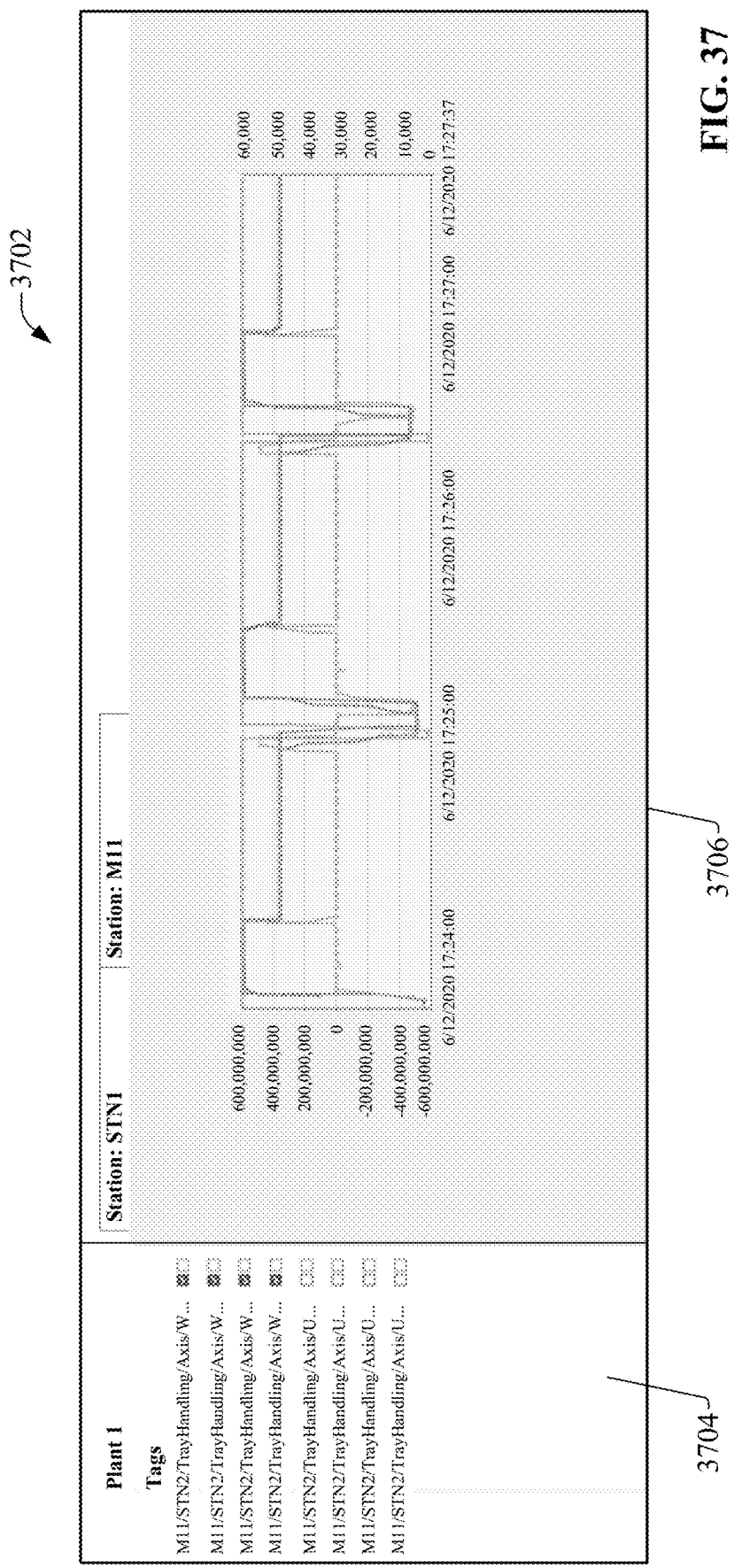
FIG. 37 is an example interface display that can be rendered in response to a user's submission of selection data identifying a subset of available data tags whose data is to be rendered.

FIG. 37 is an example interface display 3702 that can be rendered in response to the user's submission of selection data 3602 identifying a subset of the available data tags whose data is to be rendered. In this example, the available data tags (e.g., machine parameters) are listed in a tag list window 3704 pinned to a side of the display 3702. The available data tags listed in window 3704 correspond to the list of available data tags 3302 reported by the user interface management system 402 for the selected machine, which in turn represent the subset of data tags associated with the selected machine whose visualization attribute has been set at the device-level (as described above in connection with FIG. 31). Each listed data tag has an associated checkbox, and selection of a checkbox causes the corresponding data tag to be rendered as a line graph in display area 3706. Window 3704 can be an intelligent widget that is populated by the list of available data tags 3302 reported by the user interface management system 402.

This architecture permits administrators responsible for the data collection system to easily specify which sets of machine data operators or other personnel are permitted to access and view by setting the visualization attributes for the permitted data tags at the device level during design time. The user interface management system 402 monitors these visualization attributes and automatically configures user interface applications on the plant floor to allow users to selectively view data only from those data tags that have been expressly flagged for visualization by the administrator (e.g., by populating window 3506 or 3704 or another type of smart widget with the machine-specific data tags that have been flagged at the device level for visualization). This reduces the amount of work required for a data engineer to customize data presentations for plant personal (e.g., machine-side operators or other personnel), and also simplifies end-user customization of the data presentation by providing a reduced list of data tags for selection. This architecture can also significantly reduce the amount of storage infrastructure required for IIoT applications.

Figure 38:
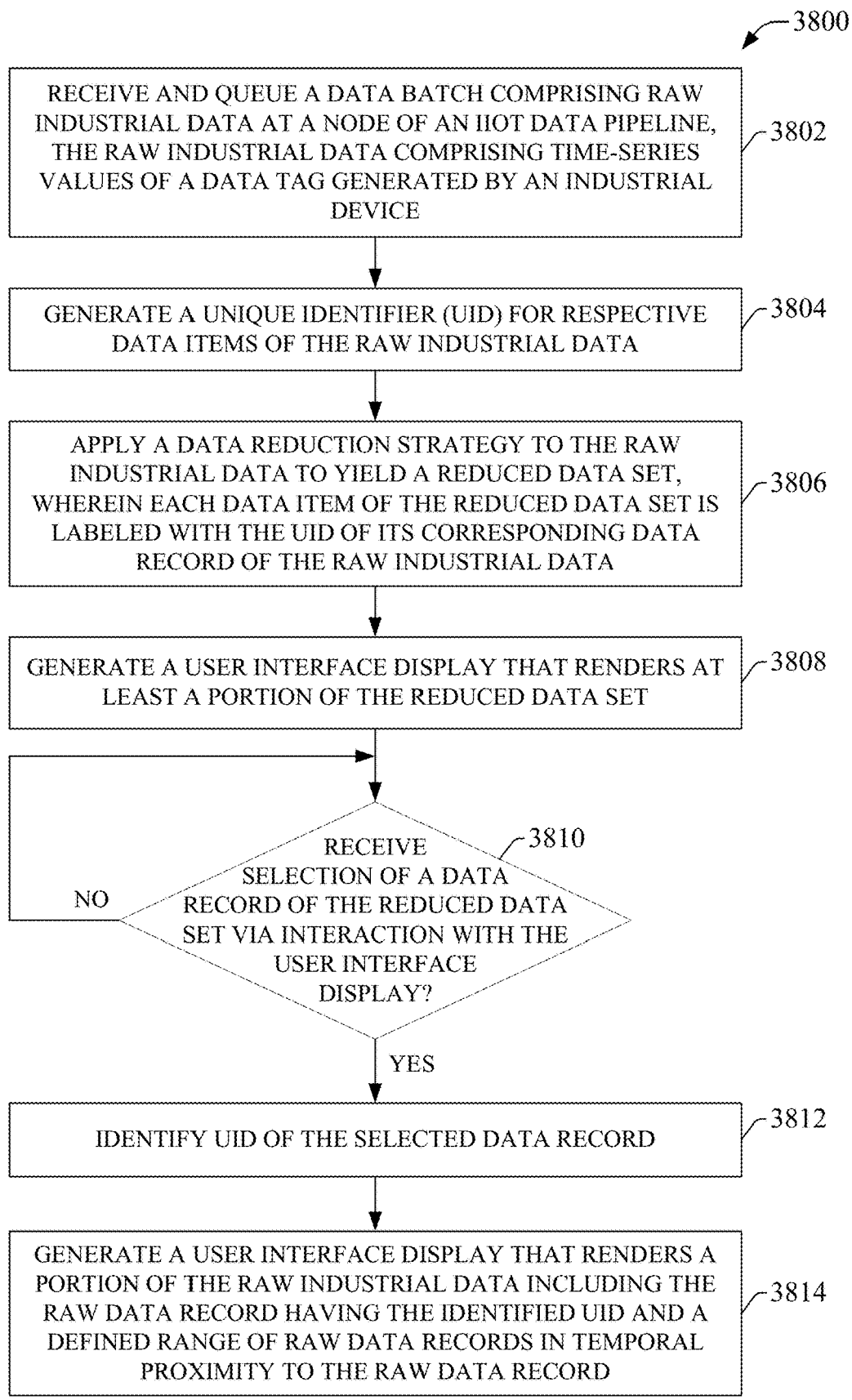
FIG. 38 is a flowchart of an example methodology for creating associative links between items or records of reduced industrial data and their corresponding items of raw industrial data.
Figure 39:
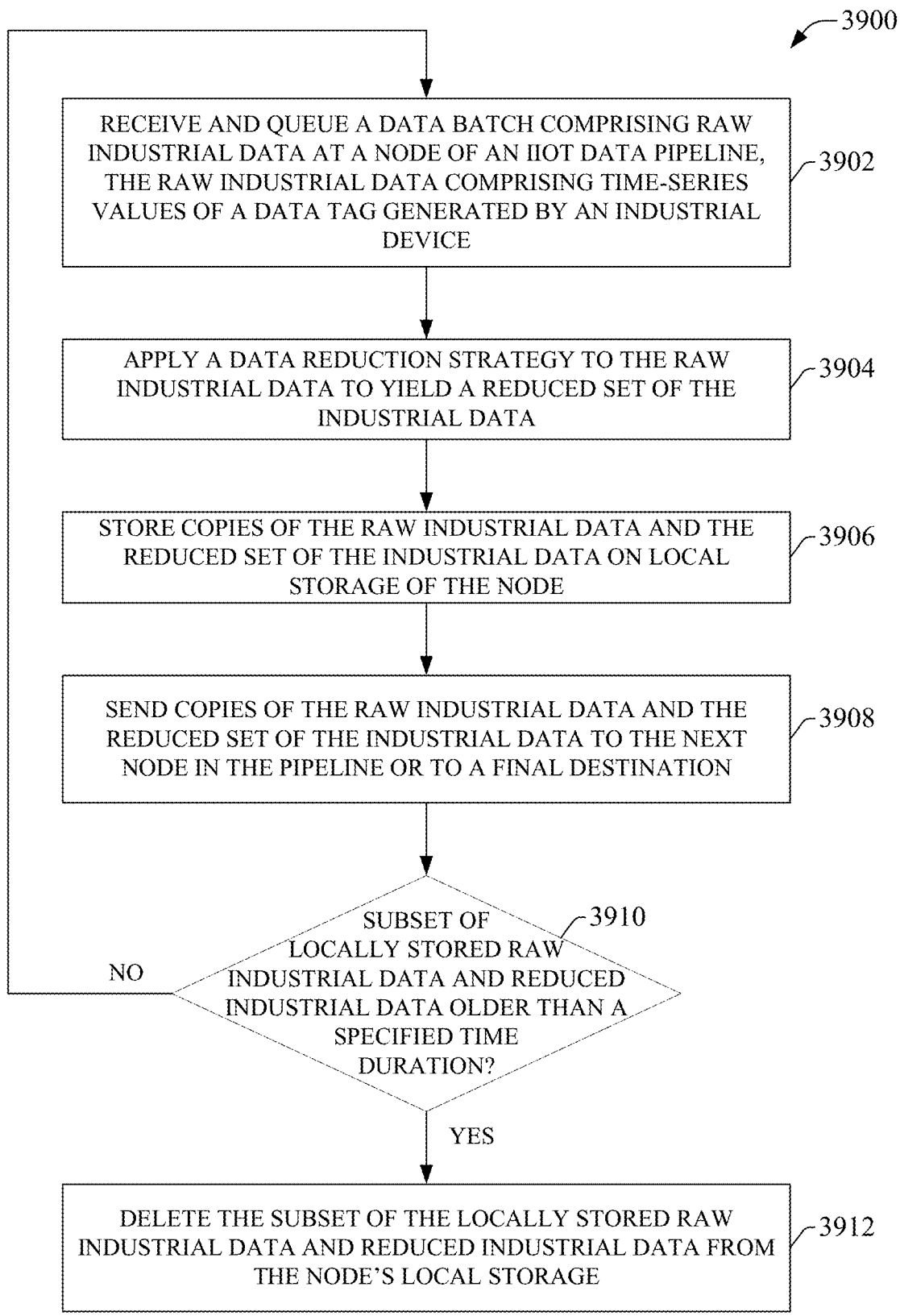
FIG. 39 is a flowchart of an example methodology for managing local and remote storage of raw and reduce industrial data to yield high user interface performance.
Figure 40:
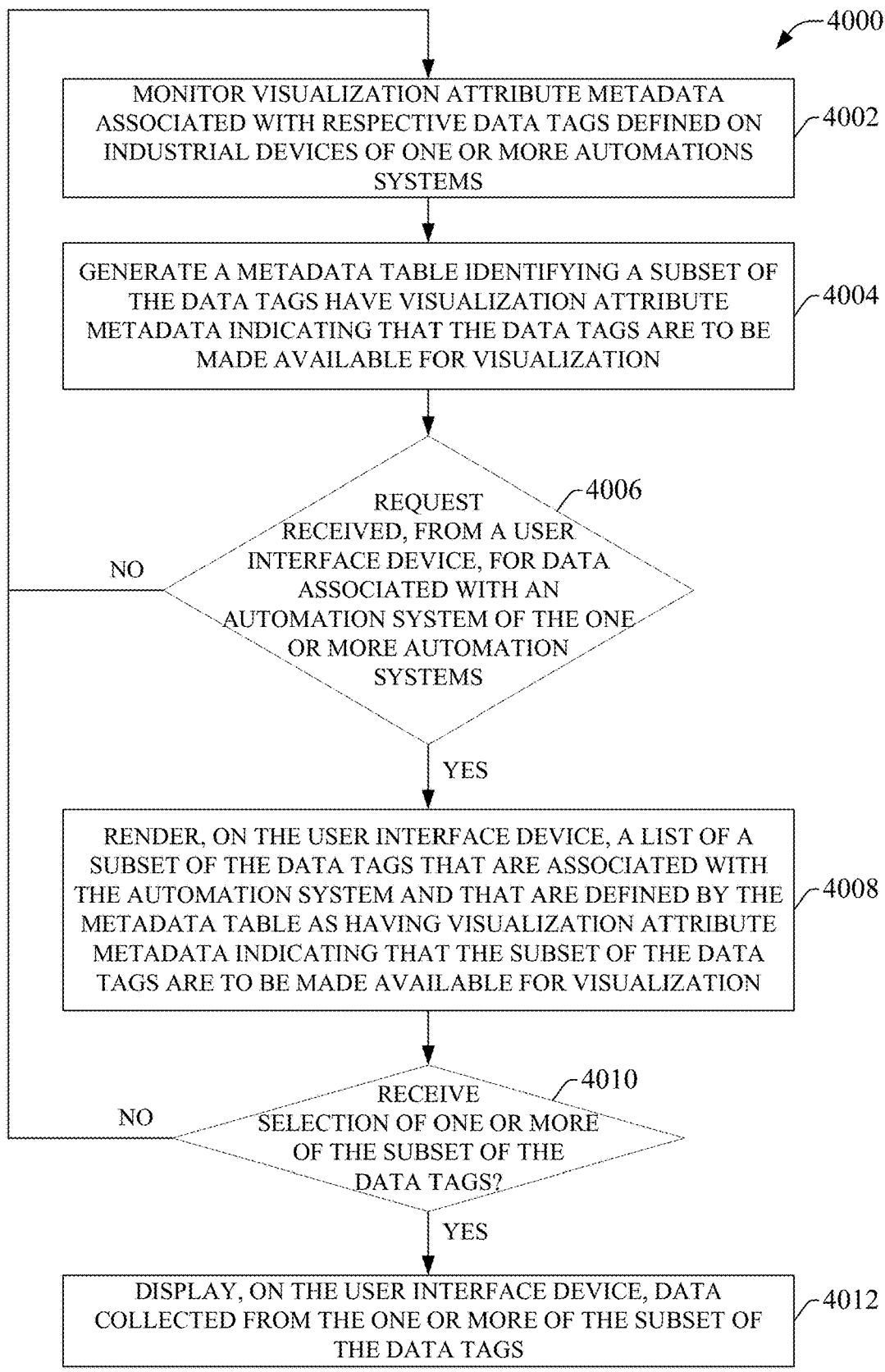
FIG. 40 is a flowchart of a third part of the example methodology for configuring a user interface to display selected sets of industrial data generated by one or more industrial devices.

FIGS. 38-40 illustrate various methodologies in accordance with one or more embodiments of the subject application. While, for purposes of simplicity of explanation, the methodologies shown herein is shown and described as a series of acts, it is to be understood and appreciated that the subject innovation is not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the innovation. Furthermore, interaction diagram(s) may represent methodologies, or methods, in accordance with the subject disclosure when disparate entities enact disparate portions of the methodologies. Further yet, two or more of the disclosed example methods can be implemented in combination with each other, to accomplish one or more features or advantages described herein.

FIG. 38 illustrates an example methodology 3800 for creating associative links between items or records of reduced industrial data and their corresponding items of raw industrial data. Initially, at 3802, a data batch is received and queued at a node of an IIoT data pipeline (or an edge device that feeds industrial data into the data pipeline). The data batch comprises time-series values of a data tag generated by an industrial device in a plant facility. At 3804, a unique identifier (UID) is generated for respective data items of the raw industrial data received at step 3802.

At 3806, a data reduction strategy is applied to the raw industrial data received at step 3802 to yield a reduced data set. As part of the data reduction process, each data item of the resulting reduced data set is labeled with the UID of its corresponding data record of the raw industrial data, thereby providing a link between each item of the reduced data and its corresponding record in the raw data set.

At 3808, a user interface display is generated that renders at least a portion of the reduced data set created at step 3806. The user interface display can render the reduced data in any suitable graphical or alphanumeric format, including but not limited to a line graph, a pie chart, a bar chart, numerical or string displays, or other such formats. At 3810, a determination is made as to whether a selection of a data record of the reduce data set is received via interaction with the user interface. In an example scenario, if the reduced data set is being rendered as a line graph, this selection can be made by selecting a point on the graph corresponding to a data point of interest. If such a selection is made (YES at step 3810), the methodology proceeds to step 3812, where the UID of the selected data record is identified. At 3814, a user interface display is generated that renders a portion of the raw industrial data that includes the raw data record having the UID identified at step 3812 as well as a defined range of raw data records in temporal proximity to the raw data record (e.g., raw data records having time stamps that are within a defined time range of the time stamp of the raw data record having the UID).

FIG. 39 illustrates an example methodology 3900 for managing local and remote storage of raw and reduce industrial data to yield high user interface performance. Initially, at 3902, a data batch is received and queued at a node of an IIoT data pipeline (similar to step 3802 of methodology 3800). At 3904, a data reduction strategy is applied to the raw industrial data to yield a reduced set of the industrial data.

At 3906, copies of the raw industrial data received at step 3902 and the reduced set of the industrial data obtained at step 3904 are stored on local storage of the node. At 3908, copies of the raw industrial data and the reduced set of the industrial data re sent to the next node in the pipeline or to a final destination (e.g., to cloud-based archival storage).

At 3910, a determination is made as to whether a subset of the locally stored raw and reduced industrial data is older than a specified time duration. If such a subset is stored locally on the node (YES at step 3910), the methodology proceeds to step 3912, where the subset of the locally stored raw and reduced industrial data is deleted from the node's local storage. In this way, the node stores a limited set of the most recent raw and reduced data on local storage, while older sets of the raw and reduced data are stored on external archival storage (e.g., cloud-based storage).

FIG. 40 illustrates an example methodology 4000 for configuring a user interface to display selected sets of industrial data generated by one or more industrial devices. Initially, at 4002, visualization attribute metadata associated with respective data tags defined on industrial devices of one or more automation systems is monitored. This visualization attribute metadata can be set at the device level for respective data tags that are to be made available to users of an industrial data visualization system (e.g., an operator user interface system for an automation system). At 4004, a metadata table identifying a subset of the data tags that have visualization attribute metadata indicating that the data tags are to be made available for visualization is generated or updated.

At 4006, a determination is made as to whether a request is received, from a user interface device, for data associated with an automation system of the one or more automation systems. This request can be generated, for example, by entering a selection of a plant, production area, or machine of interest via interaction with the user interface device. If such a request is received (YES at step 4006), the methodology proceeds to step 4008, where a list of a subset of the data tags that are associated with the automation system and that are defined by the metadata table as having visualization attribute metadata indicating that the subset of the data tags are to be made available for visualization is rendered on the user interface device.

At 4010, a determination is made as to whether a selection of one or more of the subset of the data tags rendered at step 4008 is received. In an example implementation, the subset of the data tags may be rendered at step 4008 with respective checkboxes, and the selections can be received at step 4010 by selecting checkboxes associated with the desired one or more of the subset of the data tags. If such a selection is received (YES at step 4010), the methodology proceeds to step 4012, where data collected from the one or more of the subset of the data tags selected at step 4010 is displayed on the user interface device.

Embodiments, systems, and components described herein, as well as control systems and automation environments in which various aspects set forth in the subject specification can be carried out, can include computer or network components such as servers, clients, programmable logic controllers (PLCs), automation controllers, communications modules, mobile computers, on-board computers for mobile vehicles, wireless components, control components and so forth which are capable of interacting across a network. Computers and servers include one or more processors—electronic integrated circuits that perform logic operations employing electric signals—configured to execute instructions stored in media such as random access memory (RAM), read only memory (ROM), a hard drives, as well as removable memory devices, which can include memory sticks, memory cards, flash drives, external hard drives, and so on.

Similarly, the term PLC or automation controller as used herein can include functionality that can be shared across multiple components, systems, and/or networks. As an example, one or more PLCs or automation controllers can communicate and cooperate with various network devices across the network. This can include substantially any type of control, communications module, computer, Input/Output (I/O) device, sensor, actuator, and human machine interface (HMI) that communicate via the network, which includes control, automation, and/or public networks. The PLC or automation controller can also communicate to and control various other devices such as standard or safety-rated I/O modules including analog, digital, programmed/intelligent I/O modules, other programmable controllers, communications modules, sensors, actuators, output devices, and the like.

The network can include public networks such as the internet, intranets, and automation networks such as control and information protocol (CIP) networks including DeviceNet, ControlNet, safety networks, and Ethernet/IP. Other networks include Ethernet, DH/DH+, Remote I/O, Fieldbus, Modbus, Profibus, CAN, wireless networks, serial protocols, and so forth. In addition, the network devices can include various possibilities (hardware and/or software components). These include components such as switches with virtual local area network (VLAN) capability, LANs, WANs, proxies, gateways, routers, firewalls, virtual private network (VPN) devices, servers, clients, computers, configuration tools, monitoring tools, and/or other devices.

Figure 41:
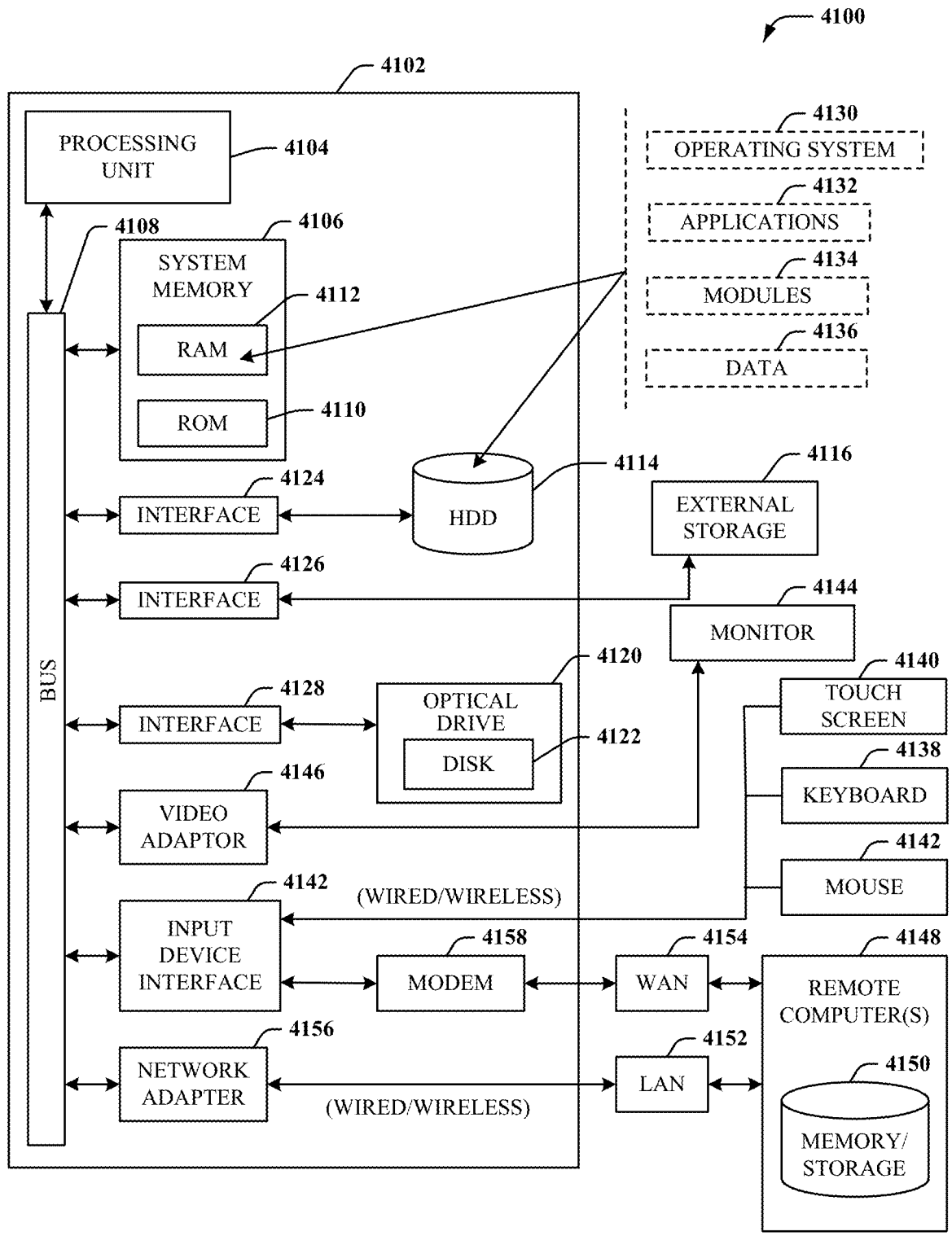
FIG. 41 is an example computing environment.
Figure 42:
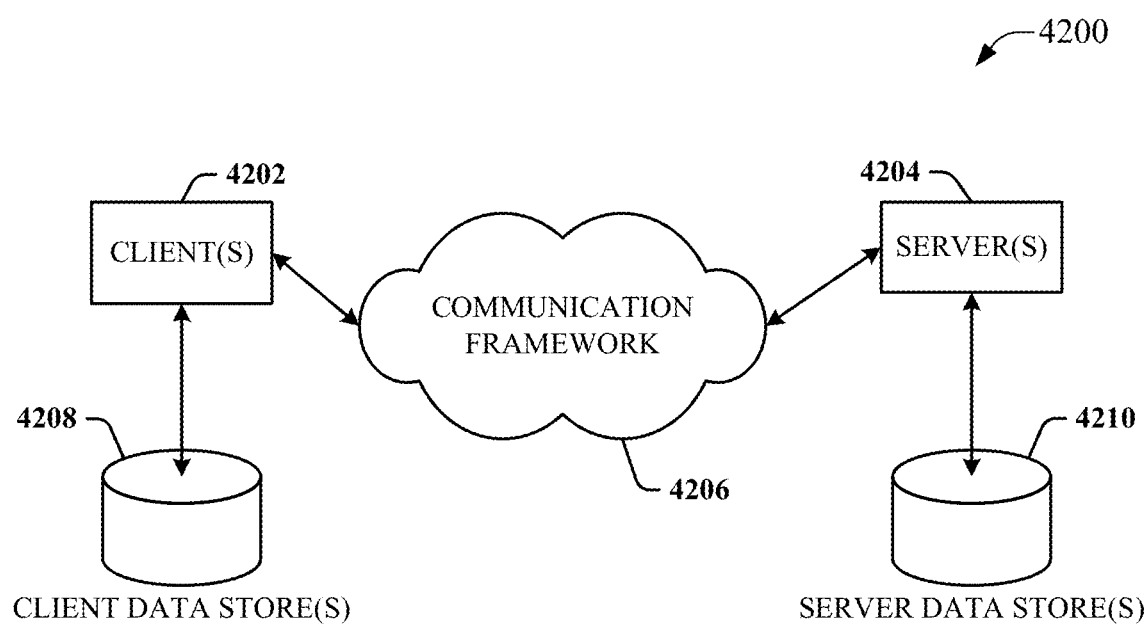
FIG. 42 is an example networking environment.

In order to provide a context for the various aspects of the disclosed subject matter, FIGS. 41 and 42 as well as the following discussion are intended to provide a brief, general description of a suitable environment in which the various aspects of the disclosed subject matter may be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 41 the example environment 4100 for implementing various embodiments of the aspects described herein includes a computer 4102, the computer 4102 including a processing unit 4104, a system memory 4106 and a system bus 4108. The system bus 4108 couples system components including, but not limited to, the system memory 4106 to the processing unit 4104. The processing unit 4104 can be any of various commercially available processors. Dual microprocessors and other multi-processor architectures can also be employed as the processing unit 4104.

The system bus 4108 can be any of several types of bus structure that can further interconnect to a memory bus (with or without a memory controller), a peripheral bus, and a local bus using any of a variety of commercially available bus architectures. The system memory 4106 includes ROM 4110 and RAM 4112. A basic input/output system (BIOS) can be stored in a non-volatile memory such as ROM, erasable programmable read only memory (EPROM), EEPROM, which BIOS contains the basic routines that help to transfer information between elements within the computer 4102, such as during startup. The RAM 4112 can also include a high-speed RAM such as static RAM for caching data.

The computer 4102 further includes an internal hard disk drive (HDD) 4114 (e.g., EIDE, SATA), one or more external storage devices 4116 (e.g., a magnetic floppy disk drive (FDD) 4116, a memory stick or flash drive reader, a memory card reader, etc.) and an optical disk drive 4120 (e.g., which can read or write from a CD-ROM disc, a DVD, a BD, etc.). While the internal HDD 4114 is illustrated as located within the computer 4102, the internal HDD 4114 can also be configured for external use in a suitable chassis (not shown). Additionally, while not shown in environment 4100, a solid state drive (SSD) could be used in addition to, or in place of, an HDD 4114. The HDD 4114, external storage device(s) 4116 and optical disk drive 4120 can be connected to the system bus 4108 by an HDD interface 4124, an external storage interface 4126 and an optical drive interface 4128-, respectively. The interface 4124 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 4102, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 4112, including an operating system 4130, one or more application programs 4132, other program modules 4134 and program data 4136. All or portions of the operating system, applications, modules, and/or data can also be cached in the RAM 4112. The systems and methods described herein can be implemented utilizing various commercially available operating systems or combinations of operating systems.

Computer 4102 can optionally comprise emulation technologies. For example, a hypervisor (not shown) or other intermediary can emulate a hardware environment for operating system 4130, and the emulated hardware can optionally be different from the hardware illustrated in FIG. 41. In such an embodiment, operating system 4130 can comprise one virtual machine (VM) of multiple VMs hosted at computer 4102. Furthermore, operating system 4130 can provide runtime environments, such as the Java runtime environment or the .NET framework, for application programs 4132. Runtime environments are consistent execution environments that allow application programs 4132 to run on any operating system that includes the runtime environment. Similarly, operating system 4130 can support containers, and application programs 4132 can be in the form of containers, which are lightweight, standalone, executable packages of software that include, e.g., code, runtime, system tools, system libraries and settings for an application.

Further, computer 4102 can be enable with a security module, such as a trusted processing module (TPM). For instance with a TPM, boot components hash next in time boot components, and wait for a match of results to secured values, before loading a next boot component. This process can take place at any layer in the code execution stack of computer 4102, e.g., applied at the application execution level or at the operating system (OS) kernel level, thereby enabling security at any level of code execution.

A user can enter commands and information into the computer 4102 through one or more wired/wireless input devices, e.g., a keyboard 4138, a touch screen 4140, and a pointing device, such as a mouse 4142. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 4104 through an input device interface 4144 that can be coupled to the system bus 4108, but can be connected by other interfaces, such as a parallel port, an IEEE 1394 serial port, a game port, a USB port, an IR interface, a BLUETOOTH® interface, etc.

A monitor 4144 or other type of display device can be also connected to the system bus 4108 via an interface, such as a video adapter 4146. In addition to the monitor 4144, a computer typically includes other peripheral output devices (not shown), such as speakers, printers, etc.

The computer 4102 can operate in a networked environment using logical connections via wired and/or wireless communications to one or more remote computers, such as a remote computer(s) 4148. The remote computer(s) 4148 can be a workstation, a server computer, a router, a personal computer, portable computer, microprocessor-based entertainment appliance, a peer device or other common network node, and typically includes many or all of the elements described relative to the computer 4102, although, for purposes of brevity, only a memory/storage device 4150 is illustrated. The logical connections depicted include wired/wireless connectivity to a local area network (LAN) 4152 and/or larger networks, e.g., a wide area network (WAN) 4154. Such LAN and WAN networking environments are commonplace in offices and companies, and facilitate enterprise-wide computer networks, such as intranets, all of which can connect to a global communications network, e.g., the Internet.

When used in a LAN networking environment, the computer 4102 can be connected to the local network 4152 through a wired and/or wireless communication network interface or adapter 4156. The adapter 4156 can facilitate wired or wireless communication to the LAN 4152, which can also include a wireless access point (AP) disposed thereon for communicating with the adapter 4156 in a wireless mode.

When used in a WAN networking environment, the computer 4102 can include a modem 4158 or can be connected to a communications server on the WAN 4154 via other means for establishing communications over the WAN 4154, such as by way of the Internet. The modem 4158, which can be internal or external and a wired or wireless device, can be connected to the system bus 4108 via the input device interface 4142. In a networked environment, program modules depicted relative to the computer 4102 or portions thereof, can be stored in the remote memory/storage device 4150. It will be appreciated that the network connections shown are example and other means of establishing a communications link between the computers can be used.

When used in either a LAN or WAN networking environment, the computer 4102 can access cloud storage systems or other network-based storage systems in addition to, or in place of, external storage devices 4116 as described above. Generally, a connection between the computer 4102 and a cloud storage system can be established over a LAN 4152 or WAN 4154 e.g., by the adapter 4156 or modem 4158, respectively. Upon connecting the computer 4102 to an associated cloud storage system, the external storage interface 4126 can, with the aid of the adapter 4156 and/or modem 4158, manage storage provided by the cloud storage system as it would other types of external storage. For instance, the external storage interface 4126 can be configured to provide access to cloud storage sources as if those sources were physically connected to the computer 4102.

The computer 4102 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

FIG. 42 is a schematic block diagram of a sample computing environment 4200 with which the disclosed subject matter can interact. The sample computing environment 4200 includes one or more client(s) 4202. The client(s) 4202 can be hardware and/or software (e.g., threads, processes, computing devices). The sample computing environment 4200 also includes one or more server(s) 4204. The server(s) 4204 can also be hardware and/or software (e.g., threads, processes, computing devices). The servers 4204 can house threads to perform transformations by employing one or more embodiments as described herein, for example. One possible communication between a client 4202 and servers 4204 can be in the form of a data packet adapted to be transmitted between two or more computer processes. The sample computing environment 4200 includes a communication framework 4206 that can be employed to facilitate communications between the client(s) 2402 and the server(s) 4204. The client(s) 4202 are operably connected to one or more client data store(s) 4208 that can be employed to store information local to the client(s) 2802. Similarly, the server(s) 4204 are operably connected to one or more server data store(s) 4210 that can be employed to store information local to the servers 4204.

What has been described above includes examples of the subject innovation. It is, of course, not possible to describe every conceivable combination of components or methodologies for purposes of describing the disclosed subject matter, but one of ordinary skill in the art may recognize that many further combinations and permutations of the subject innovation are possible. Accordingly, the disclosed subject matter is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the disclosed subject matter. In this regard, it will also be recognized that the disclosed subject matter includes a system as well as a computer-readable medium having computer-executable instructions for performing the acts and/or events of the various methods of the disclosed subject matter.

In addition, while a particular feature of the disclosed subject matter may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

In this application, the word "exemplary" is used to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks [e.g., compact disk (CD), digital versatile disk (DVD) . . . ], smart cards, and flash memory devices (e.g., card, stick, key drive . . . ).

What is claimed is:

1. A system, comprising:
 a memory that stores executable components; and
 a processor, operatively coupled to the memory, that executes the executable components, the executable components comprising:
  a device interface component configured to read, from industrial devices on which data tags are defined, visualization metadata respectively associated with the data tags;
  a metadata management component configured to record identities of a subset of the data tags having visualization metadata indicating that visualization of data collected from the subset of the data tags is enabled; and
  a user interface configuration component configured to instruct a user interface system to
   render information regarding the subset of the data tags on an interface display, and
   render historical data collected from a data tag, of the subset of the data tags, selected via interaction with the interface display,
 wherein
 the user interface system is configured to selectively render the historical data as either raw data collected from the data tag or as a reduced version of the raw data,
 a record of the reduced version of the raw data is labeled with a same identifier as a corresponding record of the raw data, and
 the user interface system is further configured to, in response to selection, via another interaction with the interface display, of the record of the reduced version of the raw data, identify the corresponding record of the raw data based on the identifier and render a portion of the raw data within a defined time range of the corresponding record.

2. The system of claim 1, wherein the visualization metadata respectively associated with the data tags is set on the industrial devices using one or more device configuration applications configured to program and configure the industrial devices.

3. The system of claim 1, wherein the user interface system is configured to selectively retrieve the historical data to be rendered from either of local storage associated with the user interface system or cloud-based storage external to the user interface system.

4. The system of claim 3, wherein the user interface system is configured to, in response to receipt of a request to render a subset of the historical data and a determination that the subset of the historical data is available on the local storage, retrieve the subset of the historical data from the local storage, and in response to receipt of the request and a determination that the subset of the historical data is not available on the local storage, retrieve the subset from the cloud-based storage.

5. The system of claim 1, wherein the user interface system is configured to receive the selection of the record of the reduced version of the raw data as a selection of a point on a line graph that plots the reduced version of the raw data, the point corresponding to the record of the reduced version of the raw data.

6. The system of claim 1, wherein the user interface system executes on one of a node system of an industrial data pipeline or an edge device.

7. The system of claim 1, wherein the user interface management component is configured to:
receive, from the user interface system, plant configuration information identifying at least one of a plant facility, a production area, or a machine, and
instruct the user interface system to render a filtered set of the subset of data tags corresponding to the at least one of the plant facility, the production area, or the machine.

8. A method, comprising:
reading, by a system comprising a processor, visualization metadata respectively associated with data tags defined on industrial devices;
identifying, by the system, a subset of the data tags having visualization metadata indicating that visualization of data collected from the subset of the data tags is enabled;
rendering, by the system, information regarding the subset of the data tags on an interface display; and
in response to receiving, via a first interaction with the interface display, selection input that selects a data tag of the subset of the data tags, rendering, by the system on the interface display, historical data collected from the data tag,
wherein the rendering of the historical data comprises:
rendering a reduced version of raw data collected from the data tag, and
in response to receiving, via a second interaction with the interface display, selection of a record of the reduced version of the raw data:
identifying a corresponding record of the raw data having a same identifier as an identifier associated with the record of the reduced version of the raw data, and
rendering, on the interface display, a portion of the raw data within a defined time range of the corresponding record.

9. The method of claim 8, wherein the visualization metadata respectively associated with the data tags is set on the industrial devices using one or more device configuration applications configured to program and configure the industrial devices.

10. The method of claim 8, wherein the rendering of the historical data further comprises:
in response to determining that the historical data is available on the local storage, retrieving the historical data from the local storage, and
in response to determining that the historical data is not available on the local storage, retrieving the historical data from cloud-based storage.

11. The method of claim 8, further comprising:
collecting, by the system, the raw data from the data tag;
applying, by the system, a data reduction strategy to the raw data to yield the reduced version of the raw data; and
labeling, by the system, the record of the reduced version of the raw data with the same identifier as the corresponding record of the raw data.

12. The method of claim 8, wherein the receiving of the selection of the record comprises receiving a selection of a point on a line graph that plots the reduced version of the raw data, the point corresponding to the record of the reduced version of the raw data.

13. The method of claim 8, further comprising:
in response to receiving, via a third interaction with the interface display, plant configuration information identifying at least one of a plant facility, a production area, or a machine, rendering, by the system, information regarding a filtered set of the subset of data tags corresponding to the at least one of the plant facility, the production area, or the machine.

14. The method of claim 8, wherein the rendering of the information regarding the subset of the data tags comprises rendering the information on a smart widget included on the interface display.

15. A non-transitory computer-readable medium having stored thereon instructions that, in response to execution, cause a system comprising a processor to perform operations, the operations comprising:
monitoring visualization metadata respectively associated with data tags defined on industrial devices;
identifying a subset of the data tags having visualization metadata indicating that data collected from the subset of the data tags is permitted to be visualized;
rendering information regarding the subset of the data tags on an interface display; and
in response to receiving, via a first interaction with the interface display, selection input that selects a data tag of the subset of the data tags, rendering, on the interface display, historical data collected from the data tag,
wherein the rendering of the historical data comprises:
rendering a reduced version of raw data collected from the data tag, and
in response to receiving, via a second interaction with the interface display, selection of a record of the reduced version of the raw data:
identifying a corresponding record of the raw data having a same identifier as an identifier associated with the record of the reduced version of the raw data, and
rendering, on the interface display, a portion of the raw data within a defined time range of the corresponding record.

16. The non-transitory computer-readable medium of claim 15, wherein the rendering the historical data further comprises:
in response to determining that the historical data is available on the local storage, retrieving the historical data from the local storage, and
in response to determining that the historical data is not available on the local storage, retrieving the historical data from cloud-based storage.

17. The non-transitory computer-readable medium of claim 15, further comprising:
collecting a subset of the historical data from the data tag as the raw data;
applying a data reduction strategy to the raw data to yield the reduced version of the raw data; and
labeling the record of the reduced version of the raw data with the same identifier as the corresponding record of the raw data.

18. The non-transitory computer-readable medium of claim 15, wherein the receiving of the selection of the record comprises receiving a selection of a point on a line graph that plots the reduced version of the raw data, the point corresponding to the record of the reduced version of the raw data.

19. The non-transitory computer-readable medium of claim 15, wherein the operations further comprise:
in response to receiving, via a third interaction with the interface display, plant configuration information identifying at least one of a plant facility, a production area, or a machine, rendering, on the interface display, information regarding a filtered set of the subset of data tags corresponding to the at least one of the plant facility, the production area, or the machine.

20. The non-transitory computer-readable medium of claim 15, wherein the rendering of the information regarding the subset of the data tags comprises rendering the information on a smart widget included on the interface display.

* * * * *